(12) United States Patent
Kishigami et al.

(10) Patent No.: US 8,261,169 B2
(45) Date of Patent: Sep. 4, 2012

(54) WIRELESS COMMUNICATION APPARATUS AND WIRELESS COMMUNICATION METHOD

(75) Inventors: Takaaki Kishigami, Tokyo (JP); Hirohito Mukai, Tokyo (JP); Shutai Okamura, Kanagawa (JP)

(73) Assignee: Panasonic Corporation, Osaka (JP)

( * ) Notice: Subject to any disclaimer, the term of this patent is extended or adjusted under 35 U.S.C. 154(b) by 898 days.

(21) Appl. No.: 12/300,301

(22) PCT Filed: May 17, 2007

(86) PCT No.: PCT/JP2007/060166

§ 371 (c)(1),
(2), (4) Date: Nov. 10, 2008

(87) PCT Pub. No.: WO2007/135964

PCT Pub. Date: Nov. 29, 2007

(65) Prior Publication Data

US 2009/0125793 A1    May 14, 2009

(30) Foreign Application Priority Data

May 19, 2006 (JP) ................................. 2006-140592
May 17, 2007 (JP) ................................. 2007-131651

(51) Int. Cl.
*G06F 11/00* (2006.01)
(52) U.S. Cl. ....................................................... 714/794
(58) Field of Classification Search .................. None
See application file for complete search history.

(56) References Cited

U.S. PATENT DOCUMENTS

| | | | |
|---|---|---|---|
| 6,320,919 B1 * | 11/2001 | Khayrallah et al. | 375/347 |
| 6,428,280 B1 * | 8/2002 | Austin et al. | 416/241 B |
| 7,421,035 B1 * | 9/2008 | Gardner et al. | 375/267 |
| 2005/0195922 A1 | 9/2005 | Maeda et al. | |
| 2008/0273630 A1 * | 11/2008 | Mege et al. | 375/341 |
| 2009/0016459 A1 * | 1/2009 | Kim et al. | 375/262 |
| 2009/0141834 A1 * | 6/2009 | Imamura et al. | 375/341 |

(Continued)

FOREIGN PATENT DOCUMENTS

JP   2005-253032   9/2005

(Continued)

OTHER PUBLICATIONS

Ohgane T, Ogawa Y and Itoh K; "A Study on a Channel Allocation Scheme With an Adaptive Array in SDMA". IEEE Journal, Mar. 1997, pp. 725-729.

(Continued)

*Primary Examiner* — Michael Maskulinski
(74) *Attorney, Agent, or Firm* — Pearne & Gordon LLP

(57) ABSTRACT

The invention is embodied for solving a problem of occurrence of degradation of the reception characteristic caused by the interference signal component if a symbol making a determination error is contained or if an error factor caused by a propagation channel estimation error or a hardware error (carrier frequency error, sampling frequency error) is contained at the interference canceling time in a wireless communication apparatus for iteratively decoding and receiving a spatial multiplex signal. A wireless communication apparatus 100 according to the invention has an error estimator 13 for estimating an error of a replica signal at the interference canceling time and a weighter 14 for weighting likelihood information for a spatial multiplex signal separated and combined after interference is canceled based on output of the error estimator 13, whereby if an error of the replica signal at the interference canceling time is contained, a good reception characteristic can be provided.

29 Claims, 23 Drawing Sheets

U.S. PATENT DOCUMENTS

2010/0098194 A1* 4/2010 Reial ............................ 375/341
2010/0220806 A1* 9/2010 Imamura et al. .............. 375/295

FOREIGN PATENT DOCUMENTS

JP 2006-345500 12/2006

OTHER PUBLICATIONS

Foschini G. "Layered Space-Time Architecture for Wireless Communication in a Fading Environment When Using Multi-Element Antennas". In: Bell Labs Technical Journal, Autumn 1996, pp. 41-59.

Okamura S, Kishigami T, Kobayashi K, Murakami Y and Fukugawa T; "Reduction of Impact of Decoding Error Propagation for LDPC Coded MIMO Systems With Iterative Interference Canceller". 2005, p. 544. Note: Corresponds to An Iterative Interference Canceller With Log-Likelihood Ratio Compensation for LDPC Coded MIMO Systems:.

Okamura S, Kishigami T, Kobayashi, Murakami Y and Fukagawa T; "An Iterative Interference Canceller With Log-Likelihood Ratio Compensation for LDPC Coded MIMO Systems". In: IEEE Journal, Jul. 2005, pp. 282-286. Note: Corresponds to "Reduction of Impact of Decoding Error Propagation for LDPC Coded MIMO Systems With Iterative Interference Canceller".

Fuji H, Tomisato S, Hirohito S; "Turbo Receiver With SC/Simplified-MMSE (S-MMSE) Type Equalizer for MIMO Channel Signal Transmission". In: IEEE Journal, Mar. 2003, pp. 632-636.

Junichiro Kawamoto, et al., "Investigation on Likelihood Function for QRM-MLD Combined with MMSE-Based Multipath Interference Canceller Suitable for Soft*Decision Turbo Decoding in Broadband CDMA MIMO Multiplexing".

Dariush Divsalar, et al., "Improved Parallel Interference Cancellation for CDMA".

Junichiro Kawamoto et al "Maximum Likelihood Detection Based on Replica Candidate Selection with QR Decomposition Employing Multipath Interference Canceller with Two-Dimensional MMSE for Broadband DS-CDMA" Feb. 21, 2012, pp. 19-24, Japan.

* cited by examiner

FIG. 21

| CONTROL SIGNAL | c |
|---|---|
| BPSK | 1/4 |
| QPSK | 1/2 |
| 16QAM | 2 |
| 64QAM | 4 |

FIG. 23

| INPUT | OUTPUT |
|---|---|
| 1 | 1 |
| 1.1 | 0.953463 |
| 1.2 | 0.912871 |
| 1.3 | 0.877058 |
| 1.4 | 0.845154 |
| 1.5 | 0.816497 |
| 1.6 | 0.790569 |
| 1.7 | 0.766965 |
| 1.8 | 0.745356 |
| 1.9 | 0.725476 |
| 2 | 0.707107 |
| 2.1 | 0.690066 |
| 2.2 | 0.6742 |
| 2.3 | 0.65938 |
| 2.4 | 0.645497 |
| 2.5 | 0.632456 |
| 2.6 | 0.620174 |
| 2.7 | 0.608581 |
| 2.8 | 0.597614 |
| 2.9 | 0.58722 |
| 3 | 0.57735 |
| . | . |
| . | . |
| . | . |

WIRELESS COMMUNICATION APPARATUS AND WIRELESS COMMUNICATION METHOD

TECHNICAL FIELD

This invention relates to a wireless communication apparatus for iteratively decoding and receiving a signal.

BACKGROUND ART

In recent years, demands for larger capacity and speeding up of wireless communication have very grown and a method of further improving the effective use efficiency of limited frequency resources has been studied actively. As one of the methods, attention is focused on a technique of using a space domain. One of technologies using a space domain is an adaptive array antenna (adaptive antenna). In the adaptive array antenna, an amplitude and a phase can be adjusted using a weighting coefficient by which a reception signal is multiplied (hereinafter, the weighting coefficient will be referred to as "weight"). As they are adjusted, the adaptive array antenna can strongly receive a signal coming from any desired direction and can suppress an interference wave direction, whereby it is made possible to improve the communication capacity of a system.

Other technologies using a space domain are 1) space division multiple access (hereinafter, SDMA) technology for transmitting to different terminals and 2) spatial multiplex technology for transmitting to the same terminal, different data series using physical channels of the same time, the same frequency, and the same code by using spatial orthogonality in a propagation path.

Information on the SDMA technology is disclosed in non-patent document 1, etc.; if a spatial correlation coefficient between terminals is lower than a predetermined value, SDMA is possible and the throughput and the simultaneous accommodation number of users of a wireless communication system can be improved.

On the other hand, information on the spatial multiplex technology is disclosed in non-patent document 2, for example; spatial multiplex transmission can be realized in a propagation environment in which a transmitter and a receiver have each a plurality of antenna elements and the reception signal correlation between the antennas is low.

In this case, the transmitter transmits a different data series using a physical channel of the same time, the same frequency, and the same code for each antenna element from the provided antennas. The receiver performs separate reception based on the different data series from reception signals at the provided antennas. Accordingly, using a plurality of spatial multiplex streams, it is possible to accomplish speeding up without using multilevel modulation.

To perform SDM transmission, if a transmitter includes antennas of the same number as a receiver, the communication capacity can be enlarged in proportion to the number of antennas in an environment in which a large number of scatters exist between the transmitter and the receiver under a sufficient S/N (signal-to-noise ratio) condition.

Information on an SDM reception method is disclosed in non-patent document 3, for example; transmission series from a plurality of wireless communication apparatus can be separately received using techniques of MMSE (Minimum Mean squared error), ML (Maximum Likelihood), iterative decoding reception, etc.

As the configuration of iterative decoding reception, a parallel interference canceller PIC (parallel Interference Cancellation) for removing interference signals in batch and performing decoding processing and a successive interference canceller SIC (Successive Interference Cancellation) for separating and receiving a spatial multiplex signal successively from a reception signal and performing decoding processing and gradually removing an interference signal from the reception signal are known.

To adopt the iterative decoding reception configuration as a reception method in spatial multiplex transmission, a hard canceller using hard determination as the tentative determination result and a soft canceller using soft determination output are known.

Because of use of a hard determination value, the hard canceller makes it possible to lessen the circuit scale of a receiver and is advantageous in power consumption and cost as compared with the soft canceller.

Non-patent document 1: T. Ohgane et al, "A study on a channel allocation scheme with an adaptive array in SDMA," IEEE 47th VTC, Page. 725-729, vol. 2 (1997)

Non-patent document 2: G. J. Foschini, "Layered space-time architecture for wireless communication in a fading environment when using multi-element antenna," Bell Labs Tech. J., pp. 41-59, Autumn 1996

Non-patent document 3: G. J. Foschini, "Layered space-time architecture for wireless communication in a fading environment when using multi-element antenna," Bell Labs Tech. J., pp. 41-59, Autumn 1996

DISCLOSURE OF THE INVENTION

Problems to be Solved by the Invention

However, if an error cause of a phase error, etc., (a residual frequency error that cannot completely be removed in automatic frequency control (AFC), a residual phase error that cannot completely be removed in phase tracking, or the like) caused by a transmission signal replica making a determination error, an error of propagation channel estimation or channel fluctuation, or a hardware error (a frequency error of a local oscillator between transmission and reception, a frequency error of a sampling clock between a D/A converter of a transmitting unit and a D/A converter of a receiving unit, etc.,) at the interference canceling time is contained, the receiver cannot remove the interference signal component and the reception characteristic is degraded. Particularly, in a wireless LAN system adopting a variable-length frame format, the larger the transmission packet size, the larger the effect of degradation caused by an error cause of a phase error, etc., caused by a hardware error.

In case of using the soft canceller, the receiver can perform the cancel operation of the reception replica for a transmission signal at the canceling time as it is weighted based on reliability information, and thus degradation of the reception characteristic of the receiver can be suppressed to comparatively small degradation. However, if an error of propagation channel estimation or channel fluctuation or a hardware error is contained, degradation of the reception characteristic occurs as with the hard canceller.

The invention is embodied considering the circumstances described above and it is an object of the invention to provide a wireless communication apparatus having a good reception characteristic.

Means for Solving the Problems

To solve the problems in the related arts described above, a wireless communication apparatus of the invention has a likelihood calculator for using the reception signal to calculate likelihood information for the transmission signal; a tentative determiner for outputting a tentative determination value of the transmission signal based on output of the likelihood calculator; an error component estimator for estimating an error of a reception replica for the transmission signal based on the output of the tentative determiner, the estimation result of the propagation channel, and the reception signal; and a decoding processor for performing error correction decoding processing for the reception signal using the likelihood information weighted based on an output of the error component estimator.

Further, the wireless communication apparatus of the invention has a likelihood calculator for using the reception signal to calculate likelihood information for the transmission signal; a first decoder for performing error correction decoding processing for the transmission signal based on an output of the likelihood calculator to output a tentative determination value; an error component estimator for estimating an error of a reception replica for the transmission signal based on an output of the first decoder, the estimation result of the propagation channel, and the reception signal; and a second decoder for performing error correction decoding processing for the reception signal using the likelihood information weighted based on an output of the error component estimator.

The wireless communication apparatus of the invention is a wireless communication apparatus for receiving a spatial-multiplex-transmitted transmission signal, having a first decoding processor for generating the estimation result of the transmission signal; a channel estimator for generating the estimation result of the propagation channel; a replica generator for generating a reception replica for the transmission signal based on the estimation result of the transmission signal and the estimation result of the propagation channel; an interference canceller for performing subtracting processing of one or more spatial multiplex signal components from the reception signal; an error component estimator for estimating an error of the reception replica; a separation combiner for separating and combining one or more spatial multiplex signals from output of the interference canceller; a likelihood calculator for calculating likelihood information for output of the separation combiner; a weighter for weighting output of the likelihood calculator based on output of the error component estimator; and a second decoding processor for performing error correction decoding processing using output of the weighter.

Further, in the wireless communication apparatus of the invention, the replica generator has a re-coding modulator for generating a transmission signal replica based on the estimation result of a transmission symbol or transmission bit data.

Further, in the wireless communication apparatus of the invention, the replica generator generates a transmission signal replica based on the estimation result of the transmission signal and multiplies the estimation result of the propagation channel to generate the reception replica for the transmission signal.

Further, the wireless communication apparatus of the invention has one or more antennas for receiving one or more spatial multiplex signals, and the interference canceller outputs as many interference cancel signals containing the one or more spatial multiplex signals as the number of the antennas.

Further, in the wireless communication apparatus of the invention, the error component estimator estimates an error component based on a signal component provided by performing subtracting processing of the reception replica for all transmission signals from the reception signal.

Further, in the wireless communication apparatus of the invention, the error component estimator generates the reception replica for all transmission signals using the transmission signal replica output by the re-coding modulator and the channel estimation value output by the channel estimator.

Further, in the wireless communication apparatus of the invention, the separation combiner generates a separation combining weight for separating and combining one or more spatial multiplex signals from output of the interference canceller, and that the error component estimator estimates an error component based on a signal component provided by performing subtracting processing of the reception replica for a partial transmission signal contained in the transmission signal from the reception signal and the separation combining weight.

Further, in the wireless communication apparatus of the invention, the replica generator generates a reception replica for a partial transmission signal contained in the transmission signal.

Further, in the wireless communication apparatus of the invention, the separation combiner generates a separation combining weight for separating and combining one or more spatial multiplex signals from output of the interference canceller, and that the error component estimator estimates an error component based on a signal component provided by performing subtracting processing of the reception replica for all transmission signals from the reception signal and the separation combining weight.

Further, in the wireless communication apparatus of the invention, the error component estimator estimates an error component based on the reliability information of the transmission signal replica and reception power information thereof.

Further, the wireless communication apparatus of the invention has a stream reception quality estimator for generating reliability information of the transmission signal replica.

Further, in the wireless communication apparatus of the invention, the error component estimator generates the reception power information using the output of the channel estimator.

Further, in the wireless communication apparatus of the invention, the error component estimator estimates an error component based on the reliability information of the transmission signal replica, reception power information thereof, and a signal component provided by performing subtracting processing of the reception replica for all transmission signals from the reception signal.

Further, in the wireless communication apparatus of the invention, the error component estimator estimates an error component based on the reliability information of the transmission signal replica, reception power information thereof, a signal component provided by performing subtracting processing of the reception replica for all transmission signals from the reception signal, and the separation combining weight in the separation combiner.

Further, the wireless communication apparatus of the invention has a detector for determining a transmission symbol using the reception signal and outputting likelihood information for the determination result, and the first decoding processor performs error correction decoding processing based on output of the detector, and the re-coding modulator again performs error correction coding and modulation processing for the determination output of the first decoding processor, thereby generating a replica for each symbol of the transmission signal.

Further, in the wireless communication apparatus of the invention, the detector has a signal separator for multiplying the reception signal by a spatial multiplex weight and separating a reception symbol series; and a demodulator for converting the reception symbol series into the likelihood information.

Further, in the wireless communication apparatus of the invention, the reliability information of the transmission signal replica is generated based on the likelihood information obtained in the first decoding processor.

Further, in the wireless communication apparatus of the invention, the demodulator has a second likelihood calculator, and that the reliability information of the transmission signal replica is generated based on the likelihood information obtained in the second likelihood calculator.

Further, in the wireless communication apparatus of the invention, the detector multiplies the reception signal by an MMSE weight, separates a spatial multiplex signal, and detects.

Further, in the wireless communication apparatus of the invention, the detector multiplies the reception signal by an MMSE weight, thereby separating a plurality of spatial multiplex streams to take out one spatial multiplex stream, determines the transmission symbol of the spatial multiplex stream, and outputs the likelihood information for the determination result.

Further, in the wireless communication apparatus of the invention, the detector multiplies the reception signal by a ZF weight, separates a spatial multiplex signal, and detects.

Further, in the wireless communication apparatus of the invention, the reliability information of the transmission signal replica is generated based on reception weight information for separating the spatial multiplex signal used in the detector, and the reception weight information contains the MMSE weight or the ZF weight.

Further, the wireless communication apparatus of the invention has a demodulator for calculating the likelihood information for the transmission signal using the reception signal; a symbol hard determiner for calculating the hard determination result for the transmission signal using the reception signal; an error estimator for estimating an error for the transmission signal based on output of the symbol hard determiner, the estimation result of the propagation channel, and the reception signal; and a decoding processor for performing error correction decoding processing for the reception signal using the likelihood information weighted based on output of the error estimator.

Further, the wireless communication apparatus of the invention has a replica generator for generating a reception replica for the transmission signal based on the output of the symbol hard determiner and the estimation result of the propagation channel; and an interference canceller for canceling an interference component using output of the replica generator and the reception signal.

Further, according to the invention, the wireless communication apparatus for receiving a spatial-multiplex-transmitted transmission signal has a symbol hard determiner for generating the hard determination result of the transmission signal; a channel estimator for generating the estimation result of the propagation channel; a replica generator for generating a reception replica for the transmission signal based on the hard determination result of the transmission signal and the estimation result of the propagation channel; an interference canceller for performing subtracting processing of one or more spatial multiplex signal components from the reception signal; an error component estimator for estimating an error of the reception replica; a separation combiner for separating and combining one or more spatial multiplex signals from output of the interference canceller; a likelihood calculator for calculating likelihood information for output of the separation combiner; a weighter for weighting output of the likelihood calculator based on output of the error component estimator; and a decoding processor for performing error correction decoding processing using output of the weighter.

Further, according to the invention, the wireless communication apparatus for receiving a spatial-multiplex-transmitted transmission signal has a demodulator for calculating the likelihood information for the transmission signal using the reception signal; a symbol hard determiner for generating the hard determination result of the transmission signal; a channel estimator for generating the estimation result of the propagation channel; an error estimator for estimating an error for the transmission signal based on the symbol hard determination result, the channel estimation result, and the reception signal; a first weighter for weighting output of the demodulator based on output of the error estimator; and a decoding processor for performing error correction decoding based on output of the first weighter.

Further, the wireless communication apparatus of the invention has a replica generator for generating a reception replica for the transmission signal based on the estimation result of the transmission signal and the estimation result of the propagation channel; an interference canceller for performing subtracting processing of one or more spatial multiplex signal components from the reception signal; an error component estimator for estimating an error of the reception replica; a separation combiner for separating and combining one or more spatial multiplex signals from output of the interference canceller; a likelihood calculator for calculating likelihood information for output of the separation combiner; a weighter for weighting output of the likelihood calculator based on output of the error component estimator; and a decoding processor for performing error correction decoding processing using output of the weighter.

Further, according to the invention, the wireless communication apparatus for receiving a spatial-multiplex-transmitted transmission signal has a signal separator for separating a spatial-multiplexed signal from the reception signal; a demodulator for calculating the likelihood information for the transmission signal based on output of the signal separator; a first decoding processor for performing error correction decoding based on output of the demodulator; a channel estimator for generating the estimation result of the propagation channel; a replica generator for generating a reception replica for the transmission signal based on the estimation result of the transmission signal and the estimation result of the propagation channel; an interference canceller for performing subtracting processing of one or more spatial multiplex signal components from the reception signal; an error component estimator for estimating an error of the reception replica; a separation combiner for separating and combining one or more spatial multiplex signals from output of the interference canceller; a likelihood calculator for calculating likelihood information for output of the separation combiner; a weighter for weighting output of the likelihood calculator based on output of the error component estimator; a first likelihood corrector for correcting output of the weighter based on output of the likelihood calculator; and a second decoding processor for performing error correction decoding based on output of the first likelihood corrector.

Further, according to the invention, the wireless communication apparatus for receiving a spatial-multiplex-transmitted transmission signal has a signal separator for separating a spatial-multiplexed signal from the reception signal; a demodulator for calculating the likelihood information for the transmission signal based on output of the signal separator; a symbol hard determiner for calculating the hard determination result for the transmission signal based on the output of the signal separator; an error estimator for estimating an error for the transmission signal based on output of the symbol hard determiner, output of the channel estimator, and the reception signal; a first weighter for weighting output of the demodulator based on output of the error estimator; a first decoding processor for performing error correction decoding based on output of the first weighter; a channel estimator for generating the estimation result of the propagation channel; a replica generator for generating a reception replica for the transmission signal based on the estimation result of the transmission signal and the estimation result of the propagation channel; an interference canceller for performing subtracting processing of one or more spatial multiplex signal components from the reception signal; an error component estimator for estimating an error of the reception replica; a separation combiner for separating and combining one or more spatial multiplex signals from output of the interference canceller; a likelihood calculator for calculating likelihood information for output of the separation combiner; a weighter for weighting output of the likelihood calculator based on output of the error component estimator; a first likelihood corrector for weighting output of the weighter based on output of the weighter; and a second decoding processor for performing error correction decoding based on output of the first likelihood corrector.

Further, according to the invention, the wireless communication apparatus for receiving a spatial-multiplex-transmitted transmission signal has a modulation system determiner for determining from a reception signal the modulation system of the reception signal, a demodulator for calculating the likelihood information for the transmission signal using the reception signal; a symbol hard determiner for generating the hard determination result of the transmission signal; a channel estimator for generating the estimation result of the propagation channel; an error estimator for estimating an error for the transmission signal based on the symbol hard determination result, the channel estimation result, and the reception signal; a first bit selector for selecting the bit cutout position of the error for the transmission signal; a first weighter for weighting output of the demodulator based on output of the first bit selector; and a first decoding processor for performing error correction decoding based on output of the first weighter.

Further, the wireless communication apparatus of the invention has a replica generator for generating a reception replica for the transmission signal based on the estimation result of the transmission signal and the estimation result of the propagation channel; an interference canceller for performing subtracting processing of one or more spatial multiplex signal components from the reception signal; an error component estimator for estimating an error of the reception replica; a separation combiner for separating and combining one or more spatial multiplex signals from output of the interference canceller;

a likelihood calculator for calculating likelihood information for output of the separation combiner; a second bit selector for selecting the bit cutout position of the error for the transmission signal; a second weighter for weighting output of the likelihood calculator based on output of the second bit selector; and a second decoding processor for performing error correction decoding using output of the second weighter.

Further, in the wireless communication apparatus of the invention, the replica generator generates a transmission signal replica based on the estimation result of the transmission signal and multiplies the estimation result of the propagation channel to generate the reception replica for the transmission signal.

Further, the wireless communication apparatus of the invention has one or more antennas for receiving one or more spatial multiplex signals, and the interference canceller outputs as many interference cancel signals containing the one or more spatial multiplex signals as the number of the antennas.

Further, in the wireless communication apparatus of the invention, the error component estimator estimates an error component based on a signal component provided by performing subtracting processing of the reception replica for all transmission signals from the reception signal.

Further, in the wireless communication apparatus of the invention, the separation combiner generates a separation combining weight for separating and combining one or more spatial multiplex signals from output of the interference canceller, and that the error component estimator estimates an error component based on a signal component provided by performing subtracting processing of the reception replica for a partial transmission signal contained in the transmission signal from the reception signal and the separation combining weight.

Further, in the wireless communication apparatus of the invention, the replica generator generates a reception replica for a partial transmission signal contained in the transmission signal.

Further, in the wireless communication apparatus of the invention, the separation combiner generates a separation combining weight for separating and combining one or more spatial multiplex signals from output of the interference canceller, and that the error component estimator estimates an error component based on a signal component provided by performing subtracting processing of the reception replica for all transmission signals from the reception signal and the separation combining weight.

Further, in the wireless communication apparatus of the invention, the error component estimator estimates an error component based on the reliability information of the transmission signal replica and reception power information thereof.

Further, in the wireless communication apparatus of the invention, the symbol hard determiner selects the signal point nearest to a transmission signal candidate point for each transmission symbol and outputs the signal point.

Further, in the wireless communication apparatus of the invention, the first likelihood corrector adds the output of the demodulator and the output of the weighter.

Further, in the wireless communication apparatus of the invention, the first likelihood corrector selects likelihood of the output of the demodulator or likelihood of the output of the weighter, whichever is higher, and outputs the selected likelihood.

Further, in the wireless communication apparatus of the invention, the first likelihood corrector selects likelihood of the demodulator if CRC contained in the output of the demodulator is correct based on CRC given to each transmission stream, and selects likelihood output from the weighter if the CRC is incorrect.

Further, in the wireless communication apparatus of the invention, the first likelihood corrector adds the output of the first weighter and the output of the weighter.

Further, in the wireless communication apparatus of the invention, the first likelihood corrector selects likelihood of the output of the first weighter or likelihood of the output of the weighter, whichever is higher, and outputs the selected likelihood.

Further, in the wireless communication apparatus of the invention, the first likelihood corrector selects likelihood of the demodulator if CRC contained in the output of the demodulator is correct based on CRC given to each transmission stream, and selects likelihood output from the weighter if the CRC is incorrect.

Further, in the wireless communication apparatus of the invention, the error estimator subtracts all reception replicas created based on the channel estimation signal and the symbol hard determination result from the reception signal.

Advantages of the Invention

According to the wireless communication apparatus of the invention, the likelihood information for the spatial multiplex signal is weighted based on the output of the error component estimator for estimating an error component at the time of generating a reception replica signal for a transmission signal, whereby if the transmission signal replica contains an error, degradation of the reception characteristic can be suppressed.

Accordingly, there can be provided a wireless communication apparatus having a good reception characteristic while maintaining the advantages in the points of the circuit scale, the cost, and the power consumption, the features of a hard canceller.

BRIEF DESCRIPTION OF THE DRAWINGS

FIG. 21 is a drawing to show an example of an output value of c relative to input of a control signal.

FIG. 23 is a drawing to show table lookup ROM used for computation of a correction value d(k).

DESCRIPTION OF REFERENCE NUMERALS

Figure 1:
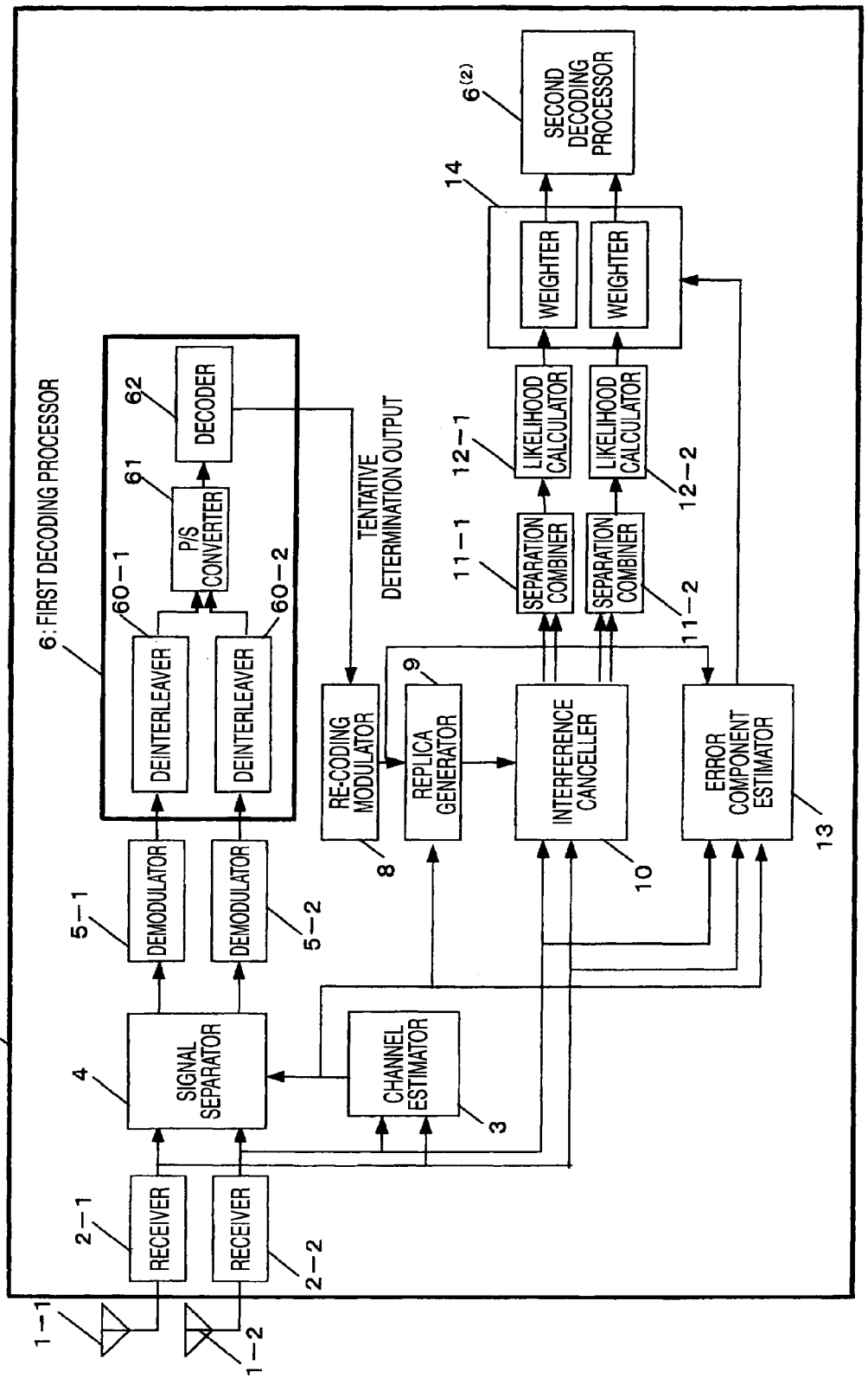
FIG. 1 is a block diagram of a wireless communication apparatus in a first embodiment of the invention.

1 Antenna
2 Receiver
3 Channel estimator
4 Signal separator
5 Modulator
6 Decoding processor
8 Re-coding modulator
9 Replica generator
10 Interference canceller
11 Separation combiner
12 Likelihood calculator
13 Error component estimator
14 Weighter
15 Symbol hard determiner
16 Error estimator
17 First weighter
18 First likelihood corrector
19 Bit selector
20 Modulation system determiner

BEST MODE FOR CARRYING OUT THE INVENTION

Embodiments of invention will be discussed below with reference to the accompanying drawings:

First Embodiment

Figure 2:
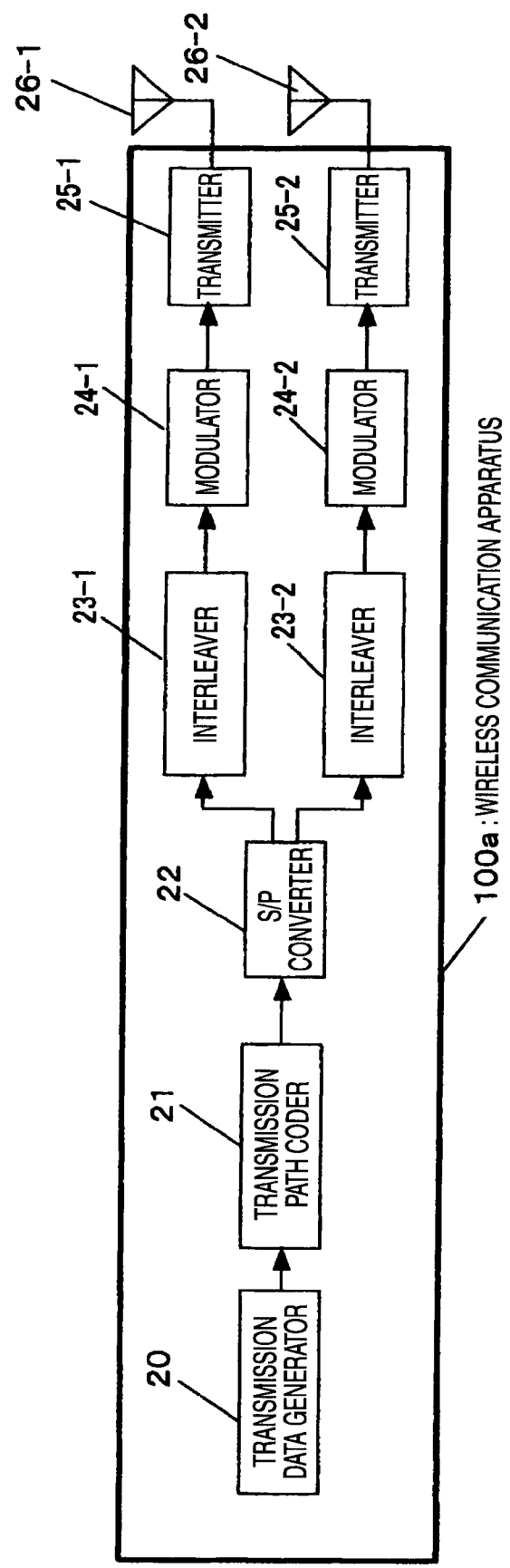
FIG. 2 is a block diagram of a transmission unit of the wireless communication apparatus in the first embodiment of the invention.

FIG. 1 is a diagram to show the configuration of a wireless communication apparatus 100 in a first embodiment of the invention. Only the reception configuration is shown in the wireless communication apparatus 100 in FIG. 1, and the transmission configuration is shown in a wireless communication apparatus 100a in FIG. 2. The reception configuration in the embodiment is the configuration of using a parallel interference canceller (PIC) to perform iterative decoding. The operation will be discussed below in order with FIGS. 1 and 2:

To begin with, the transmission operation of the wireless communication apparatus 100a will be discussed with FIG. 2. The wireless communication apparatus 100a performs spatial multiplex transmission of M transmission series from a plurality of (M, M>1) antennas 26-1 to 26-M (which will be hereinafter called spatial multiplex stream). FIG. 2 shows the configuration of the wireless communication apparatus 100a with M=2 by way of example, but the configuration is not limited to it.

In FIG. 2, a transmission data generator 20 generates a bit data series z(k) to be transmitted to a wireless communication apparatus where k indicates discrete time. A transmission path coder 21 performs error correction coding for the bit data series z(k) at a predetermined coding ratio. Serial-parallel conversion means (S/P conversion means) 22 converts data output of the transmission data generator 20 into as many parallel data sequences as the number of antennas M and outputs them as transmission bit data series $d_m(k)$.

Then, an interleaver 23-$m$ performs interleaving processing for the transmission bit data series $d_m(k)$. A modulator 24-$m$ outputs a transmission symbol series $x_m(k)$ mapped to a modulation symbol on a complex plane made up of an I (In-Phase) signal and a Q (Quadrature-Phase) signal using a modulation system at a predetermined modulation order (value indicating the information amount transmitted with one symbol) for the output of the interleaver 23-$m$.

A transmitter 25-$m$ executes frequency conversion of the transmission symbol series $x_m(k)$ of a baseband signal and transmits as a high-frequency signal from the antenna 26-$m$ where m is a natural number of M or less. The operation described above is performed for all m.

Here, the transmission symbol series at the discrete time k transmitted from the mth antenna is represented as $x_m(k)$. $x(k)$ is the transmission symbol series at the discrete time k transmitted from a plurality of antennas (M>1). Here, x(k) is an M-dimensional column vector and the mth element is $x_m(k)$.

Next, the reception configuration of the wireless communication apparatus of the invention will be discussed. The operation of the wireless communication apparatus 100 will be discussed with FIG. 1. The operation after frequency synchronization, phase synchronization, and symbol synchronization are established will be discussed below:

Nr antennas 1-1 to 1-Nr receive a transmitted high-frequency signal where Nr is a natural number of the number of spatial multiplex streams to be transmitted, M or more. FIG. 1 shows the case where Nr=2 by way of example, but the embodiment is not limited to it.

A receiver 2-$n$ performs amplification and frequency conversion processing not shown for a high-frequency signal received at the antenna 1-$n$ and then further performs orthogonal detection processing and converts the signal into a baseband signal made up of an I signal and a Q signal. Further, the baseband signal is sampled as a discrete signal using an A/D converter not shown.

Here, the I signal and the Q signal sampled at the discrete time k are represented as a reception signal $y_n(k)$ having the signals as a real component and an imaginary component. y(k) is represented as a reception signal at the antennas 1-1 to 1-Nr used for reception. This is a column vector with the nth element as $y_n(k)$.

The reception signal y(k) provided by the wireless communication apparatus 100 in a flat fading propagation environment for the transmission symbol series $x_m(k)$ at the discrete time k from the wireless communication apparatus 100$a$ can be shown as in (expression 1).

H denotes propagation path fluctuation that the transmission symbol series x(k) from the wireless communication apparatus 100$a$ receives. The propagation path fluctuation H is a matrix with (number of antennas of wireless communication apparatus 100, Nr) rows and (number of transmission antennas in wireless communication apparatus 100$a$, M) columns. Matrix element $h_{ij}$ of i row j column of the propagation path fluctuation H indicates propagation path fluctuation when a high-frequency signal transmitted from the jth transmission antenna in the wireless communication apparatus 100$a$ is received at the ith antenna in the wireless communication apparatus 100.

n(k) denotes a noise vector having Nr elements added at the receiving time at the Nr antennas of the wireless communication apparatus 100 and is white noise of noise power σ as shown in (expression 2). Here, $I_{Nr}$ is an Nr-order unit matrix. E[x] represents an expected value of x.

$$y(k)=Hx(k)+n(k) \quad \text{[Expression 1]}$$

$$E[n(k)^H n(k)]=\sigma I_{Nr} \quad \text{[Expression 2]}$$

A channel estimator 3 uses a known pilot signal, etc., transmitted from the wireless communication apparatus 100 and outputs a propagation path fluctuation estimation value B (hereinafter, channel estimation value) of an estimation value for the propagation path fluctuation H.

Next, a signal separator 4 uses the channel estimation value B, generates a spatial demultiplexing weight for separating and receiving a transmission signal spatial-multiplex-transmitted from the wireless communication apparatus 100$a$, and performs a multiplication operation on the reception signal y(k). As an output signal after the multiplication operation, a signal $s_m(k)$ provided by equalizing amplitude phase fluctuation in the propagation path (hereinafter, channel equalization) is output.

If the signal subjected to the channel equalization is only used, information concerning the reception signal quality is lost and thus to make up for the information, the signal separator 4 also outputs reception quality information $q_m(k)$ of the separated signal $s_m(k)$.

As a spatial demultiplex weight $W_m$ for any desired transmission symbol series $x_m(k)$, a technique of ZF (Zero Focusing), or MMSE (Minimum Mean Square Error), etc., is applied for calculation. Using the spatial demultiplex weight $W_m$ thus generated, the signal separator 4 multiplies the reception signal y(k) as shown in (expression 3), thereby providing the signal $s_m(k)$ wherein the interference signal component from any other spatial multiplex stream has been removed.

$W_m$ represents a column vector having Nr elements and T represents vector transposition. The output signal $s_m(k)$ of the signal separator 4 is a symbol series of the reception result (hereinafter, reception symbol series) for a transmission symbol series, subjected to symbol mapping using a modulation system at a predetermined modulation order in the modulator 24 in the transmitting unit.

$W_m$ when the ZF technique with Nr=2, M=2 is used can be represented by an inverse matrix of the propagation path fluctuation estimation value B as shown in (expression 4). When Nr>M, a pseudo inverse matrix of the propagation path fluctuation estimation value B is used. For the reception quality information $q_m(k)$, reception SNR or reception SINR of reception symbol series $s_m(k)$ provided by signal separation is used. The reception SNR or reception SINR can be converted using the spatial demultiplex weight $W_m$. In the ZF technique, the signal separator 4 can calculate a value based on the reception SNR standard as shown in (expression 5) as the reception quality information $q_m(k)$.

$$s_m(k) = W_m^T y(k) \quad \text{[Expression 3]}$$

$$\begin{bmatrix} s_1(k) \\ s_2(k) \end{bmatrix} = \begin{bmatrix} W_1^T \\ W_2^T \end{bmatrix} y(k) = B^{-1} y(k) \quad \text{[Expression 4]}$$

$$q_m(k) = 1/\|W_m\|^2 \quad \text{[Expression 5]}$$

Next, a demodulator 5-$m$ performs demapping processing of converting the reception symbol series $s_m(k)$ output by the signal separator 4 into a bit data string made up of bit strings. At the time of converting into the bit string, a technique of outputting a hard determination value of the symbol candidate point closest to the reception symbol point is also available; in the invention, however, likelihood information for each bit is output.

LLR (Log Likelihood Ratio) is calculated as the likelihood information for each bit. A calculation method of the log likelihood ratio is described in a non-patent document: "Digital Wireless Transmission Technology," written by Sanbe, pp. 275-279, Pearson Education, for example.

That is, the demodulator 5-$m$ calculates log likelihood ratio $LLR_{m,i}(k)$ of the ith bit in the reception symbol series $s_m(k)$ using (expression 6) where L denotes modulation order used at the transmitting time and $s_c^{(bi=A)}$ denotes a set of symbol candidates with the ith bit being A, of the symbol candidates used at the symbol mapping time. Here, A is 0 or 1 and i is a natural number of $\log_2(L)$ or less. m is a natural number of M or less.

$$LLR_{m,i}(k) = \qquad \text{[Expression 6]}$$
$$q_m(k)\left[\min_{c \in L}|s_m(k)-s_c^{(bi=0)}|^2 - \min_{c \in L}|s_m(k)-s_c^{(bi=1)}|^2\right]$$

Outputs of the demodulators 5-1 to 5-M are input to a first decoding processor 6. The first decoding processor 6 is made up of deinterleavers 60-1 to 60-M, a P/S converter 61, and a decoder 62. The operation of the first decoding processor will be discussed below:

The deinterleaver 60-$m$ converts the bit data order by performing inverse operation to interleave performed in the transmitting unit for output of likelihood information for each bit (hereinafter, bit likelihood series) output from the demodulator 5-$m$. The parallel-serial converter (P/S converter) 61 converts the bit likelihood series output from the deinterleavers 60-1 to 60-M into a serial bit likelihood series according to a predetermined procedure.

The decoder 62 performs error correction decoding processing for the bit likelihood series of a soft determination value output from the P/S converter 61. After performing the error correction decoding processing, the decoder 62 outputs bit data tentatively determined with a binary hard determination value as a tentative determination bit string b(k) for the transmission bit data series.

Figure 3:
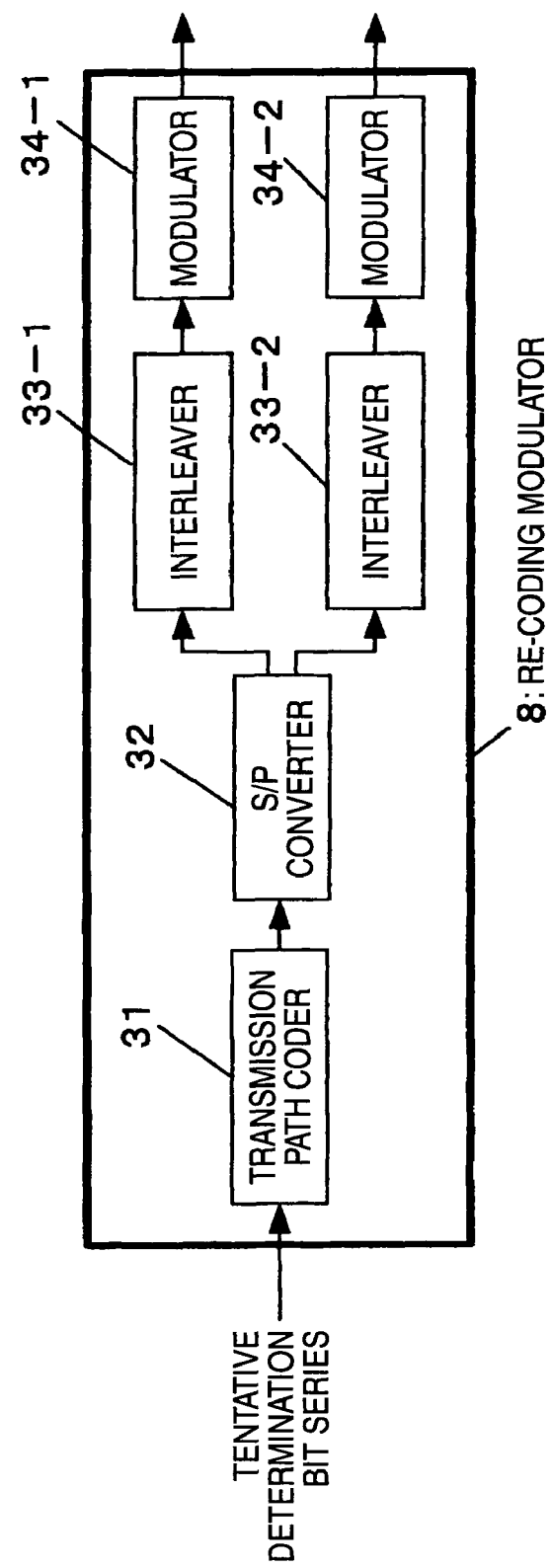
FIG. 3 is a block diagram of a coding modulator in the first embodiment of the invention.

A re-coding modulator 8 regenerates transmission symbol data based on the tentative determination bit string b(k). FIG. 3 shows the detailed configuration of the re-coding modulator 8. In FIG. 3, a transmission path coder 31 performs error correction coding for the tentative determination bit string b(k) at the predetermined coding ratio and according to the error correcting system used at the transmitting time.

Serial-parallel conversion means (S/P conversion means) 32 converts data output of the transmission path coder 31 into as many parallel data sequences as the number of antennas M as at the transmitting time and outputs them as tentative determination transmission bit data series $d^{[1]}_m(k)$.

Then, an interleaver 33-$m$ having the same interleave pattern used at the transmitting time performs interleaving processing for the tentative determination transmission bit data series $d^{[1]}_m(k)$. A modulator 34 outputs a tentative determination transmission symbol series $x^{[1]}_m(k)$ mapped to a modulation symbol on a complex plane made up of an I (In-Phase) signal and a Q (Quadrature-Phase) signal using the predetermined multi-level modulation used at the transmitting time for the output of the interleaver 33-$m$.

m is a natural number of M or less. Let $x^{[1]}(k)$ be a tentative determination transmission symbol series at the discrete time k transmitted from a plurality of antennas (M>1). Here, $x^{[1]}(k)$ is an M-dimensional column vector and the mth element is $x^{[1]}_m(k)$.

A replica generator 9 generates a replica signal $y^{[1]}(k)$ of the reception signal y(k) as shown in (expression 7) using the tentative determination transmission symbol series $x^{[1]}_m(k)$ output by the re-coding modulator 8 and the channel estimation value B output by the channel estimator 3. Here, Gr denotes a matrix with the diagonal component of r row r column set to 0 from an M-dimensional unit matrix.

$$y^{[1]}(k)=BG_r x^{[1]}(k) \qquad \text{[Expression 7]}$$

An interference canceller 10 assumes that spatial multiplex streams except any desired rth spatial multiplex stream are interference signal, removes the spatial multiplex streams from the reception signal y(k) output by the receiver 2, and outputs the rth spatial multiplex stream with interference removed. That is, interference cancel output $v_r(k)$ is calculated as shown in (expression 8).

Here, r is a natural number ranging from 1 to M and $y^{[1]}(k)$ is a replica signal. The interference cancel output $v_r(k)$ is a column vector having Nr elements. The interference canceller 10 performs the interference cancel operation described above for all M transmitted spatial multiplex streams. That is, the interference canceller 10 performs the interference cancel operation shown in (expression 8) for r=1, . . . , M.

$$v_r(k)=y(k)-y^{[1]}(k) \qquad \text{[Expression 8]}$$

A separation combiner 11-$r$ combines the interference cancel output $v_r(k)$ having Nr elements. As a combining technique of the interference cancel output, maximum ratio combining (MRC combining), MMSE combining (least square error combining), etc., can be applied. To apply the maximum ratio combining technique, the separation combiner 11-$r$ calculates combined output $u_r(k)$ for any desired rth spatial multiplex stream as in (expression 9) where $b_r$ represents the rth column vector in the channel estimation value B and superscript H represents vector conjugate transposition. Here, r is a natural number of M or less.

$$u_r(k)=b_r^H v_r(k) \qquad \text{[Expression 9]}$$

An error component estimator 13 estimates an error component E(k) of the replica signal in the interference canceller 10. That is, the error component estimator 13 generates replica signal $y^{[1]}(k)$ for all spatial multiplex streams using the output B of the channel estimator 3 and the output of the re-coding modulator 8 and subtracts and removes the replica signal $y^{[1]}(k)$ from the reception signal y(k) as shown in (expression 10).

$$E(k)=\|y(k)-y^{[1]}(k)\|^2 \qquad \text{[Expression 10]}$$

As different operation of the error component estimator 13, using the error component E(k) of the replica signal in the interference canceller 10, further an error component Er(k) of the replica signal provided by weighting using a combining weight Gr may be estimated. The combining weight Gr is provided for combining the interference cancel output $v_r(k)$ in the separation combiner 11-$r$.

That is, replica signal $y^{[1]}(k)$ for all spatial multiplex streams is generated using the output B of the channel estimator 3 and the output of the re-coding modulator 8 and is subtracted and removed from the reception signal y(k) and further combining is performed using the combining weight Gr for the interference cancel output $v_r(k)$ in the separation combiner 11-$r$ as shown in (expression 11).

In the configuration, particularly, if a spatially colored interference noise component remains, the weighting combining weight Gr is used for each spatial multiplex stream, thereby providing the error component $E_r(k)$ of the replica signal after the colored interference noise component is appropriately removed. Thus, more appropriate likelihood information is provided for each stream and the likelihood information weighting accuracy can be improved and as a result, it is made possible to improve the reception quality.

$$E_r(k) = |G_r^H[y(k) - y^{[1]}(k)]|^2 \quad \text{[Expression 11]}$$

Here, in the calculated error component $E(k)$ of the replica signal, in addition to the component of noise power $\sigma$, the following interference noise power components for the symbol data series every discrete time k can be detected:

1) When tentative determination output with determination error in decoder 62 is contained:

Interference noise power component remaining as an interference signal residual component without removing the interference signal component depending on the interference cancel operation of the interference canceller 10 because an error occurs in $x^{[1]}(k)$ component of replica signal $y^{[1]}(k) = Bx^{[1]}(k)$ generated in the replica generator 9.

2) When channel estimation error or channel fluctuation error caused by propagation path fluctuation is contained:

Interference noise power component remaining as an interference signal residual component without removing the interference signal component depending on the interference cancel operation of the interference canceller 10 because an error occurs in B component of replica signal $y^{[1]}(k) = Bx^{[1]}(k)$ generated in the replica generator 9.

3) When phase fluctuation error caused by hard error (carrier frequency error, sampling frequency error) is contained:

Interference noise power component remaining as an interference signal residual component without removing the interference signal component depending on the interference cancel operation of the interference canceller 10 because an error occurs in B component of replica signal $y^{[1]}(k) = Bx^{[1]}(k)$ generated in the replica generator 9.

A likelihood calculator 12-$r$ performs demapping processing of converting the combined output symbol data series $u_r(k)$ output by the separation combiner 11-$r$ into a bit data string made up of bit strings. At the time of converting into the bit string, the log likelihood ratio LLR for each bit is calculated as with the demodulator 5. That is, log likelihood ratio $LLR_{r,i}(k)$ as in (expression 12) is calculated as reliability information in the ith bit for the combined output symbol series $u_r(k)$.

L denotes modulation order used at the transmitting time and $s_c^{(bi=A)}$ denotes a set of symbol candidates with the ith bit being A, of the symbol candidates used at the symbol mapping time. Here, A is 0 or 1 and i is a natural number of $\log_2(L)$ or less. m is a natural number of M or less, br is the rth column vector in the channel estimation value B, and r is a natural number of M or less.

(Expression 12) is described assuming that the maximum ratio combining technique is applied in the separation combiner 11. That is, the reception quality information $q_m(k)$ uses the SNR standard. Noise power in the antennas is common and is omitted. Weighting by reception power $\|br\|^2$ by MRC combining for the rth spatial multiplex stream is performed. $\|x\|^2$ denotes the norm for a vector x.

$$LLR_{r,i}(k) = \quad \text{[Expression 12]}$$
$$\|b_r\|^2 \left[ \min_{c \in L} \left| \frac{u_r(k)}{\|b_r\|^2} - s_c^{(bi=0)} \right|^2 - \min_{c \in L} \left| \frac{u_r(k)}{\|b_r\|^2} - s_c^{(bi=1)} \right|^2 \right]$$

A weighter 14-$r$ makes a correction responsive to the error component to the bit likelihood series for the rth spatial multiplex symbol output by the likelihood calculator 12-$r$ based on the error component output from the error component estimator 13. That is, a correction bit likelihood series $LLR^{[1]}_{r,i}(k)$ as shown in (expression 13) is calculated.

d(k) can be represented as a function value with noise power $\sigma$ added at the receiving time of the wireless communication apparatus 100 and the output of the error component estimator 13 as parameters as shown in (expression 14); in the function format, the larger the error component $E(k)$ of the replica signal, the smaller d(k) made. A function shown in (expression 15) is used by way of example. $d(k) = \tan h(\alpha \times \sigma / E(k))$ may be used in place of (expression 15). In this case, $\alpha$ is a constant value.

$$LLR^{[1]}_{r,i}(k) = d(k) LLR_{r,i}(k) \quad \text{[Expression 13]}$$

$$d(k) = f(E(k), \sigma) \quad \text{[Expression 14]}$$

$$d(k) = \begin{cases} \left( \frac{E(k)}{\sigma} \right)^{-\frac{1}{2}}, & \text{when } E(k) > \sigma \\ 1, & \text{when } E(k) \leq \sigma \end{cases} \quad \text{[Expression 15]}$$

The output of the weighter 14-$r$ is input to a second decoding processor 6$^{(2)}$. The second decoding processor 6$^{(2)}$ is made up of deinterleavers 60$^{(2)}$-1 to 60$^{(2)}$-M, a P/S converter 61$^{(2)}$, and a decoder 62$^{(2)}$; this configuration is similar to that of the first decoding processor 6 and therefore will not be discussed again in detail. Finally, the decoder 62$^{(2)}$ performs error correction decoding processing for the bit likelihood series output from the P/S converter 61$^{(2)}$ and outputs a binary hard determination value as the decoding result of the transmission bit data series.

As the operation described above is performed, in the embodiment, the weighter 14 corrects the likelihood information for the spatial multiplex signal separated and combined after interference cancel based on the output of the error component estimator 13 for performing the operation of detecting the error component of the replica signal using the reception signal and the replica signal.

Accordingly, at the interference canceling time, if tentative determination output with a determination error is contained or if interference noise power caused by an error cause of a channel estimation error, a channel fluctuation error, etc., is contained noticeably, the wireless communication apparatus of the embodiment can lessen the bit likelihood for the reception symbol. Consequently, even if tentative determination output with a determination error is contained or if an error cause of a channel estimation error, a channel fluctuation error, etc., is contained, the wireless communication apparatus of the embodiment can suppress degradation of the reception characteristic by performing the error correction decoding processing using the bit likelihood.

In the embodiment, the configuration of the hard canceller with the tentative determination value as a binary hard determination value can be made simpler than that of a soft canceller using a soft determination value and further a wireless communication apparatus having a good reception characteristic can be provided.

The wireless communication apparatus in the embodiment may be used for a configuration of conducting a soft canceller using a soft determination value instead of the tentative determination value. That is, the wireless communication apparatus uses a soft interference canceller for performing soft cancel in place of the interference canceller 10. In this case, in addition to the gain improvement effect provided by the soft canceller, the improvement effect of the reception characteristic provided by the weighting effect of the likelihood information by the error component estimator 13 for detecting the error component of the reception replica, of the configuration of the invention can be obtained.

In the embodiment, the output of the second decoding processor is produced as the decoding result for the final transmission bit data series, but the output may be again input to the re-coding modulator 8 and then processing similar to that described above may be repeated in the re-coding modulator 8, the replica generator 9, the interference canceller 10, the error component estimator 13, the separation combiner 11, the likelihood calculator 12, the weighter 14, and the second decoding processor. As the processing is repeated, a processing delay grows, but the error correction effect of the decoder is enhanced and the effect of improving the reception characteristic is provided.

Second Embodiment

Figure 9:
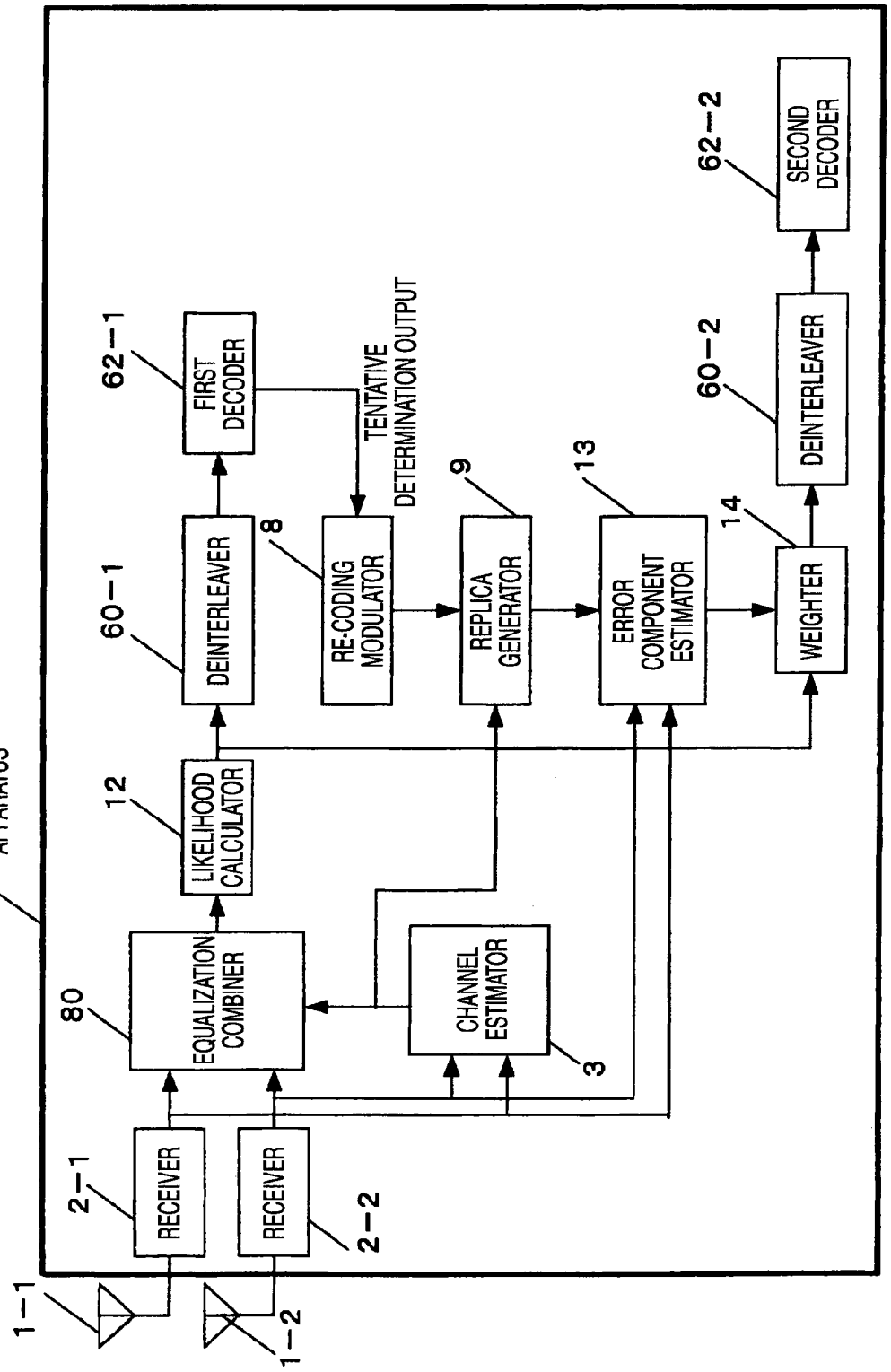
FIG. 9 is a block diagram of a wireless communication apparatus in a second embodiment of the invention.
Figure 10:
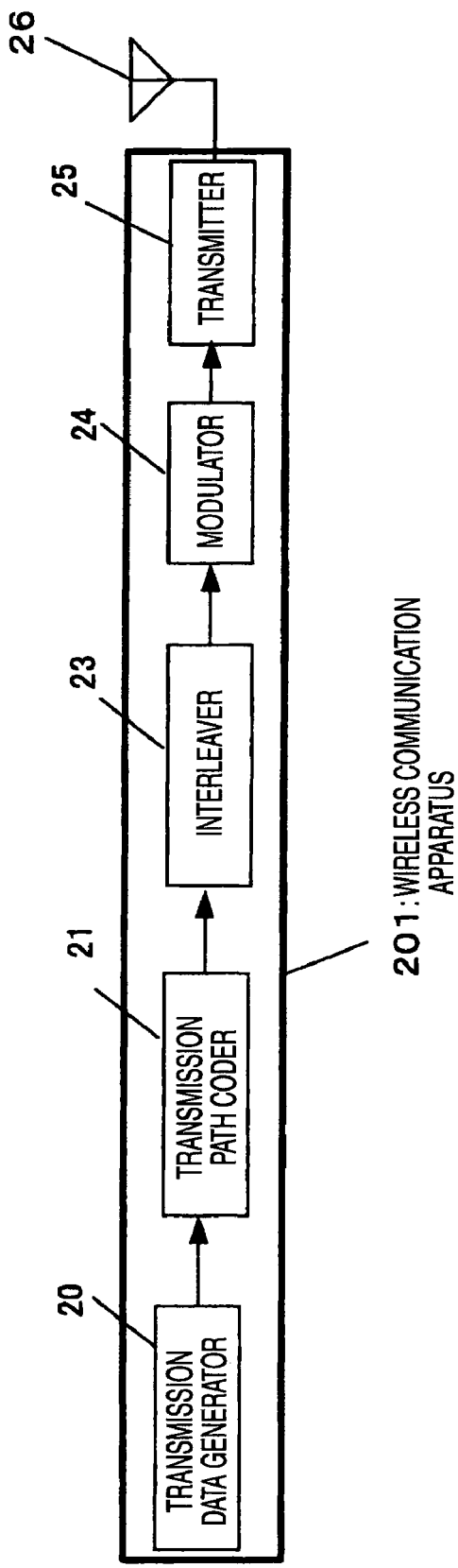
FIG. 10 is a block diagram of a transmission unit of the wireless communication apparatus in the second embodiment of the invention.

FIG. 9 is a diagram to show the configuration of a wireless communication apparatus 200 in a second embodiment of the invention. Only the reception configuration is shown in the wireless communication apparatus 200 in FIG. 9, and the transmission configuration is shown in a wireless communication apparatus 201 in FIG. 10. In the first embodiment, the transmission and reception configurations for performing spatial multiplex transmission are shown; the second embodiment shows the transmission and reception configurations for not performing spatial multiplex transmission corresponding to the case where M=1 in the first embodiment. The operation will be discussed below in order with FIGS. 9 and 10:

To begin with, the transmission operation of the wireless communication apparatus 201 will be discussed with FIG. 10. The wireless communication apparatus 201 transmits one transmission series from one antenna 26 (which will be hereinafter called transmission stream). In FIG. 10, a transmission data generator 20 generates a bit data series z(k) to be transmitted to a wireless communication apparatus where k indicates discrete time.

A transmission path coder 21 performs error correction coding for the bit data series z(k) at a predetermined coding ratio and outputs as a transmission bit data series d(k). An interleaver 23 performs interleaving processing for the transmission bit data series d(k).

A modulator 24 outputs a transmission symbol series $x_1(k)$ mapped to a modulation symbol on a complex plane made up of an I signal and a Q signal using a modulation system at a predetermined modulation order for the output of the interleaver 23. A transmitter 25 executes frequency conversion of the transmission symbol series $x_1(k)$ of a baseband signal and transmits as a high-frequency signal from the antenna 26.

Next, the reception configuration of the wireless communication apparatus of the embodiment will be discussed. The operation of the wireless communication apparatus 200 will be discussed with FIG. 9. The operation after frequency synchronization, phase synchronization, and symbol synchronization are established will be discussed below:

Nr antennas 1-1 to 1-Nr receive a transmitted high-frequency signal where Nr is a natural number of 1 or more. FIG. 9 shows the case where Nr=2 by way of example, but the embodiment is not limited to it.

A receiver 2-n performs amplification and frequency conversion processing not shown for a high-frequency signal received at the antenna 1-n and then further performs orthogonal detection processing and converts the signal into a baseband signal made up of an I signal and a Q signal.

Further, the baseband signal is sampled as a discrete signal using an A/D converter not shown. Here, the I signal and the Q signal sampled at the discrete time k are represented as a reception signal $y_n(k)$ having the signals as a real component and an imaginary component. y(k) is represented as a reception signal at the antennas 1-1 to 1-Nr used for reception. This is a column vector with the nth element as $y_n(k)$.

The reception signal y(k) in the wireless communication apparatus 200 provided in a flat fading propagation environment for the transmission symbol series $x_1(k)$ at the discrete time k from the wireless communication apparatus 201 can be shown as in (expression 16).

h denotes propagation path fluctuation that the transmission symbol series $x_1(k)$ from the wireless communication apparatus 201 receives, and is a column vector made up of (number of antennas of wireless communication apparatus 200, Nr) rows. The ith element $h_i$ of the propagation path fluctuation h indicates propagation path fluctuation when a high-frequency signal transmitted from the transmission antenna in the wireless communication apparatus 201 is received at the ith antenna in the wireless communication apparatus 200.

n(k) denotes a noise vector having Nr elements added at the receiving time at the Nr antennas of the wireless communication apparatus 200 and is white noise of noise power σ as shown in (expression 2). Here, $I_{Nr}$ is an Nr-order unit matrix. E[x] represents an expected value of x.

$$y(k) = hx_1(k) + n(k) \qquad \text{[Expression 16]}$$

A channel estimator 3 uses a known pilot signal, etc., transmitted from the wireless communication apparatus 200 and outputs a propagation path fluctuation estimation value $b_1$ (hereinafter, channel estimation value) of an estimation value for the propagation path fluctuation h.

Next, an equalization combiner 80 uses the channel estimation value B, generates a weight for equalizing and combining a transmission signal transmitted from the wireless communication apparatus 201, and performs a multiplication operation on the reception signal y(k). As an output signal after the multiplication operation, a signal $s_1(k)$ provided by equalizing amplitude phase fluctuation in the propagation path (hereinafter, channel equalization) is output.

If the signal subjected to the channel equalization is only used, information concerning the reception signal quality is lost and thus to make up for the information, the equalization combiner 80 also outputs reception quality information $q_1(k)$ of the separated signal $s_1(k)$.

The equalization combiner 80 calculates by applying a technique of ZF, MMSE, etc., as an equalization combining weight $W_1$ for any desired transmission symbol series $x_1(k)$. Using the generated equalization combining weight $W_1$, the equalization combiner 80 multiplies the reception signal y(k) as shown in (expression 17), thereby providing the equalized and combined signal $s_1(k)$.

$W_1$ represents a column vector having Nr elements and T represents vector transposition. The output signal $s_1(k)$ of the equalization combiner 80 is a symbol series of the reception result (hereinafter, reception symbol series) for a transmission symbol series, subjected to symbol mapping using a modulation system at a predetermined multi-level modulation in the modulator 24 in the transmitting unit.

For the reception quality information $q_1(k)$, reception SNR or reception SINR of reception symbol series $s_m(k)$ to be equalized and combined is used. The reception SNR or reception SINR can be converted using the equalization combining weight $W_1$; in the ZF technique, the reception quality information $q_m(k)$ can be calculated as a value based on the reception SNR standard as shown in (expression 5).

$$s_1(k)=W_1^T y(k) \quad \text{[Expression 17]}$$

Next, a likelihood calculator 12 performs demapping processing of converting the reception symbol series $s_1(k)$ output by the equalization combiner 80 into a bit data string made up of bit strings. At the time of converting into the bit string, a technique of outputting a hard determination value of the symbol candidate point closest to the reception symbol point is also available; in the invention, however, likelihood information for each bit is output.

LLR (Log Likelihood Ratio) is calculated as the likelihood information for each bit. That is, log likelihood ratio $LLR_{1,i}(k)$ of the ith bit in the reception symbol series $s_1(k)$ is calculated using (expression 18).

Here, L denotes modulation order used at the transmitting time and $s_c^{(bi=A)}$ denotes a set of symbol candidates with the ith bit being A, of the symbol candidates used at the symbol mapping time. Here, A is 0 or 1 and i is a natural number of $\log_2(L)$ or less.

$$LLR_{1,i}(k) = \quad \text{[Expression 18]}$$
$$q_1(k) \left[ \min_{c \in L} |s_1(k) - s_c^{(bi=0)}|^2 - \min_{c \in L} |s_1(k) - s_c^{(bi=1)}|^2 \right]$$

A deinterleaver 60-1 converts the bit data order by performing inverse operation to interleave performed in the transmitting unit for output of likelihood information for each bit (hereinafter, bit likelihood series) output from the likelihood calculator 12.

A first decoder 62-1 performs error correction decoding processing for the bit likelihood series of a soft determination value output from the deinterleaver 60-1 and outputs bit data tentatively determined with a binary hard determination value as a tentative determination bit string b(k) for the transmission bit data series.

A re-coding modulator 8 outputs a tentative determination transmission symbol series $x^{[1]}_1(k)$ based on the tentative determination bit string b(k) and regenerates transmission symbol data. The operation of the re-coding modulator 8 is similar to the operation of the transmission data generator 20, the transmission path coder 21, the interleaver 23, and the modulator 24 in the wireless communication apparatus 201 and therefore will not be discussed again.

A replica generator 9 generates a replica signal $y^{[1]}(k)$ of the reception signal y(k) as shown in (expression 19) using the tentative determination transmission symbol series $x^{[1]}_1(k)$ output by the re-coding modulator 8 and the channel estimation value $b_1$ output from the channel estimator 3.

$$y^{[1]}(k)=b_1 x^{[1]}(k) \quad \text{[Expression 19]}$$

An error component estimator 13 estimates an error component E(k) of the replica signal. That is, the error component estimator 13 generates replica signal $By^{[1]}(k)$ for all transmission streams using the output B of the channel estimator 3 and the output of the re-coding modulator 8 and subtracts and removes the replica signal $By^{[1]}(k)$ from the reception signal y(k) as shown in (expression 10).

Here, in the calculated error component E(k) of the replica signal, in addition to the component of noise power σ, the following interference noise power components for the symbol data series every discrete time k can be detected:

1) When tentative determination output with determination error in decoder 62-1 is contained:

Error power component remaining because an error occurs in $x^{[1]}(k)$ component of replica signal $y^{[1]}(k)=b_1 x^{[1]}(k)$ generated in the replica generator 9.

2) When channel estimation error or channel fluctuation error caused by propagation path fluctuation is contained:

Error power component with an error occurring in $b_1$ component of replica signal $y^{[1]}(k)=b_1 x^{[1]}(k)$ generated in the replica generator 9.

3) When phase fluctuation error caused by hard error (carrier frequency error, sampling frequency error) is contained:

Error power component remaining because an error occurs in $b_1$ component of replica signal $y^{[1]}(k)=b_1 x^{[1]}(k)$ generated in the replica generator 9.

The error power components in 1) to 3) occur independently.

A weighter 14 makes a correction responsive to the error component to the bit likelihood series output by the likelihood calculator 12 based on the output of the error component estimator 13. That is, the weighter 14 calculates a correction bit likelihood series $LLR^{[1]}_{1,i}(k)$ as shown in (expression 20).

d(k) can be represented as a function value with noise power σ added at the receiving time of the wireless communication apparatus 200 and the output of the error component estimator 13 as parameters as shown in (expression 14); in the function format, the larger the error component E(k) of the replica signal, the smaller d(k) made. A function shown in (expression 15) is used by way of example.

$$LLR^{[1]}_{r,i}(k)=d(k)LLR_{1,i}(k) \quad \text{[Expression 20]}$$

A second deinterleaver 60-2 performs deinterleaving processing for the output of the weighter 14. A second decoder 62-2 performs error correction decoding processing for the bit likelihood series subjected to the deinterleaving processing and outputs a binary hard determination value as the decoding result of the transmission bit data series.

As the operation described above is performed, in the embodiment, the weighter 14 corrects the likelihood information for the transmission stream based on the output of the error component estimator 13 for performing the operation of detecting the error component of the replica signal using the reception signal and the replica signal.

Accordingly, if tentative determination output with a determination error is contained or if error power caused by an error cause of a channel estimation error, a channel fluctuation error, etc., is contained noticeably, the wireless communication apparatus of the embodiment can lessen the bit likelihood for the reception symbol. Consequently, if tentative determination output with a determination error is contained or if an error cause of a channel estimation error, a channel fluctuation error, etc., is contained, the wireless communication apparatus of the embodiment can suppress degradation of the reception characteristic by performing the error correction decoding processing using the bit likelihood.

In the embodiment, the configuration of the hard canceller with the tentative determination value as a binary hard determination value can be made simpler than that of a soft canceller using a soft determination value and further a wireless communication apparatus having a good reception characteristic can be provided.

The wireless communication apparatus in the embodiment produces the output of the second decoder 62-2 as the decoding result for the final transmission bit data series, but the output of the decoding result may be again input to the re-coding modulator 8 and then processing similar to that described above may be repeated in the re-coding modulator 8, the replica generator 9, the error component estimator 13, the weighter 14, and the second decoder 62-2. The wireless communication apparatus has the advantages that the error correction effect of the decoder is enhanced and the reception characteristic is improved although a processing delay grows as the processing is repeated.

Figure 11:
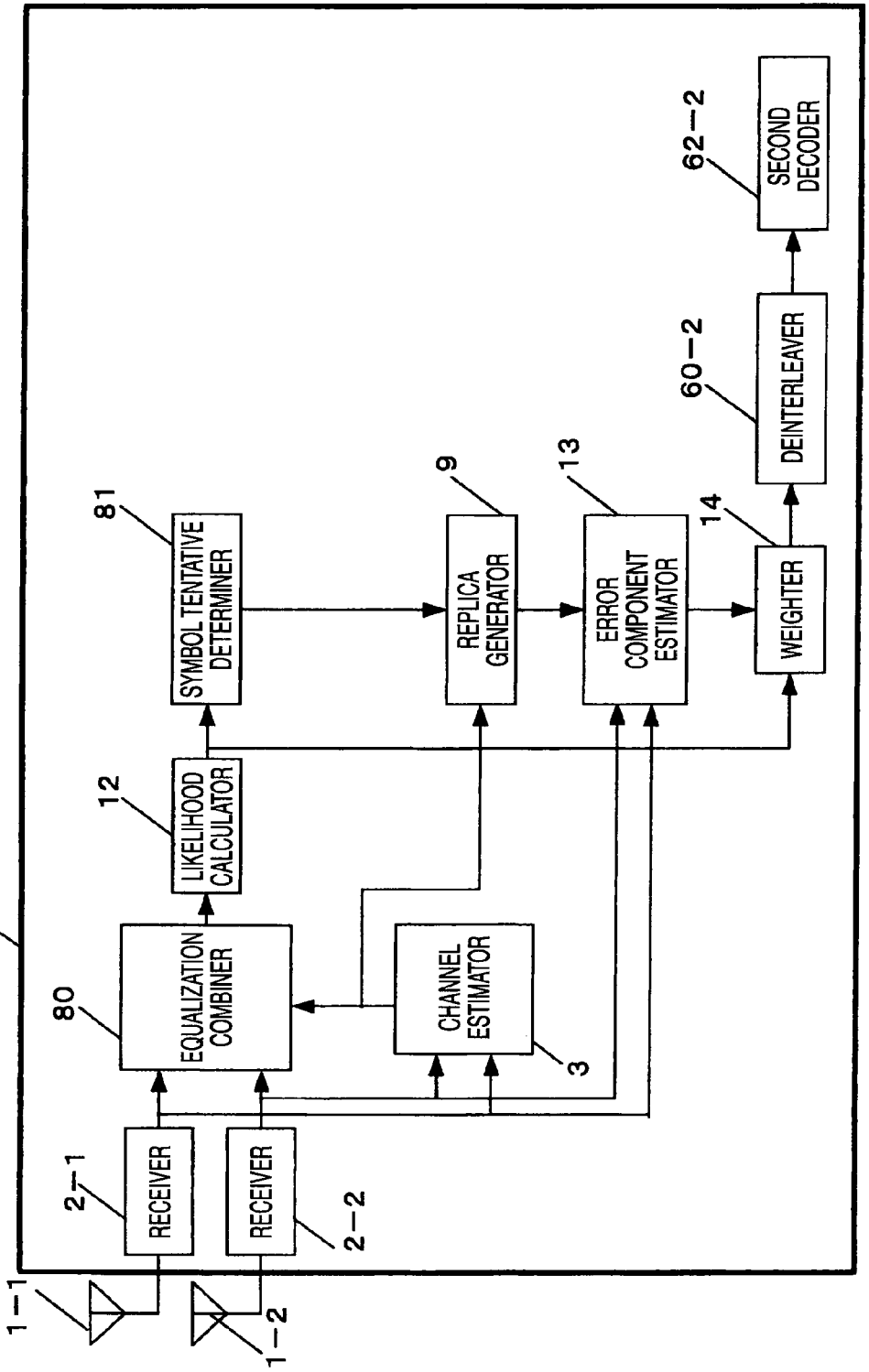
FIG. 11 is another block diagram of the wireless communication apparatus in the second embodiment of the invention.

FIG. 11 shows another configuration in the embodiment. In the configuration, a symbol tentative determiner 81 is used in place of the deinterleaver 60-1, the decoder 62-1, and the re-coding modulator 8.

That is, the symbol tentative determiner 81 makes a symbol hard determination for the symbol data series using the log likelihood ratio $LLR_{1,i}(k)$ of the ith bit in the reception symbol series $s_1(k)$. The symbol tentative determiner 81 again executes modulation using the symbol hard determination result and outputs a tentative determination transmission symbol series $x^{[1]}_1(k)$.

In the configuration, the tentative determination output is provided without performing error correction decoding processing and thus the effect of the error correction decoding is not contained at the replica generating time and thus degradation of the characteristic occurs, but the configuration can be simply implemented as compared with that in FIG. 9 and the processing delay can also be decreased.

Third Embodiment

Figure 4:
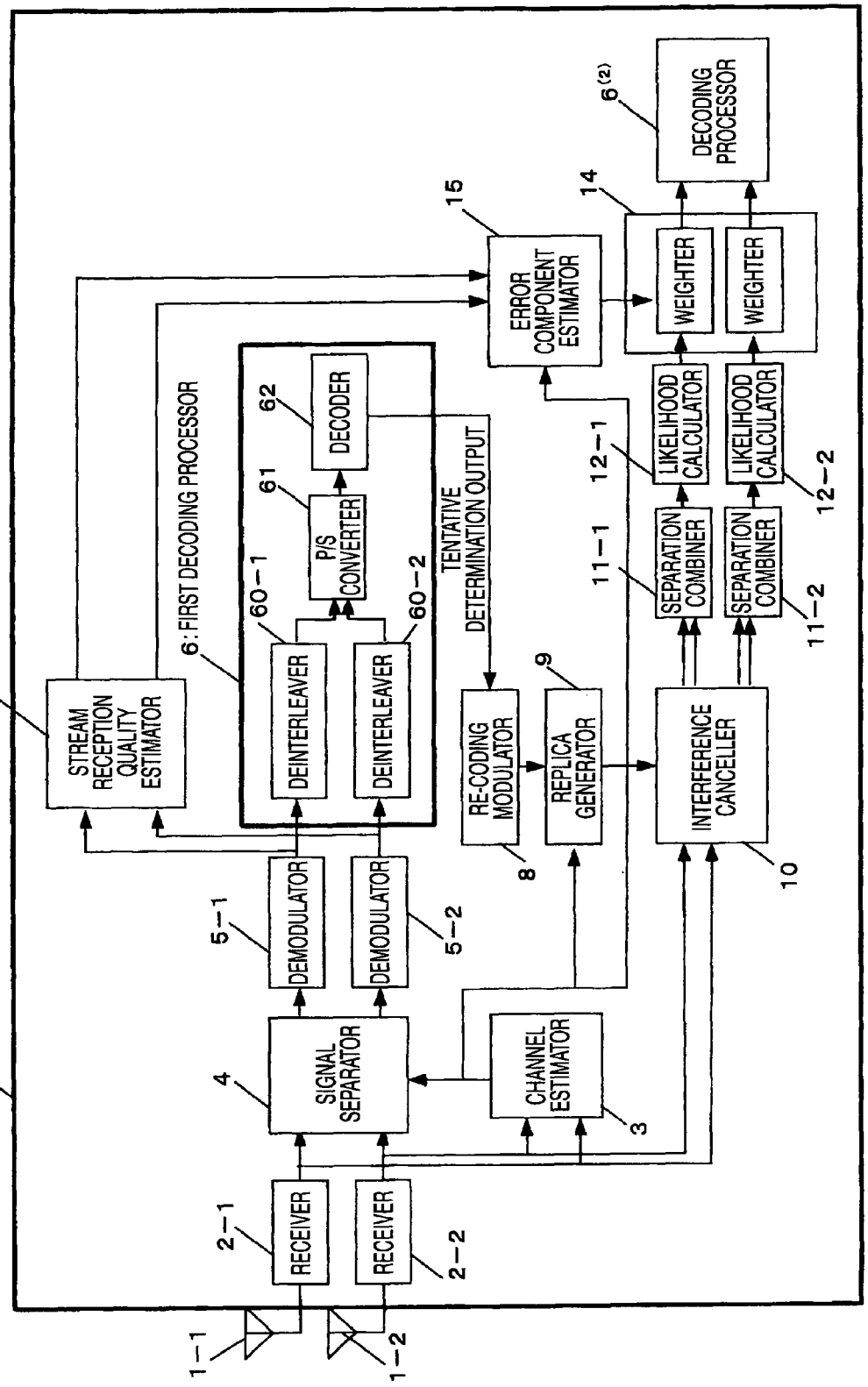
FIG. 4 is a block diagram of a wireless communication apparatus in a third embodiment of the invention.

FIG. 4 is a diagram to show the configuration of a wireless communication apparatus 100b in a third embodiment of the invention. Only the reception configuration is shown in the wireless communication apparatus 100b in FIG. 4 and the transmission configuration is the same as the configuration of the wireless communication apparatus 100a shown in FIG. 2 and therefore the transmission operation will not be discussed again.

As the reception configuration in the embodiment, a configuration for performing iterative decoding using a parallel interference canceller (PIC) is shown. The third embodiment differs from the first embodiment in that the wireless communication apparatus has an error component estimator 15 for estimating an error component based on an input signal different from the error component estimator 13 of the first embodiment. That is, the error component estimator 15 estimates an error component based on outputs from a stream reception quality estimator 7 and a channel estimator 3. The operation will be discussed below with FIG. 4 centering on different portions from the first embodiment:

The operation until a demodulator 5 calculates bit likelihood series $LLR_{m,i}(k)$ for a spatial multiplex stream through a receiver 2, the channel estimator 3, and a signal separator 4 for a high-frequency signal received at an antenna 1 is similar to that of the first embodiment and therefore will not be discussed again.

The stream reception quality estimator 7 estimates the reception quality for each symbol in a reception symbol series $s_m(k)$ of a spatial multiplex stream based on the bit likelihood series $LLR_{m,i}(k)$ for the spatial multiplex stream provided by the demodulator 5.

Here, m is a natural number of M or less. As the reception quality estimation for each symbol, the bit likelihood taking the minimum value is selected from among the absolute values of $\log_2(L)$ bit likelihood series $LLR_{m,i}(k)$ for the kth reception symbol in the mth spatial multiplex symbol as shown in (expression 21).

That is, the stream reception quality estimator 7 assumes that the bit likelihood with the lowest reliability is the representative value of the symbol, and calculates an output value using a function g with the representative value as an argument. For the function $g(x)$, a function format in which the output value becomes larger as the input argument x becomes larger is applied. As a specific function g, $g(x)=x^{1/2}$, etc., is used. A limitation is added so that $0 \leq Q_m(k) \leq 1$ as the output value. The operation described above is performed all M spatial multiplex streams.

$$Q_m(k) = g(\min_i |LLR_{m,i}(k)|) \quad \text{[Expression 21]}$$

As different operation of the stream reception quality estimator 7, an estimating method using (expression 5) may be adopted instead of the stream reception quality estimation using (expression 21).

The error component estimator 15 estimates an error component $E_r(k)$ for the rth spatial multiplex stream at the interference cancel operation time of an interference canceller 10 based on output from the stream reception quality estimator 7.

That is, interference noise power estimation is executed by assuming that if the stream reception quality $Q_m(k)$ of the mth spatial multiplex stream to be removed as interference except the rth spatial multiplex stream as shown in (expression 22) is high, the error component approaches 0; if the stream reception quality $Q_m(k)$ is low, interference power proportional to the reception power of the mth spatial multiplex stream occurs as an error component in response to the lower degree of the reliability of the stream reception quality.

However, $b_m$ is the mth column vector in a channel estimation value B and r is a natural number of M or less. If more than one spatial multiplex stream to be removed as interference except the rth spatial multiplex stream exists, the computation described above is performed for all spatial multiplex streams to be removed and the sum total of calculated interference noise power is adopted as the output value.

$$E_r(k) = \sum_{\substack{m=1 \\ m \neq r}}^{M} [\|b_m\|^2 (Q_m(k) - 1)] \quad \text{[Expression 22]}$$

On the other hand, outputs of demodulators 5-1 to 5-M are input to a first decoding processor 6. The first decoding processor 6 outputs bit data tentatively determined with a binary hard determination value as a tentative determination bit string b(k) for a transmission bit data series. The operation of the demodulators 5-1 to 5-M is similar to that in the first embodiment and will not be discussed again.

Subsequently, a re-coding modulator 8, a replica generator 9, the interference canceller 10, a separation combiner 11, and a likelihood calculator 12 operate in a similar manner to that in the first embodiment. That is, the re-coding modulator 8 regenerates transmission symbol data based on the tentative determination bit string b(k).

The replica generator 9 generates a replica signal $y^{[1]}(k)$ of a reception signal y(k) shown in (expression 7) using a tentative determination transmission symbol series $x^{[1]}_1(k)$ output by the re-coding modulator 8 and the channel estimation value B output from the channel estimator 3.

The interference canceller 10 assumes that spatial multiplex streams except any desired rth spatial multiplex stream are interference signal, removes the spatial multiplex streams from the reception signal y(k) output by the receiver 2, and outputs the rth spatial multiplex stream with interference removed.

The separation combiner 11-r calculates combined output $u_r(k)$ provided by combining interference cancel output $v_r(k)$ having Nr elements. The likelihood calculator 12-r performs demapping processing of converting the combined output symbol data series $u_r(k)$ output by the separation combiner 11-r into a bit data string made up of bit strings.

That is, the separation combiner 11-r calculates log likelihood ratio $LLR_{r,i}(k)$ as in (expression 12) as reliability information for the ith bit for the combined output symbol series $u_r(k)$ where r is a natural number of M or less. Similar operation to that in the first embodiment is performed for all r. The operation of the separation combiner 11-r will not be discussed again.

The weighter 14-r makes a correction responsive to the error component to the bit likelihood series for the rth spatial multiplex symbol output by the likelihood calculator 12-r based on the error component $E_r(k)$ output by the error component estimator 15.

That is, a correction bit likelihood series $LLR^{[1]}_{r,i}(k)$ as shown in (expression 23) is calculated. Here, $d_r(k)$ can be represented as a function value with noise power σ added at the receiving time of the wireless communication apparatus 100 and the output of the error component estimator 15 as parameters as shown in (expression 24); in the function format, the larger the error component $E_r(k)$ of the replica signal, the smaller $d_r(k)$ made. A function shown in (expression 25) is used by way of example.

$$LLR^{[1]}_{r,i}(k) = d_r(k) LLR_{r,i}(k) \qquad \text{[Expression 23]}$$

$$d_r(k) = f(E_r(k), \sigma) \qquad \text{[Expression 24]}$$

$$d_r(k) = \begin{cases} \left(\dfrac{E_r(k)}{\sigma}\right)^{-\frac{1}{2}}, & \text{when } E_r(k) > \sigma \\ 1, & \text{when } E_r(k) \le \sigma \end{cases} \qquad \text{[Expression 25]}$$

The output of the weighter 14-r is input to a second decoding processor $6^{(2)}$. The second decoding processor $6^{(2)}$ is made up of deinterleavers $60^{(2)}$-1 to $60^{(2)}$-M, a P/S converter $61^{(2)}$, and a decoder $62^{(2)}$; this configuration is similar to that of the first decoding processor 6 and therefore will not be discussed again in detail. Finally, the decoder $62^{(2)}$ performs error correction decoding processing for the bit likelihood series output from the P/S converter $61^{(2)}$ and outputs a binary hard determination value as the decoding result of the transmission bit data series.

As the operation described above is performed, in the embodiment, the weighter 14 corrects the likelihood information for the spatial multiplex signal separated and combined after interference cancel based on the output of the error component estimator 15 for detecting the error component of the replica signal at the interference canceling time.

Accordingly, at the interference canceling time, if the probability that tentative determination output with a determination error may be contained is high, namely, if the estimated reception quality for each symbol, of the replica signal to be removed as an interference signal is low in the stream reception quality estimator 7, the probability that the tentative determination output may contain an error is assumed to be high, and a correction is made so as to lessen the bit likelihood for the reception symbol. Accordingly, degradation of the reception characteristic can be suppressed by performing the error correction decoding processing using the corrected bit likelihood.

In the embodiment, the configuration of the hard canceller with the tentative determination value as a binary hard determination value can be made simpler than that of a soft canceller using a soft determination value and further a wireless communication apparatus having a good reception characteristic can be provided.

In the embodiment, the output of the second decoding processor $6^{(2)}$ is produced as the decoding result for the final transmission bit data series, but the output may be again input to the re-coding modulator 8 and then processing similar to that described above may be repeated in the re-coding modulator 8, the replica generator 9, the interference canceller 10, the error component estimator 15, the separation combiner 11, the likelihood calculator 12, the weighter 14, and the second decoding processor $6^{(2)}$. As the processing is repeated, a processing delay grows, but the error correction effect of the decoder is enhanced and the effect of improving the reception characteristic is provided.

Figure 5:
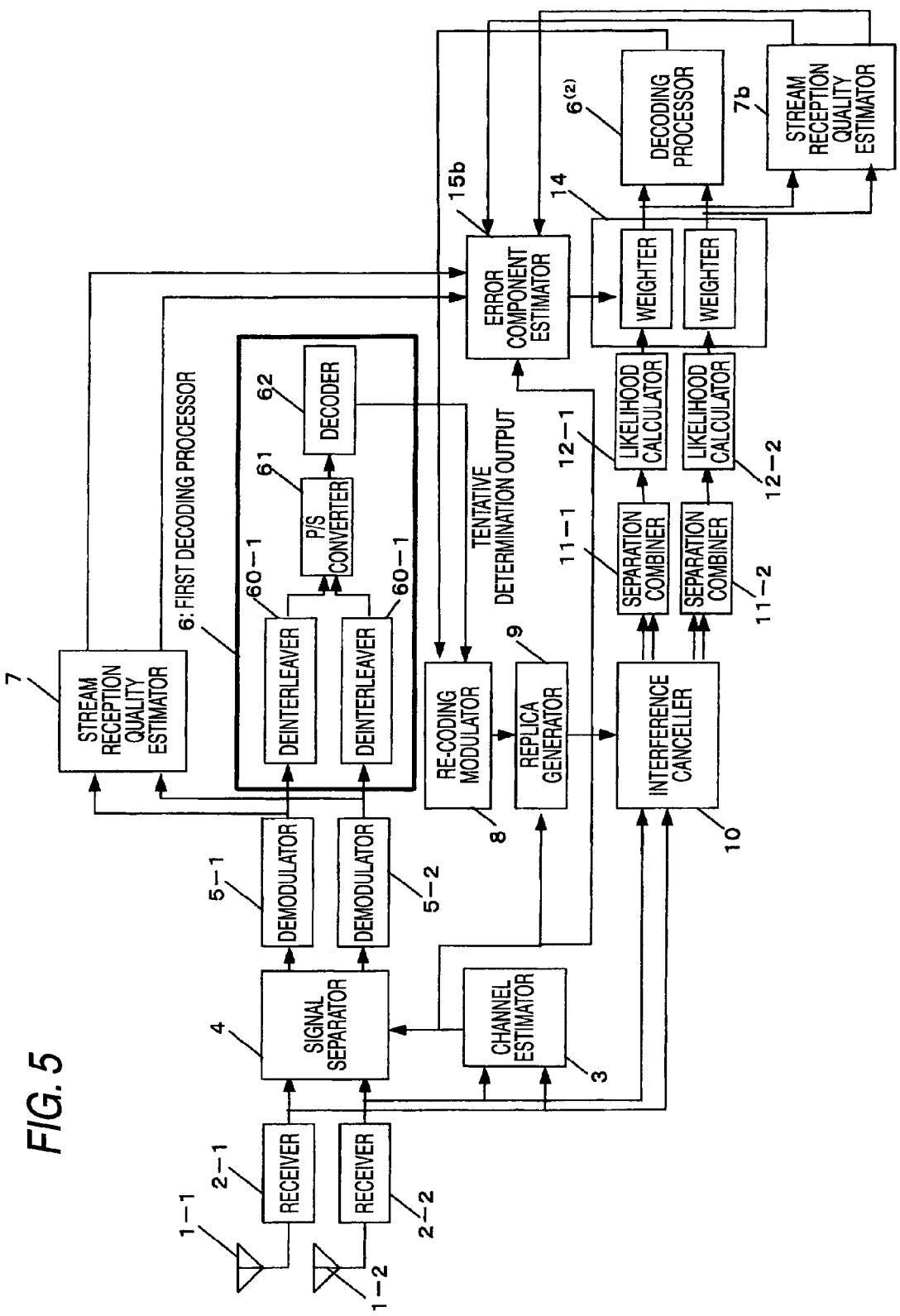
FIG. 5 is another block diagram of the wireless communication apparatus in the third embodiment of the invention.

At this time, a stream reception quality estimator 7b for estimating the stream reception quality for the output of the weighter 14 may be provided separately for outputting the estimated reception quality to an error component estimator 15b, as shown in FIG. 5.

If the decoding result from the second decoding processor $6^{(2)}$ is again input to the re-coding modulator 8, the error component estimator 15b estimates error component power based on the output of the stream reception quality estimator 7b rather than the stream reception quality estimator 7. This configuration makes it possible to estimate the error component power updated by performing repetitive processing, enhancing the improvement of the reception quality.

Figure 6:
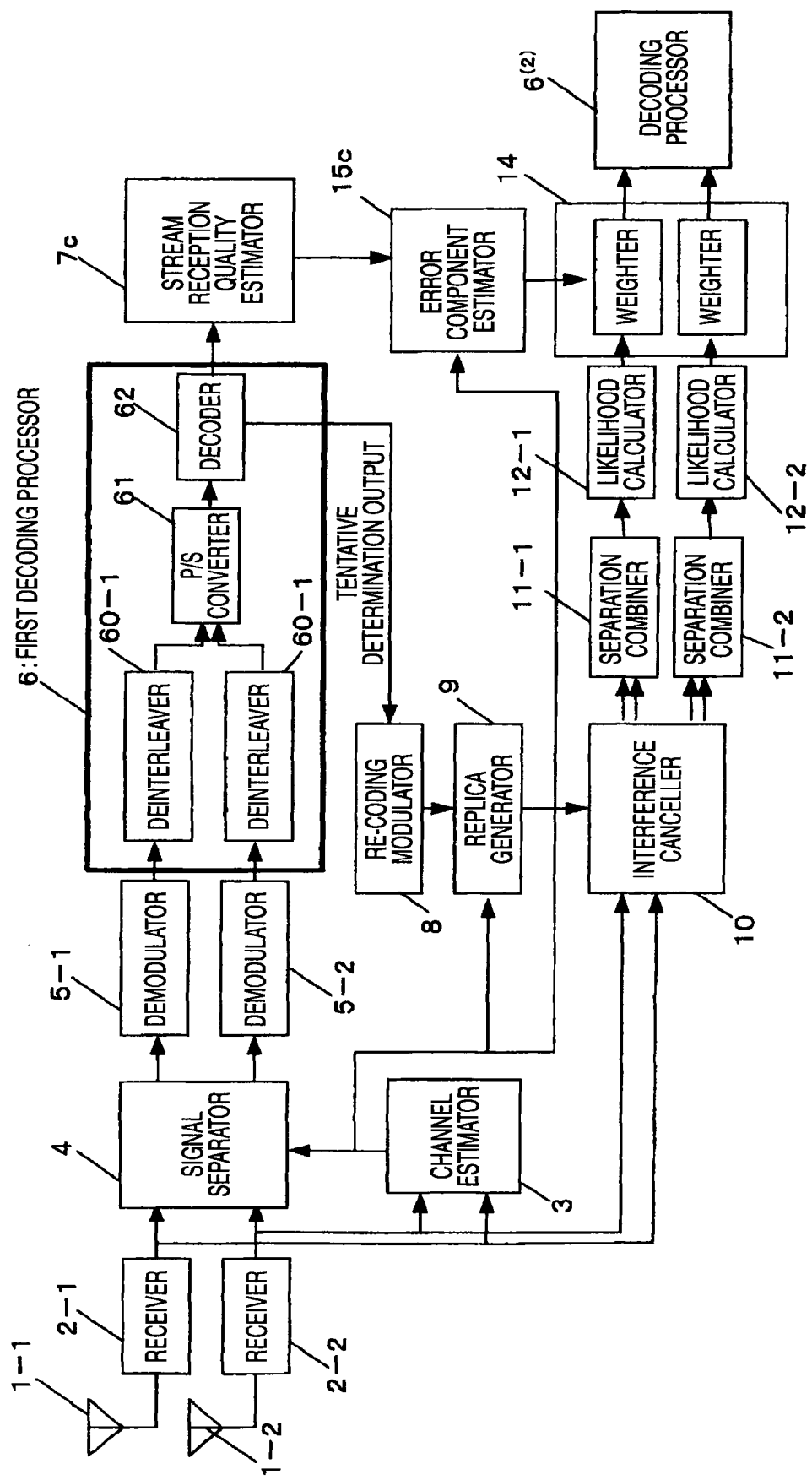
FIG. 6 is another block diagram of the wireless communication apparatus in the third embodiment of the invention.

To use a MAP (maximum a posteriori probability) decoder, a SOVA (soft output Viterbi algorithm) decoder, or a Max Log MAP decoder, for example, capable of providing likelihood information output as a soft determination value for each bit in the decoder 62, a stream reception quality estimator 7c for estimating the stream reception quality for the output of the weighter 14 using the likelihood information output for each bit from the decoder 62 may be provided separately for outputting the estimated reception quality to an error component estimator 15c, as shown in FIG. 6.

In this case, since the stream reception quality estimator 7c estimates the reception quality for each bit for the bit data series before input to the transmission path coder 31 shown in FIG. 3, conversion processing of matching the output order of the stream reception quality estimator 7c with the output order of data to be subjected to weighting processing in the weighter 14 is added.

That is, when the weighter 14 performs weighting processing for symbol data, the error component estimator 15c performs the processing shown in (expression 21) for the output of the stream reception quality estimator 7c using the output data of the stream reception quality estimator 7c for all bits contained in the symbol data. According to the configuration as described above, as the likelihood information for the tentative determination output of the decoder, the likelihood information for each bit from the decoder 62 is provided with higher accuracy and thus the accuracy of the error component estimation can be enhanced.

The configuration described in the embodiment and the error component estimator 13 in the first embodiment can also be used in combination. In this case, for the outputs of the two error component estimators 13 and 15, $d_r(k)$ shown in (expression 24) may be calculated separately in the weighter 14 and weight processing may be performed, or based on the result of further weighting and combining the outputs of the two error component estimators 13 and 15, $d_r(k)$ shown in (expression 24) may be calculated and weight processing may be performed. In this case, although the configuration becomes complicated, an error component according to a different calculation method is detected, thereby making it possible to improve the reception characteristic.

Fourth Embodiment

Figure 7:
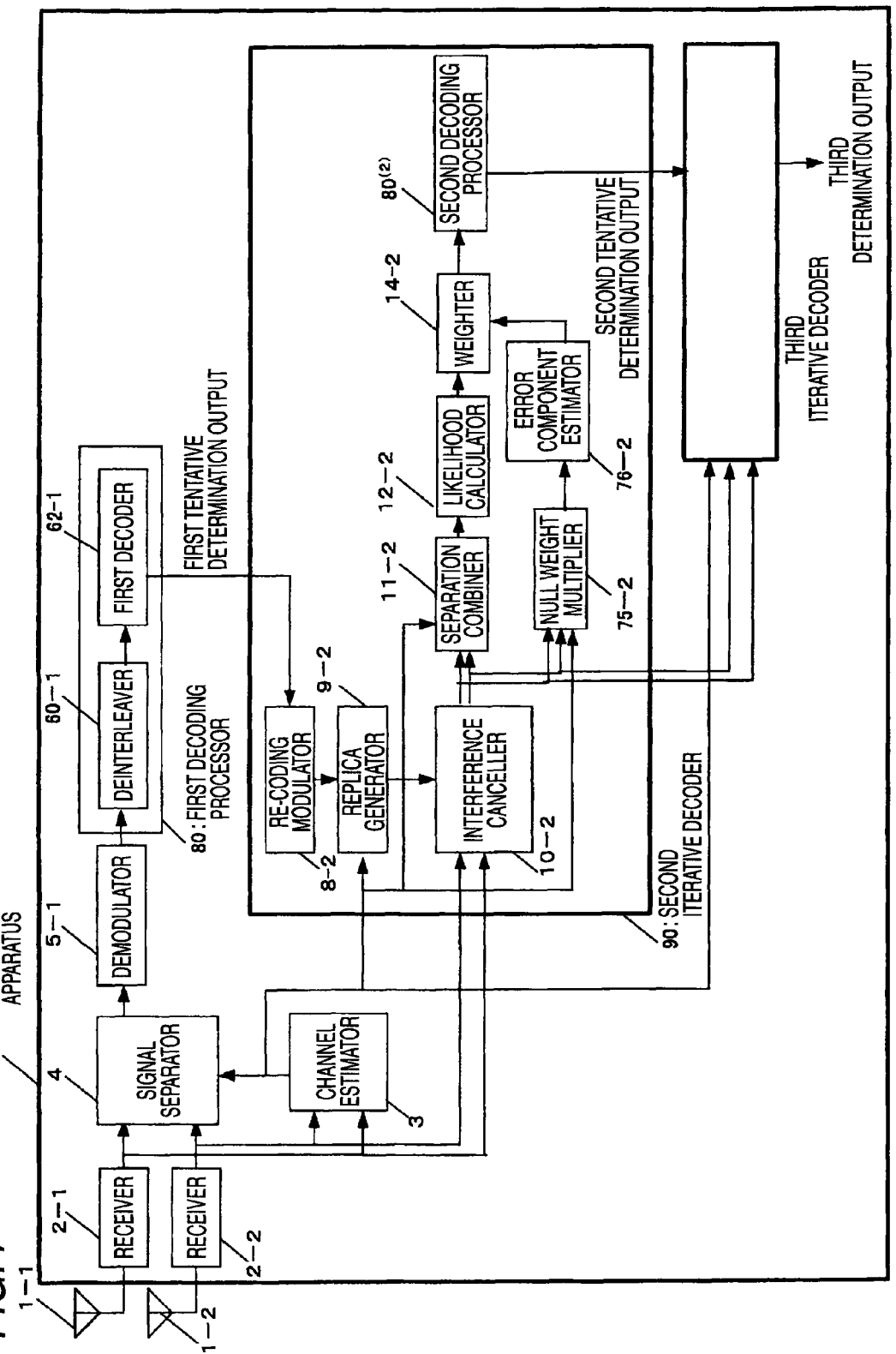
FIG. 7 is a block diagram of a wireless communication apparatus in a fourth embodiment of the invention.
Figure 8:
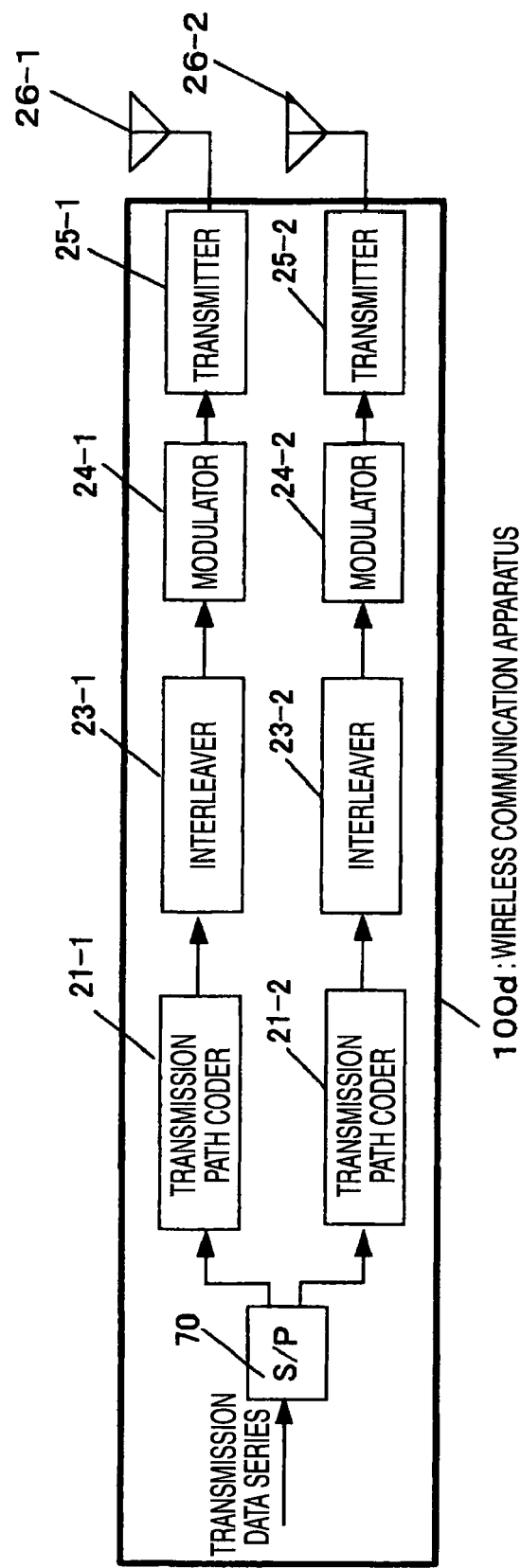
FIG. 8 is a block diagram of a transmission unit of the wireless communication apparatus in the fourth embodiment of the invention.

FIGS. 7 and 8 are diagrams to show the transmission configuration and the reception configuration of a wireless communication apparatus 100c in a fourth embodiment of the invention. Only the reception configuration is shown in the wireless communication apparatus 100c in FIG. 7, and the transmission configuration is shown in a wireless communication apparatus 100d in FIG. 8. The reception configuration in the embodiment is the configuration of using a serial interference canceller (SIC) to perform iterative decoding. The operation will be discussed below in order with FIGS. 7 and 8:

The configuration in FIG. 8 differs from the configuration in FIG. 2, the transmission configuration in the first embodiment in the following: A plurality of transmission path decoders 21 are included for performing transmission path decoding processing independently for each of spatial multiplex streams transmitted from a plurality of antennas 26. The transmission operation of the wireless communication apparatus 100d will be discussed with FIG. 8.

The wireless communication apparatus 100d transmits M spatial multiplex streams from a plurality of (M, M>1) antennas 26-1 to 26-M. FIG. 8 shows the configuration of the wireless communication apparatus 100d with M=2 by way of example, but the configuration is not limited to it. In FIG. 2, a transmission data generator (not shown) generates a bit data series z(k) to be transmitted to a receiving wireless communication apparatus where k indicates discrete time.

Serial-parallel conversion means (S/P conversion means) 70 converts bit data series z(k) output of transmission data series into as many parallel bit data series $z_m(k)$ as the number of antennas M. A transmission path coder 21-m performs error correction coding for the bit data series $z_m(k)$ at a predetermined coding ratio and outputs transmission bit data series $d_m(k)$.

An interleaver 23-m performs interleaving processing for the transmission bit data series $d_m(k)$. A modulator 24-m outputs a transmission symbol series $x_m(k)$ mapped to a modulation symbol on a complex plane made up of an I signal and a Q signal using a modulation system at a predetermined modulation order for the output of the interleaver 23-m.

A transmitter 25-m executes frequency conversion of the transmission symbol series $x_m(k)$ of a baseband signal and transmits as a high-frequency signal from the antenna 26-m where m is a natural number of M or less. The operation described above is performed for all m.

Here, the transmission symbol series at the discrete time k transmitted from the mth antenna is represented as $x_m(k)$. x(k) is the transmission symbol series at the discrete time k transmitted from a plurality of antennas (M>1). Here, x(k) is an M-dimensional column vector and the mth element is $x_m(k)$.

Next, the reception configuration of the wireless communication apparatus of the invention will be discussed. The operation of the wireless communication apparatus 100c will be discussed with FIG. 7. The operation after frequency synchronization, phase synchronization, and symbol synchronization are established will be discussed below:

Nr antennas 1-1 to 1-Nr receive a transmitted high-frequency signal where Nr is a natural number of the number of spatial multiplex streams to be transmitted, M, or more. FIG. 7 shows the case where Nr=2 by way of example, but the embodiment is not limited to it.

A receiver 2-n performs amplification and frequency conversion processing not shown for a high-frequency signal received at the antenna 1-n and then further performs orthogonal detection processing and converts the signal into a baseband signal made up of an I signal and a Q signal. Further, the baseband signal is sampled as a discrete signal using an A/D converter not shown.

Here, the I signal and the Q signal sampled at the discrete time k are represented as a reception signal $y_n(k)$ having the signals as a real component and an imaginary component. y(k) is represented as a reception signal at the antennas 1-1 to 1-Nr used for reception. y(k) is a column vector with the nth element as $y_n(k)$.

The reception signal y(k) in the wireless communication apparatus 100c provided in a flat fading propagation environment for the transmission symbol series $x_m(k)$ at the discrete time k from the wireless communication apparatus 100d can be shown as in (expression 1).

H denotes propagation path fluctuation that the transmission symbol series x(k) from the wireless communication apparatus 100d receives. The propagation path fluctuation H is a matrix with (number of antennas of wireless communication apparatus 100c, Nr) rows and (number of transmission antennas in wireless communication apparatus 100d, M) columns. Matrix element $h_{ij}$ of i row j column of the propagation path fluctuation H indicates propagation path fluctuation when a high-frequency signal transmitted from the jth transmission antenna in the wireless communication apparatus 100d is received at the ith antenna in the wireless communication apparatus 100c.

n(k) denotes a noise vector having Nr elements added at the receiving time at the Nr antennas of the wireless communication apparatus 100c and is white noise of noise power σ as shown in (expression 2). Here, $I_{Nr}$ is an Nr-order unit matrix. E[x] represents an expected value of x.

A channel estimator 3 uses a known pilot signal, etc., transmitted from the wireless communication apparatus 100d and outputs a propagation path fluctuation estimation value B of an estimation value for the propagation path fluctuation H.

Next, a signal separator 4 uses the channel estimation value B, generates a spatial demultiplexing weight for separating and receiving one spatial multiplex stream of a transmission signal spatial-multiplex-transmitted from the wireless communication apparatus 100d, and performs a multiplication operation on the reception signal y(k).

The signal separator 4 may use ordering of separating and receiving in the order of better reception SNR or better reception SINR. Information indicating that the reception characteristic can be improved accordingly is disclosed in non-patent document 3.

In the description to follow, it is assumed that the mth spatial multiplex stream is selected and is separated and received where m is a natural number of M or less. As an output signal after the multiplication operation by the signal separator 4, a signal $s_m(k)$ provided by equalizing amplitude phase fluctuation in the propagation path (hereinafter, channel equalization) is output. If the signal subjected to the channel equalization is only used, information concerning the reception signal quality is lost and thus to make up for the lost information, the signal separator 4 also outputs reception quality information $q_m(k)$ of the separated signal $s_m(k)$.

As a spatial multiplex signal separation weight $W_m$ for any desired transmission symbol series $x_m(k)$, the signal separator 4 applies a technique of ZF (Zero Focusing), MMSE (Minimum Mean Square Error), etc., for calculation. Using the spatial demultiplex weight $W_m$ thus generated, the reception signal y(k) is multiplied as shown in (expression 3), thereby providing the signal $s_m(k)$ wherein the interference signal component from any other spatial multiplex stream has been removed.

$W_m$ represents a column vector having Nr elements and T represents vector transposition. The output signal $s_m(k)$ of the signal separator 4 is a symbol series of the reception result (hereinafter, reception symbol series) for a transmission symbol series, subjected to symbol mapping using a modulation system at a predetermined multi-level modulation in the modulator 24 in the transmitting unit.

$W_m$ when the ZF technique is used can be represented by an inverse matrix of the propagation path fluctuation estimation value B as shown in (expression 4). When Nr>M, a pseudo inverse matrix of the propagation path fluctuation estimation value B is used for $W_m$. For the reception quality information $q_m(k)$, reception SNR or reception SINR of reception symbol series $s_m(k)$ provided by signal separation is used. The reception SNR or reception SINR can be converted using the spatial demultiplex weight $W_m$. In the ZF technique, as the reception quality information $q_m(k)$, a value based on the reception SNR standard can be calculated as shown in (expression 5).

Next, a demodulator 5-$m$ performs demapping processing of converting the reception symbol series $s_m(k)$ output by the signal separator 4 into a bit data string made up of bit strings. The demodulator 5-$m$ calculates log likelihood ratio LLR as the likelihood information for each bit.

That is, the demodulator 5-$m$ calculates log likelihood ratio $LLR_{m,i}(k)$ of the ith bit in the reception symbol series $s_m(k)$ using (expression 6) where L denotes modulation order used at the transmitting time and $s_c^{(bi=A)}$ denotes a set of symbol candidates with the ith bit being A, of the symbol candidates used at the symbol mapping time. Here, A is 0 or 1 and i is a natural number of $\log_2(L)$ or less. m is a natural number of M or less.

Output of the demodulator 5-$m$ is input to a first decoding processor 80. The first decoding processor 80 is made up of a deinterleaver 60-$m$ and a first decoder 62-$m$. The operation of the first decoding processor will be discussed below:

The deinterleaver 60-$m$ converts the bit data order by performing inverse operation to interleave performed in the transmitting unit for output of likelihood information for each bit (hereinafter, bit likelihood series) output from the demodulator 5-$m$.

The first decoder 62-$m$ performs error correction decoding processing for the bit likelihood series of a soft determination value output from the deinterleaver 60-$m$ and outputs bit data tentatively determined with a binary hard determination value as a tentative determination bit string $b_m(k)$ for the transmission bit data series.

A second iterative decoder 90 is made up of a re-coding modulator 8-2, a replica generator 9-2, an interference canceller 10-2, a separation combiner 11-2, a likelihood calculator 12-2, a null weight multiplier 75-2, an error component estimator 76-2, a weighter 14-2, and a second decoding processor 80$^{(2)}$, and operates as follows:

To regenerate transmission symbol data based on the tentative determination bit string $b_m(k)$, the re-coding modulator 8-2 includes a transmission path coder, an interleaver, and a modulator not shown and performs the following processing:

To being with, the transmission path coder performs error correction coding for the tentative determination bit string b(k) at the predetermined coding ratio and according to the error correcting system used at the transmitting time and outputs as tentative determination transmission bit data series $d^{[1]}_m(k)$.

Then, the interleaver having the same interleave pattern used at the transmitting time performs interleaving processing for the tentative determination transmission bit data series $d^{[1]}_m(k)$. The modulator outputs a tentative determination transmission symbol series $x^{[1]}_m(k)$ mapped to a modulation symbol on a complex plane made up of an I signal and a Q signal using the predetermined multi-level modulation used at the transmitting time for the output of the interleaver where m is a natural number of M or less.

The replica generator 9-2 generates a replica signal $y_m^{[1]}(k)$ of the reception signal y(k) as shown in (expression 26) using the tentative determination transmission symbol series $x^{[1]}_m(k)$ output by the re-coding modulator 8-2 and the channel estimation value B output by the channel estimator 3. Here, $b_m$ represents the mth column vector in the channel estimation value B.

$$y_m^{[1]}(k) = b_m x^{[1]}_m(k) \qquad \text{[Expression 26]}$$

The interference canceller 10-2 assumes that the mth spatial multiplex stream is an interference signal, removes the spatial multiplex stream from the reception signal y(k) output by the receiver 2, and outputs an interference cancel signal $v_1(k)$ with removed interference of the mth spatial multiplex stream. That is, the interference canceller 10-2 calculates interference cancel output $v_1(k)$ as shown in (expression 27). The interference cancel output $v_1(k)$ is a column vector having Nr elements.

$$v_1(k) = y(k) - y_m^{[1]}(k) \qquad \text{[Expression 27]}$$

The following different operation is executed according to the case where the interference cancel output contains 1) only one spatial multiplex stream or 2) a plurality of spatial multiplex streams:

1) When only one spatial multiplex stream is contained:

The separation combiner 11-2 combines the interference cancel output $v_1(k)$ and outputs. As a combining technique of the interference cancel output, maximum ratio combining (MRC combining), MMSE combining (least square error combining), etc., can be applied. To apply the maximum ratio combining technique, combined output $u_r(k)$ for any desired rth spatial multiplex stream is calculated as in (expression 28) where $b_r$ represents the rth column vector in the channel estimation value B and superscript H represents vector conjugate transposition. Here, r is a natural number of M or less.

$$u_r(k) = b_r^H v_1(k) \qquad \text{[Expression 28]}$$

2) When the interference cancel output contains a plurality of spatial multiplex streams:

The separation combiner 11-2 again performs signal separation processing for a plurality of spatial multiplex streams except the mth spatial multiplex stream removed as interference. At this time, a new channel estimation value $B_1$ wherein the channel estimation component with interference removed is used.

That is, the channel estimation value $B_1$ is a matrix with Nr rows (M−1) columns except the mth column vector of the channel estimation value B. The separation combiner 11-2 uses the obtained channel estimation value $B_1$, generates a spatial demultiplexing weight for separating and receiving one spatial multiplex stream of a transmission signal spatial-multiplex-transmitted from the wireless communication apparatus 100*d*, and performs a multiplication operation on the reception signal y(k) like the signal separator 4.

The separation combiner 11-2 may use ordering of separating and receiving in the order of better reception SNR or better reception SINR. In the description to follow, it is assumed that the rth spatial multiplex stream is selected and is separated and received where r is a natural number of M or less. The mth spatial multiplex stream removed as interference is excluded.

As an output signal after the multiplication operation, a signal $s_r(k)$ provided by equalizing amplitude phase fluctuation in the propagation path (hereinafter, channel equalization) is output. If the signal subjected to the channel equalization is only used, information concerning the reception signal quality is lost and to make up for the lost information, reception quality information $q_r(k)$ of the separated signal $s_r(k)$ is also output.

The likelihood calculator 12-2 performs demapping processing of converting the combined output symbol data series $u_r(k)$ output by the separation combiner 11-2 into a bit data string made up of bit strings. At the time of converting into the bit string, the log likelihood ratio LLR for each bit is calculated as with the demodulator 5.

That is, log likelihood ratio $LLR_{r,i}(k)$ as in (expression 29) is calculated as reliability information in the ith bit for the combined output symbol series $u_r(k)$. Here, L denotes modulation order used at the transmitting time and $s_c^{(bi=A)}$ denotes a set of symbol candidates with the ith bit being A, of the symbol candidates used at the symbol mapping time. Here, A is 0 or 1 and i is a natural number of $\log_2(L)$ or less. br is the rth column vector in the channel estimation value B, and r is a natural number of M or less.

(Expression 29) is described assuming that the maximum ratio combining technique is applied in the separation combiner 11-2. That is, the reception quality information $q_m(k)$ uses the SNR standard. Noise power in the antennas is common and is omitted. Weighting by reception power $\|br\|^2$ by MRC combining for the rth spatial multiplex stream is performed. $\|x\|^2$ denotes the norm for a vector x.

$$LLR_{r,i}(k) = \|b_r\|^2 \left[ \min_{c \in L} \left| \frac{u_r(k)}{\|b_r\|^2} - s_c^{(bi=0)} \right|^2 - \min_{c \in L} \left| \frac{u_r(k)}{\|b_r\|^2} - s_c^{(bi=1)} \right|^2 \right]$$ [Expression 29]

The null weight multiplier 75-2 uses the spatial demultiplex weight $W_m$ used in separating and receiving the mth spatial multiplex stream used in the signal separator 4 and multiplies by the interference cancel output $v_1(k)$ as shown in (expression 30).

$$g_1 = W_m^T v_1(k) = W_m^T [y(k) - y_m^{[1]}(k)]$$ [Expression 30]

(Expression 30) is an expression not considering reception power of the mth spatial multiplex stream by assuming that the accuracy of the channel estimation value is sufficiently provided; as another method, $g_1 = \|b_m\|^2 W_m^T v_1(k)$ containing reception power of the spatial demultiplex weight, $\|b_m\|^2$, used in separating and receiving may be used in place of (expression 30). In this case, if the channel estimation value contains an error, detection containing the error component is made possible and thus the expression becomes more effective than (expression 30).

The error component estimator 76-2 estimates an error component $E_1(k)$ of the replica signal in the interference canceller 10 based on the output of the null weight multiplier 75-2. That is, the square of the absolute value of the output $g_1$ of the null weight multiplier 75 is calculated as shown in (expression 31).

$$E_1(k) = |g_1|^2$$ [Expression 31]

Here, in the calculated error component $E_1(k)$ of the replica signal, in addition to the component of noise power σ, the following interference noise power components for the symbol data series every discrete time k can be detected:

1) When tentative determination output with determination error in first decoder 62-1 is contained: Interference noise power component remaining as an interference signal residual component without removal of interference signal component in the interference cancel operation of the interference canceller 10 because an error occurs in the replica signal $y_m^{[1]}(k)$ component generated in the replica generator 9.

2) When channel estimation error or channel fluctuation error caused by propagation path fluctuation is contained: Interference noise power component remaining as an interference signal residual component without removal of interference signal component in the interference cancel operation of the interference canceller 10 because an error occurs in the channel estimation value component $b_m$ of the replica signal $y_m^{[1]}(k)$ generated in the replica generator 9.

3) When phase fluctuation error caused by hardware error (carrier frequency error, sampling frequency error) is contained, interference noise power component remaining as an interference signal residual component without removal of interference signal component in the interference cancel operation of the interference canceller 10 because an error occurs in the channel estimation value component $b_m$ of the replica signal $y_m^{[1]}(k)$ generated in the replica generator 9.

The weighter 14-2 makes a correction responsive to the error component to the bit likelihood series for the rth spatial multiplex symbol output by the likelihood calculator 12-*r* based on the output of the error component estimator 76-2.

That is, a correction bit likelihood series $LLR^{[1]}_{r,i}(k)$ as shown in (expression 32) is calculated. Here, d(k) can be represented as a function value with noise power σ added at the receiving time of the wireless communication apparatus 100*c* and the output of the error component estimator 76-2 as parameters as shown in (expression 33); in the function format, the larger the error component E(k) of the replica signal, the smaller d(k) made. A function shown in (expression 34) is used by way of example.

$$LLR^{[1]}_{r,i}(k) = d(k) LLR_{r,i}(k)$$ [Expression 32]

$$d(k) = f(E(k), \sigma)$$ [Expression 33]

$$d(k) = \begin{cases} \left(\frac{E(k)}{\sigma}\right)^{-\frac{1}{2}}, & \text{when } E(k) > \sigma \\ 1, & \text{when } E(k) \leq \sigma \end{cases}$$ [Expression 34]

The output of the weighter 14-2 is input to the second decoding processor 80[(2)]. The second decoding processor 80[(2)] is made up of a deinterleaver 60[(2)]-2 and a second decoder 62[(2)]; this configuration is similar to that of the first decoding processor 80 and therefore will not be discussed again in detail. Finally, the second decoder 62[(2)] performs error correction decoding processing for the bit likelihood series output from the deinterleaver 60[(2)]-2 and outputs a binary hard determination value as the decoding result of the transmission bit data series.

If the number of spatial multiplex streams is M, the wireless communication apparatus of the invention has (M−1) iterative decoders of the second iterative decoder 90 to M−1st iterative decoder. The operation of the second iterative decoder 90 is as described above. The nth iterative decoder 90-$n$ operates as follows: Here, n is a natural number ranging from 3 to M−1.

To regenerate transmission symbol data based on the tentative determination bit string for the mth spatial multiplex stream output by the n−1st iterative decoder, a re-coding modulator 8-$n$ includes a transmission path coder, an interleaver, and a modulator not shown and performs the following processing:

To being with, the transmission path coder performs error correction coding for the tentative determination bit string at the predetermined coding ratio and according to the error correcting system used at the transmitting time and outputs as tentative determination transmission bit data series $d^{[n-1]}_m(k)$. Then, the interleaver having the same interleave pattern used at the transmitting time performs interleaving processing for the tentative determination transmission bit data series $d^{[n-1]}_m(k)$.

The modulator outputs a tentative determination transmission symbol series $x^{[n-1]}_m(k)$ mapped to a modulation symbol on a complex plane made up of an I signal and a Q signal using the predetermined multi-level modulation used at the transmitting time for the output of the interleaver where m is a natural number of M or less.

A replica generator 9-$n$ generates a replica signal $y_m^{[1]}(k)$ of the reception signal y(k) as shown in (expression 35) using the tentative determination transmission symbol series $x^{[n-1]}_m(k)$ output by the re-coding modulator 8-$n$ and the channel estimation value B output by the channel estimator 3. Here, $b_m$ represents the mth column vector in the channel estimation value B.

$$y_m^{[n-1]}(k) = b_m x^{[n-1]}(k) \quad \text{[Expression 35]}$$

An interference canceller 10-$n$ assumes that the mth spatial multiplex stream is an interference signal, removes the spatial multiplex stream from $v_{n-1}(k)$ output by an interference canceller 10-$(n-1)$ of the n−1st iterative decoder, and outputs an interference cancel signal $v_n(k)$ with removed interference of the mth spatial multiplex stream.

That is, interference cancel output $v_n(k)$ is calculated as shown in (expression 36). The interference cancel output $v_n(k)$ is a column vector having Nr elements. Here, n−1 spatial multiplex streams are removed as interference by the interference canceller 10-2 of the second iterative decoder to the interference canceller 10-$n$ of the nth iterative decoder and the interference cancel output $v_n(k)$ contains M−(n−1) spatial multiplex streams.

$$v_n(k) = v_{n-1}(k) - y_m^{[1]}(k) \quad \text{[Expression 36]}$$

The following different operation is executed according to the case where the interference cancel output contains 1) only one spatial multiplex stream or 2) a plurality of spatial multiplex streams:

1) When only one spatial multiplex stream is contained: A separation combiner 11-$n$ combines the interference cancel output $v_n(k)$ and outputs. As a combining technique of the interference cancel output, maximum ratio combining (MRC combining), MMSE combining (least square error combining), etc., can be applied. To apply the maximum ratio combining technique, combined output $u_r(k)$ for any desired rth spatial multiplex stream is calculated as in (expression 37) where $b_r$ represents the rth column vector in the channel estimation value B and superscript H represents vector conjugate transposition. Here, r is a natural number of M or less.

$$u_r(k) = b_r^H v_n(k) \quad \text{[Expression 37]}$$

2) When the interference cancel output contains a plurality of spatial multiplex streams: The separation combiner 11-$n$ again performs signal separation processing for a plurality of spatial multiplex streams except the spatial multiplex stream already removed as interference. At this time, a new channel estimation value $B_n$ wherein the channel estimation component of the spatial multiplex stream removed by the interference canceller is removed is used.

That is, if the mth spatial multiplex stream is removed, the corresponding mth column vector is deleted from the channel estimation value B. Therefore, $B_n$ is a matrix with Nr rows (M−n+1) columns.

Using the obtained channel estimation value $B_n$, a spatial demultiplexing weight for separating and receiving one spatial multiplex stream of a transmission signal spatial-multiplex-transmitted from the wireless communication apparatus 100$d$ is generated and a multiplication operation is performed on the output $v_n(k)$ of the interference canceller 10-$n$ like the signal separator.

Ordering of separating and receiving in the order of better reception SNR or better reception SINR may be used. In the description to follow, it is assumed that the rth spatial multiplex stream is selected and is separated and received where r is a natural number of M or less. The index of the spatial multiplex stream already removed as interference is excluded.

As an output signal after the multiplication operation, a signal $s_r(k)$ provided by equalizing amplitude phase fluctuation in the propagation path (hereinafter, channel equalization) is output. If the signal subjected to the channel equalization is only used, information concerning the reception signal quality is lost and to make up for the lost information, reception quality information $q_r(k)$ of the separated signal $s_r(k)$ is also output.

A likelihood calculator 12-$n$ performs demapping processing of converting the combined output symbol data series $u_r(k)$ output by the separation combiner 11-$n$ into a bit data string made up of bit strings. At the time of converting into the bit string, the log likelihood ratio LLR for each bit is calculated as with the demodulator 5. Null weight multiplier uses the spatial demultiplex weight $W_m$ used in separating and receiving the mth spatial multiplex stream used in the separation combiner 10-$(n-1)$ and multiplies by the interference cancel output $v_n(k)$ as shown in (expression 38).

$$g_n = W_m^T v_n(k) = W_m^T [v_{n-1}(k) - y_m^{[n]}(k)] \quad \text{[Expression 38]}$$

As another operation of the null weight multiplier, the spatial demultiplex weight $W_m$ for separating and receiving the mth spatial multiplex stream when all spatial multiplex streams exist is calculated using the channel estimation value B and is multiplied by the reception signal y(k) as shown in (expression 39).

In this case, the output $v_n(k)$ of the interference canceller 10-$n$ performed successively contains an error of replica generation of a plurality of spatial multiplex streams, but a more accurate error component can be estimated by using the reception signal y(k) in (expression 39).

$$g_n = W_m^T [y(k) - y_m^{[n]}(k)] \quad \text{[Expression 39]}$$

Error component estimator estimates an error component $E_1(k)$ of the replica signal in the interference canceller 10 based on the output of the null weight multiplier. That is, the square of the absolute value of the output $g_1$ of the null weight multiplier is calculated.

A weighter 14-$n$ makes a correction responsive to the error component to the bit likelihood series for the rth spatial multiplex symbol output by the likelihood calculator 12-$n$ based on the output of the error component estimator 13-$n$.

The output of the weighter 14-$n$ is input to an nth decoding processor $80^{(n)}$. The nth decoding processor $80^{(n)}$ is made up of a deinterleaver $60^{(n)}$ and an n+1st decoder $62^{(n)}$; this configuration is similar to that of the first decoding processor 80 and therefore will not be discussed again in detail.

As the operation described above is performed, in the embodiment, the weighter 14-2 corrects the likelihood information for the spatial multiplex signal separated and combined after interference cancel based on the output of the error component estimator 76-2 for performing the operation of detecting interference noise power using the reception signal, the replica signal, and the spatial demultiplex weight in the signal separator as the error component at the interference canceling time.

Accordingly, at the interference canceling time, if tentative determination output with a determination error is contained or if interference noise power caused by an error cause of a channel estimation error, a channel fluctuation error, etc., is contained noticeably, the bit likelihood for the reception symbol can be lessened and consequently degradation of the reception characteristic can be suppressed by performing the error correction decoding processing using the bit likelihood.

In the embodiment, the configuration of the hard canceller with the tentative determination value as a binary hard determination value can be made simpler than that of a soft canceller using a soft determination value and a wireless communication apparatus having a good reception characteristic can be provided.

In the embodiment, the output of the Mth decoding processor is produced as the decoding result for the final transmission bit data series, but the output may be again input to the re-coding modulator 8-2 and then processing similar to that described above may be repeated in the re-coding modulator 8-2, the replica generator 9-2, the interference canceller 10-2, the error component estimator 76-2, the separation combiner 11-2, the likelihood calculator 12-2, the weighter 14-2, and the second decoding processor $80^{(2)}$. As the processing is repeated, a processing delay grows, but the error correction effect of the decoder is enhanced and the effect of improving the reception characteristic is provided.

In the embodiment, the configuration having a plurality of transmission path coders 21 as shown in FIG. 8 is shown as the configuration of the transmitting unit, but the embodiment is not limited to it; the invention can also be applied to the case where one transmission path coder 21 is included as shown in FIG. 2. That is, it can be applied in a similar manner by producing first tentative determination output using the likelihood information for each symbol output by the decoder 5 and the nth tentative determination output using the likelihood information for each symbol in the nth likelihood calculator 12-$n$.

In the embodiment described above, the configuration of the wireless communication apparatus for conducting wireless communications using the single carrier modulation system has been described, but the embodiment can also be applied to a wireless communication apparatus using a multicarrier modulation system. Particularly, to perform spatial multiplex transmission, a multicarrier modulation system using OFDM (Orthogonal frequency division multiplexing) is often used. In the multicarrier modulation system, if the multipath delay of a wireless propagation path is within the guard interval time, the propagation path fluctuation that each subcarrier receives can be handed as flat fading and thus multipath equalization processing becomes unnecessary and separation processing of the spatial-multiplex-transmitted signal can be decreased.

The multicarrier modulation system is a transmission system using a plurality of subcarriers and an input data signal to each subcarrier is modulated as M value QAM modulation, etc., and becomes a subcarrier signal. In the OFDM, the frequencies of the subcarriers involve orthogonal relationship and the subcarriers different in frequency are converted in batch using a fast Fourier transform circuit into a time base signal and frequency conversion to a carrier frequency band is executed and the signal is transmitted from the antenna.

On the other hand, at the receiving time, frequency conversion of the signal received at the antenna to a base band signal is executed and OFDM demodulation processing is performed. When such frequency conversion operation is performed, phase noise is added to the reception signal. A carrier frequency error between transmission and reception can be suppressed by an automatic frequency control (AFC) circuit, but a residual carrier frequency error of the error component remains. To use M value QAM for subcarrier modulation, a determination circuit makes a data determination with the absolute phase as the reference at the demodulating time and thus if phase rotation caused by a residual carrier frequency error or phase noise is received, a determination error is caused to occur and the reception characteristic is degraded.

As a compensation circuit for such phase rotation, a phase tracking circuit for transmitting a known pilot subcarrier signal, detecting the phase rotation amount of the pilot subcarrier (PSC) at the receiving time, and making phase compensation is generally used.

Figure 12:
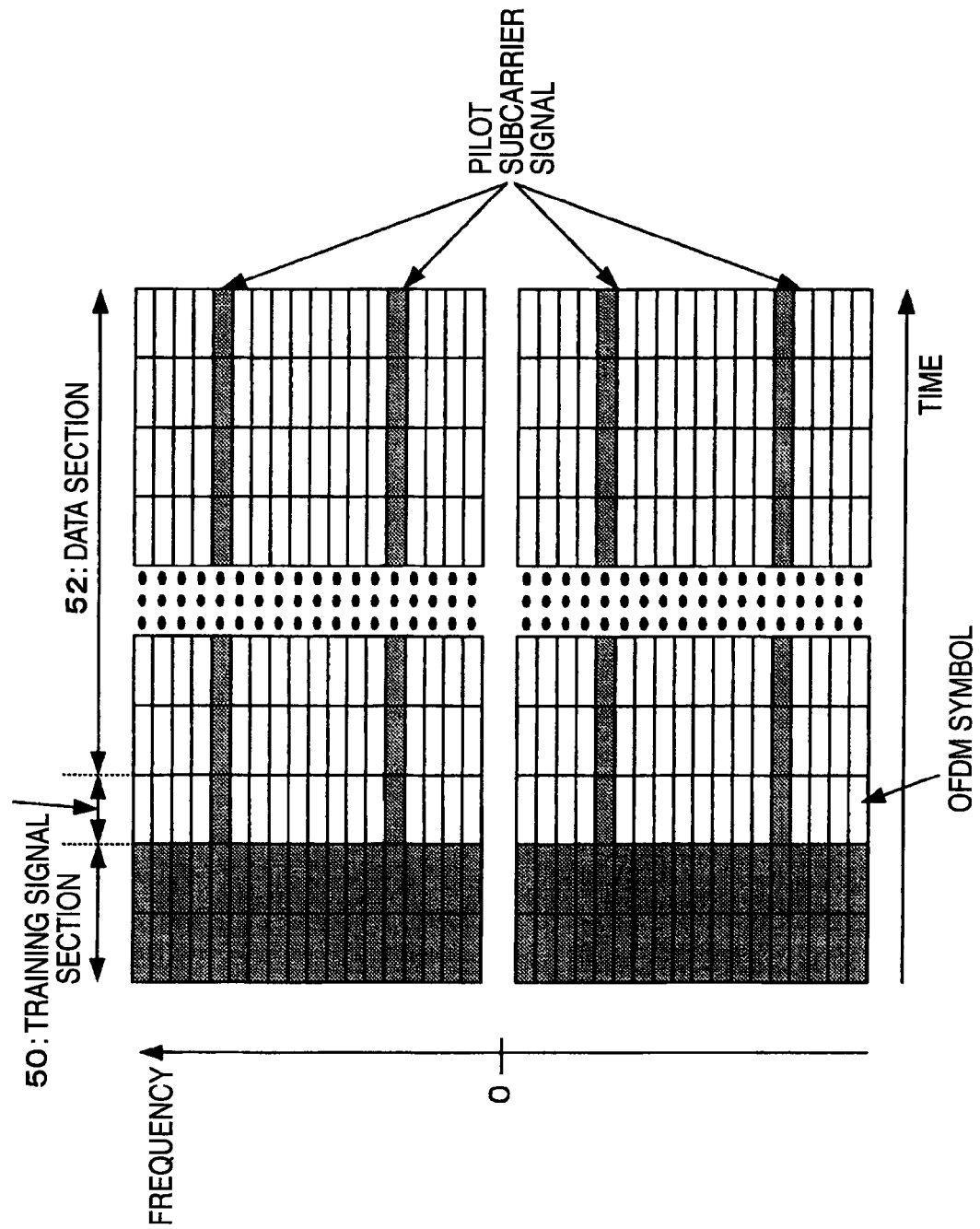
FIG. 12 is a drawing to show an example of the transmission frame format containing a pilot subcarrier signal.

FIG. 12 shows an example of the transmission frame format containing a pilot subcarrier signal. As shown in FIG. 12, the transmission frame is made up of a training signal section 50, a signaling section 51, and a data section 52. In the data section 52, a PSC signal is contained in a specific subcarrier.

Figure 13:
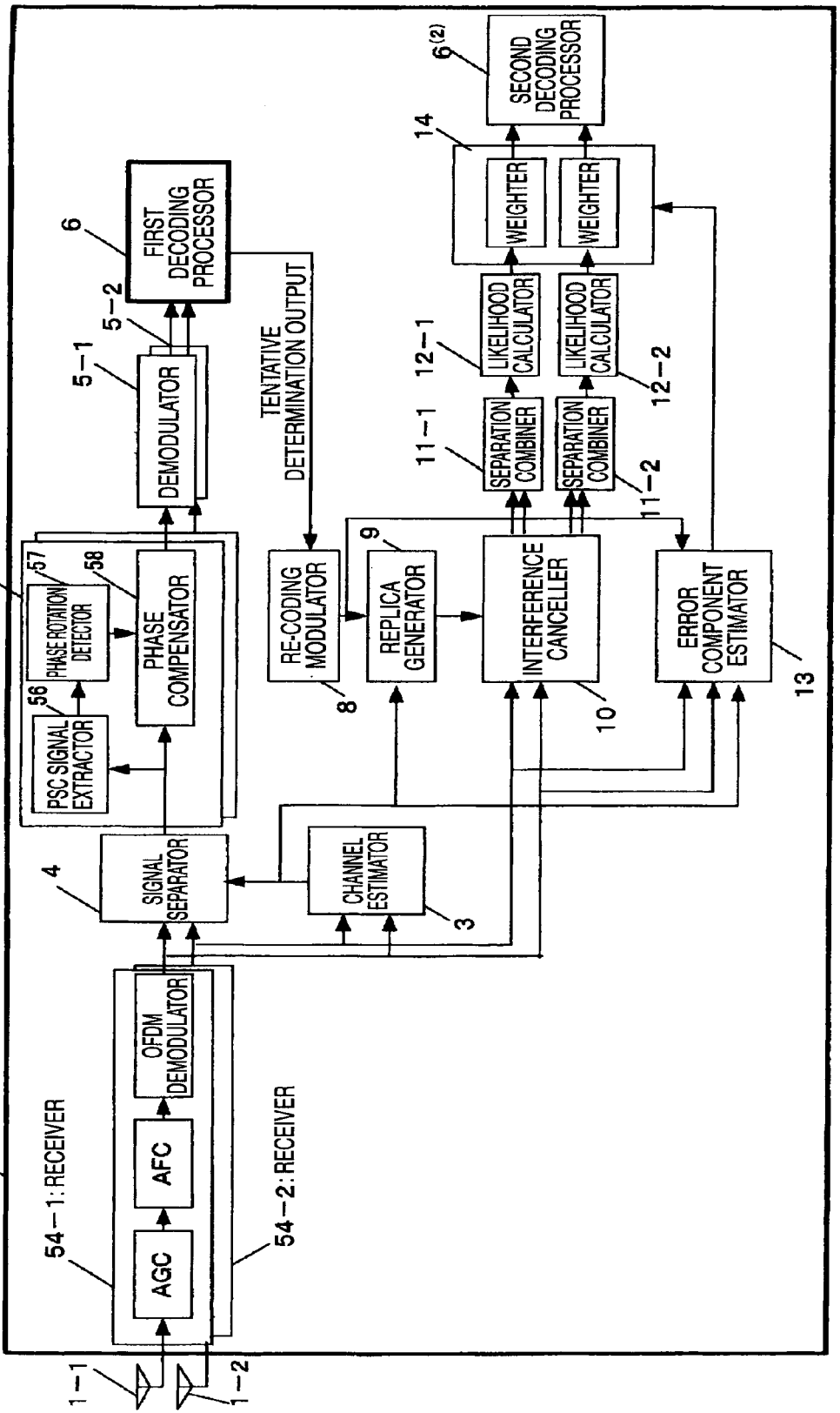
FIG. 13 is a diagram to show the configuration of the wireless communication apparatus including a phase tracking circuit in the embodiments of the invention.

FIG. 13 is a diagram to show the configuration of a wireless communication apparatus 100$j$ in the embodiment of the invention including the phase tracking circuit 55 described above. In FIG. 13, the operation of a receiver 54 and the phase tracking circuit 55 of portions for operating different from the components in FIG. 1, namely, newly added and changed components will be discussed. The wireless communication apparatus 100$j$ operates in the receiver 54 as follows for a signal OFDM-modulated and transmitted in the transmission frame format as in FIG. 12: First, using the reception signal of the training signal section 50, 1) automatic gain control (AGC) is performed, thereby making the reception signal level appropriate. 2) Subsequently, frequency error correction is made by automatic frequency control (AFC) and then OFDM demodulation processing is performed in an OFDM demodulator. Information concerning the OFDM modulation and the OFDM demodulation is disclosed in a document (Ochi, "OFDM System Technology AND MATLAB Simulation Description," published by Triceps) and will not be discussed again in detail. The OFDM demodulator outputs symbol data for each subcarrier. The channel estimator 3 calculates the channel estimation value indicating propagation path fluctuation for each subcarrier. The signal separator 4 performs signal separation processing based on the channel estimation value for each subcarrier.

Next, the subcarrier phase tracking circuit 55 inputs the signal of the data section subjected to channel equalization in the signal separator 4 and operates as follows: First, a PSC signal extractor 56 extracts a PSC signal from the equalized subcarrier signal of the data section. Subsequently, a phase rotation detector 57 detects phase rotation of the subcarrier signal after channel equalization from the extracted PSC signal and the replica signal of the PSC signal. A phase compensator 58 compensates for the detected phase rotation for the subcarrier signal of the data section subjected to channel equalization and outputs the signal to the following decoder 5. The decoder 5 determines a transmission symbol from a symbol data string based on a predetermined modulation system based on information provided in the signaling section, namely, coding modulation information of a transmission stream, performs demapping processing of converting into a bit data string, and outputs likelihood information for each bit at the same time. Using the output result of the decoder 5, a first decoding processor 6 performs deinterleaver processing of restoring the bit order by performing the inverse operation to the interleave performed in the transmitting unit, error correction decoding processing for the input bit data string, etc., and performs reception processing of restoring the transmission bit series, thereby providing tentative determination output. The deinterleaver contains interleaving for a bit data string across different subcarriers, thereby enhancing the frequency diversity effect. In the subsequent processing, the operation in the embodiment described above is executed for each subcarrier, so that similar advantages to those of the embodiment described above can also be provided for the multicarrier modulation system like the single carrier modulation system.

As the operation as described above is executed, phase rotation changing with time, caused by a residual carrier frequency error caused by an AFC error, a sampling clock error in an analog-digital converter (A/D), or the like occurs, but the phase tracking circuit 55 is used, whereby it is made possible to execute phase compensation following the phase rotation with a predetermined level accuracy and synchronous detection can be made stably. If the size of the data section is long, if the reception power is small, etc., the residual phase compensation error that cannot be corrected in the phase tracking circuit 55 may become a size that cannot be ignored. In such a case, in the wireless communication apparatus in the related art, remarkable degradation of the reception characteristic occurs. On the other hand, in the configuration of the embodiment, the likelihood calculator 13 can perform likelihood weighting for each subcarrier responsive to the size of the remaining phase compensation error. Accordingly, the second decoding processor $6^{(2)}$ performs error correction decoding, whereby the error correction capability can be enhanced and degradation of the reception characteristic can be suppressed. Accordingly, the reception quality of the wireless communication apparatus can be improved.

Figure 14:
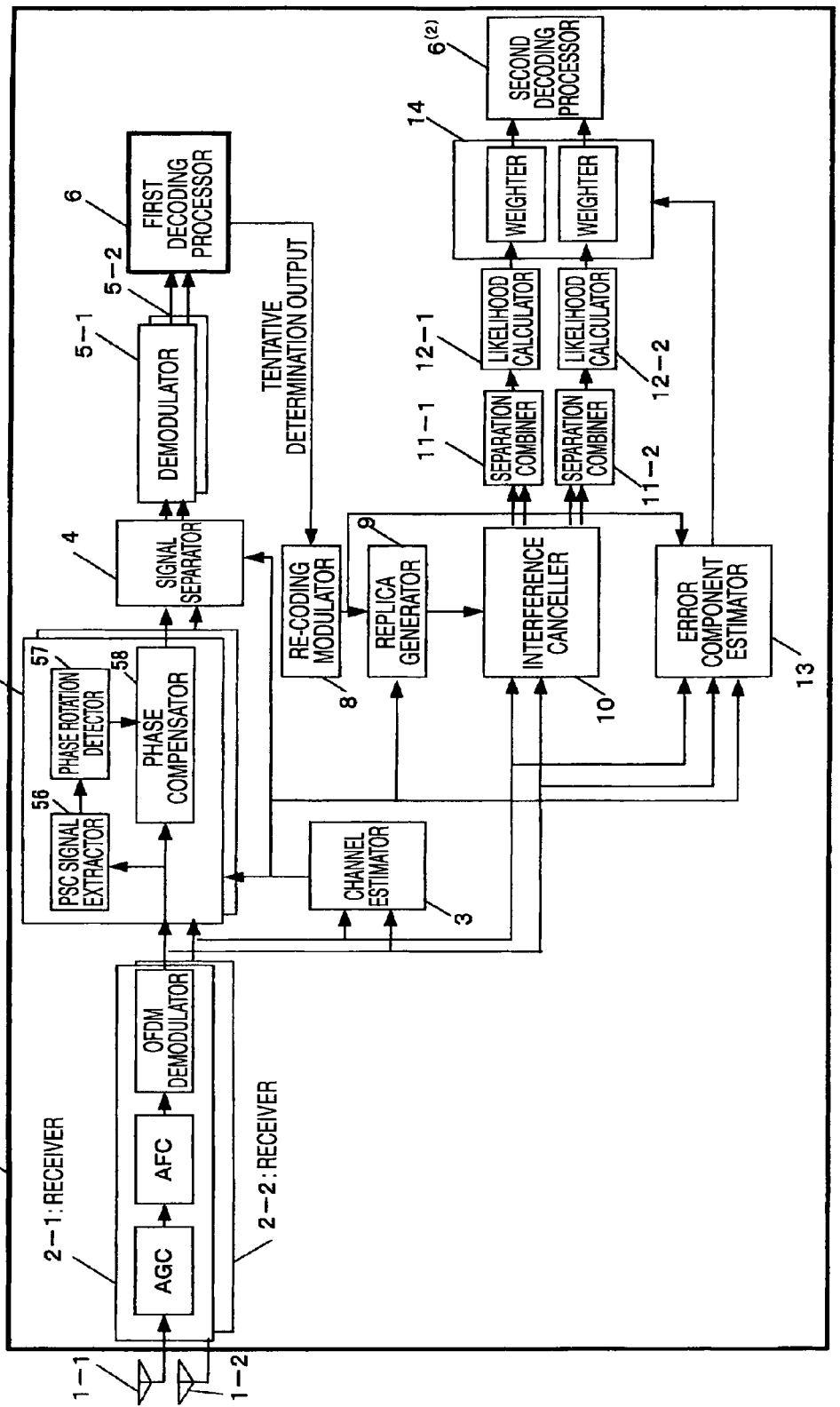
FIG. 14 is a diagram to show another configuration of the wireless communication apparatus including a phase tracking circuit in the embodiments of the invention.

The placement of the signal separator 4 and the subcarrier phase tracking circuit 55 in FIG. 13 may be replaced with placement as shown in FIG. 14. If a plurality of spatial multiplex streams are transmitted, a PSC signal also received in a multiplexed state and thus the subcarrier phase tracking circuit 55 operates as follows: The phase rotation detector 57 generates a new phase tracking reference signal based on the output of the channel estimator 3 and the output of the PSC signal extractor 56 and detects phase rotation. The phase compensator 58 compensates for the detected phase rotation. Detailed description of the configuration and operation is omitted.

The wireless communication apparatus of the embodiment of the invention described above makes possible spatial multiplex transmission capable of providing a sufficient reception diversity gain and is useful for a wireless communication field of a wireless base station apparatus for performing spatial multiplex transmission with a plurality of wireless communication apparatus containing a wireless communication apparatus for transmitting a plurality of signal series, etc.

Fifth Embodiment

Figure 15:
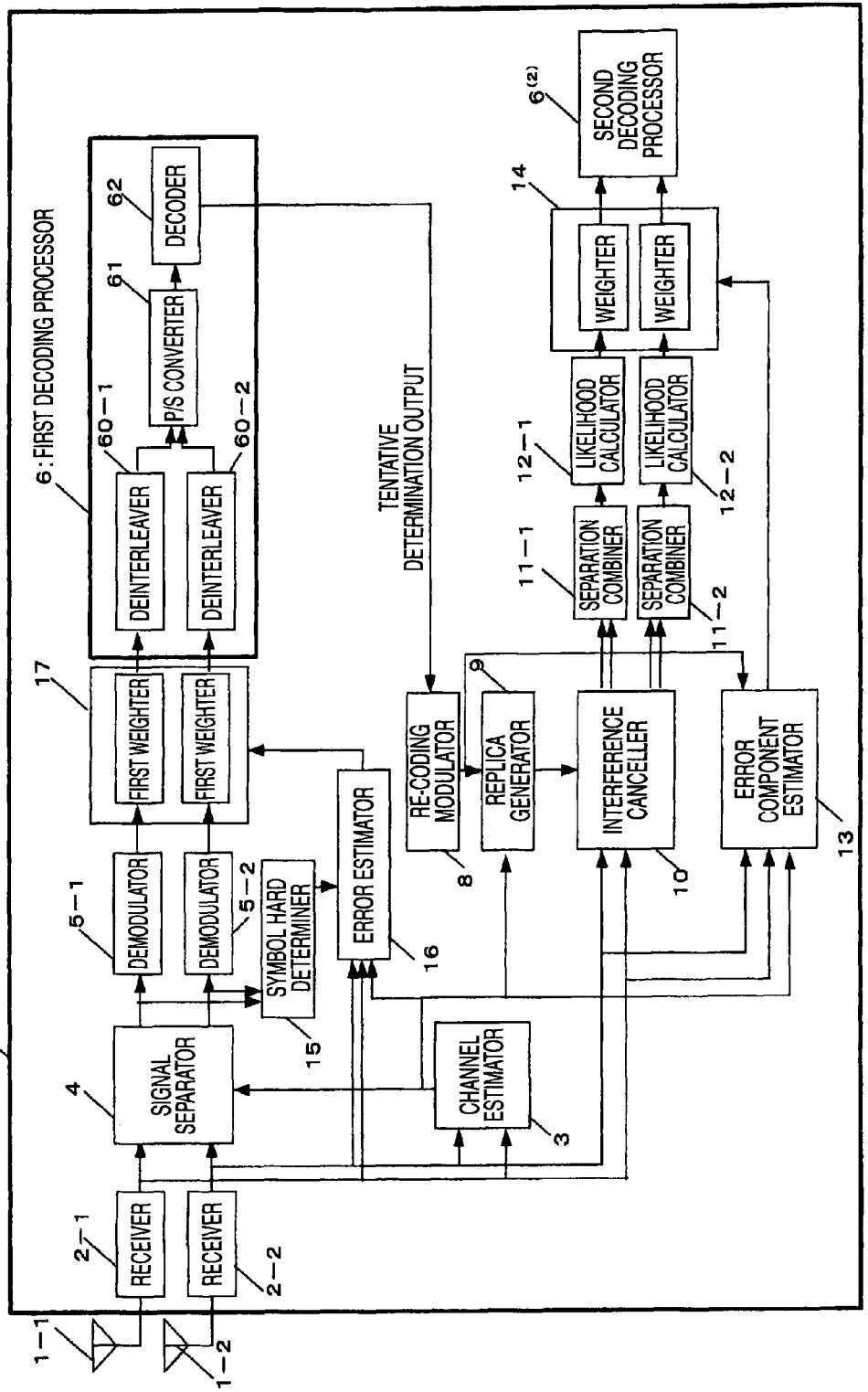
FIG. 15 is a block diagram of a wireless communication apparatus 100d in a fifth embodiment of the invention.

FIG. 15 is a diagram to show the configuration of a wireless communication apparatus 100d in a fifth embodiment of the invention. Only the configuration of a receiver is shown in the wireless communication apparatus 100d in FIG. 15 and the configuration of a transmitter is similar to the configuration shown in the wireless communication apparatus 100a in FIG. 2 and therefore the operation of the transmitter will not be discussed again.

The configuration of the receiver in the embodiment is a configuration for performing iterative decoding using a parallel interference canceller. The fifth embodiment differs from the first embodiment in that the wireless communication apparatus has a symbol hard determiner 15 for making a hard determination of data mapped to a symbol using output of a signal separator 4, an error estimator 16 for estimating an error component using the hard determination result, a reception signal, and a propagation path fluctuation estimation value, and a first weighter 17. The operation will be discussed below with FIG. 15 centering on different portions from the first embodiment:

Processing performed in a receiver 2-nr, a channel estimator 3, a signal separator 4, and a demodulator 5-m for a signal received at a reception antenna 1-nr is similar to that of the first embodiment and therefore will not be discussed again.

The symbol hard determiner 15 inputs a reception symbol series $s_m(k)$ output from the signal separator 4, selects the candidate signal point closest to the reception symbol point, and outputs the candidate signal point as the estimation value of the transmitted symbol. Here, the symbol estimation value at a discrete time k output from the symbol hard determiner 15 is represented as $xa_m(k)$ and the symbol estimation values of a plurality of streams at the discrete time k are represented as xa(k). xa(k) is an m-dimensional column vector.

The error estimator 16 inputs a base band signal output from the receiver 2-nr, a propagation path fluctuation estimation value B output from the channel estimator 3, and the transmission symbol estimation value output from the symbol hard determiner 15, estimates an error component of reception processing from the inputs, and outputs the error component.

The operation of calculating the error component is as follows: The symbol estimation value xa(k) is multiplied by the propagation path fluctuation estimation value B, thereby generating a replica signal ya(k) for a reception signal y(k) as shown in (expression 40).

$$ya(k)=Bxa(k) \qquad \text{[Expression 40]}$$

Next, the replica signal ya(k) is subtracted from the reception signal y(k) to calculate an error component E(k) as shown in (expression 41) where E(k) is an nr-dimensional column vector.

$$E(k)=\|y(k)-ya(k)\|^2 \qquad \text{[Expression 41]}$$

The following error cause can be determined from the error component output from the error estimator 16:

1) Channel estimation error: The channel estimator 3 calculates the propagation path fluctuation estimation value from the transmission antenna to the reception antenna using a known symbol contained in the reception data. If the propagation path fluctuation estimation value calculated at this time is degraded, an error occurs in B shown in (expression 40) and thus an error occurs in the replica signal ya(k) and an error of the propagation path fluctuation estimation value appears in the error component E(k) shown in (expression 41).

2) Hardware error: If a hardware error (carrier frequency error or sampling frequency error) occurs, an error occurs in B shown in (expression 40) and an error occurs in the replica signal ya(k) and thus an error appears in the error component E(k) shown in (expression 41).

The first weighter 17 inputs likelihood LLR output by the demodulator 5-$m$ and the error component E(k) output by the error estimator 16, corrects the likelihood LLR based on the error component, and outputs the corrected likelihood LLR.

A calculation method of the corrected likelihood LLR will be discussed. The likelihood output from the demodulator 5-$m$ is log likelihood ratio LLR for each bit. The log likelihood ratio LLR is calculated using (expression 42) where $s_m(k)$ denotes a reception symbol series, L denotes modulation order used at the transmitting time, and $s_c^{(bi=A)}$ denotes a set of symbol candidates with the ith bit being A, of the symbol candidates used at the symbol mapping time. A is 0 or 1, is a natural number of $\log_2(L)$ or less, m is a natural number of M or less, and $q_m(k)$ represents reception quality information.

$$LLR_{m,i}(k) = $$
$$q_m(k)\left[\min_{c \in L}|s_m(k) - s_c^{(bi=0)}|^2 - \min_{c \in L}|s_m(k) - s_c^{(bi=1)}|^2\right]$$
[Expression 42]

Next, the likelihood LLR calculated according to (expression 42) is multiplied by error correction value d(k) to calculate the corrected likelihood LLR output by the first weighter 17 as shown in (expression 43). The error correction value d(k) is represented by the error estimation value E(k) and noise power added at the receiving time of the wireless communication apparatus 100$d$ as shown in (expression 44); it is a function wherein the larger the error estimation value E(k), the smaller the d(k) value. A function shown in (expression 45) is used by way of example. d(k)=tan h($\alpha \times \sigma$/E(k)) may be used in place of (expression 45). In this case, $\alpha$ is a constant value.

$$LLRa_{r,i}(k) = d(k)LLR_{r,i}(k)$$ [Expression 43]

$$d(k) = f(E(k), \sigma)$$ [Expression 44]

$$d(k) = \begin{cases} \left(\frac{E(k)}{\sigma}\right)^{-\frac{1}{2}}, & \text{when } E(k) > \sigma \\ 1, & \text{when } E(k) \leq \sigma \end{cases}$$ [Expression 45]

A first decoding processor 6 inputs the likelihood LLR output by the first weighter 17, performs processing similar to that in the first embodiment, and outputs the decoding result. The operation of the first decoding processor 6 is similar to that in the first embodiment and therefore will not be discussed again. In FIG. 15, the operation from a second decoding processor 6$^{(2)}$ to providing the decoding result, performed in blocks denoted by reference numerals 8 to 14 and 6$^{(2)}$ is similar to that in the first embodiment and therefore will not be discussed again.

Accordingly, if a channel estimation error or a hardware error occurs in the first decoding processing, it is assumed that the possibility that the value output from the demodulator 5-$m$ may be erroneous is high, and a correction is made so as to lessen the likelihood. Error correction decoding processing of the likelihood corrected so as to lessen is performed, whereby characteristic degradation can be suppressed.

Use of hard determination processing eliminates the need for a demodulation circuit for finding an error component in the first decoding processing and a re-modulation circuit, so that an increase in the circuitry can be minimized.

Figure 16:
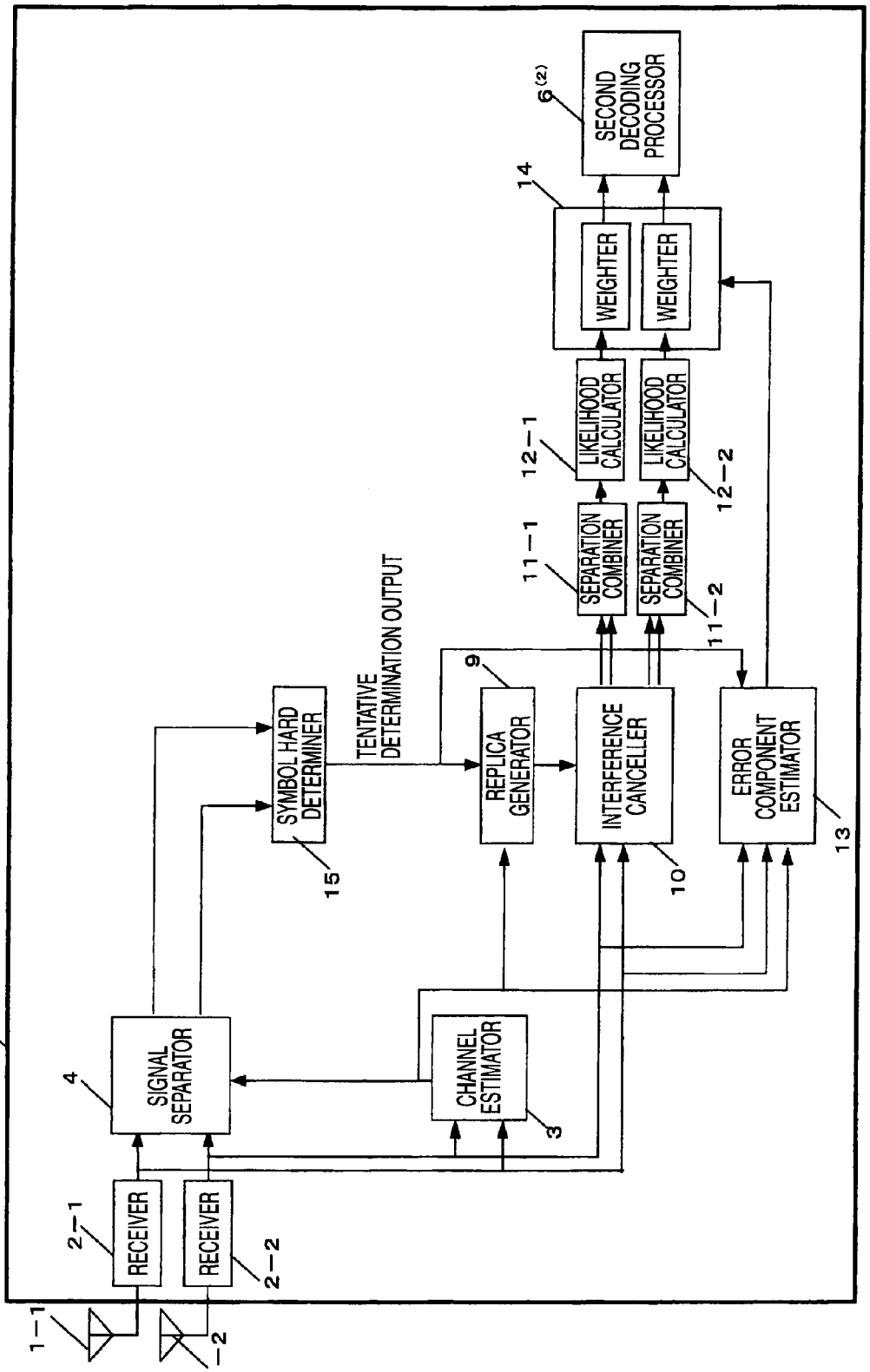
FIG. 16 is a block diagram of a wireless communication apparatus 100e in the fifth embodiment of the invention.

A configuration is also possible wherein the first decoding processor 6 in FIG. 15 is omitted and output of signal separator 4 is hard-determined and the determination result is used to generate a replica signal as in a wireless communication apparatus 100$e$ shown in FIG. 16. According to the configuration, although the reception characteristic is degraded, the following problem in iterative decoding can be solved:

It takes a comparative time until completion of reception processing because demodulation and decoding processing is performed again after a replica signal is generated using once decoded data and is used to cancel an interference signal. This problem can be solved. The configuration shown in FIG. 16 will be discussed below centering on a different portion from the configuration shown in FIG. 15:

A replica generator 9 inputs the hard determination result (tentative determination output) of a symbol hard determiner 15 and the propagation path fluctuation estimation value from a channel estimator 3, performs processing similar to that of a replica generator 9 in FIG. 15, and outputs the symbol hard determination result. Then, processing similar to that in FIG. 15 is performed in blocks denoted by reference numerals 13, 14, and 6$^{(2)}$ to provide the decoding result.

Accordingly, if characteristic degradation occurs because the error correction decoding effect of the first decoding processor cannot be provided, the processing time required for the first decoding processing and the re-coding modulation processing of a re-coding modulator 8 can be shortened drastically and the whole processing delay of the reception processing can be shortened drastically. Further, a likelihood correction is made to the signal after interference cancel, whereby degradation of the decoding result can be suppressed.

Sixth Embodiment

Figure 17:
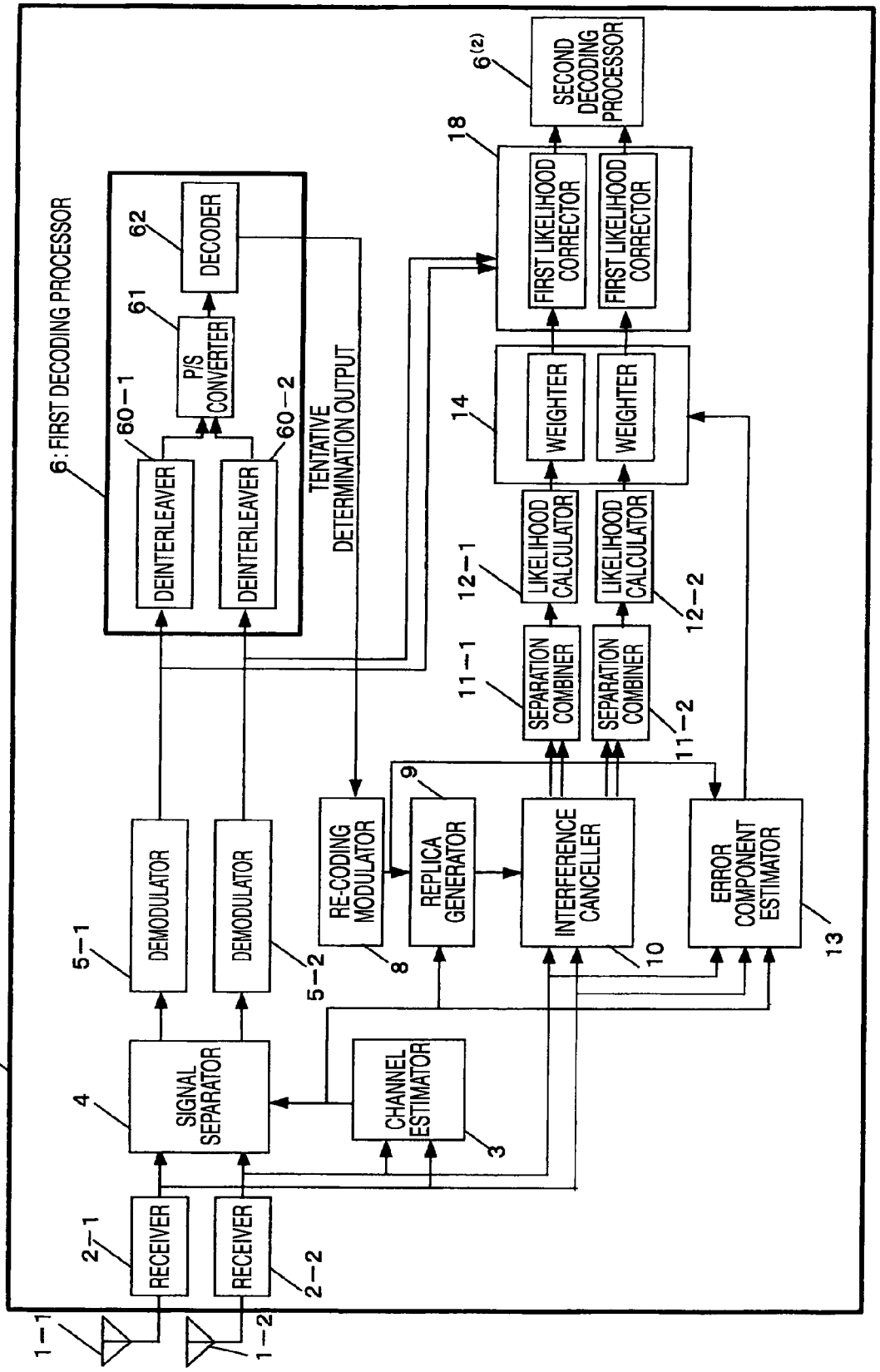
FIG. 17 is a block diagram of a wireless communication apparatus 100f in a sixth embodiment of the invention.

FIG. 17 represents the configuration of a wireless communication apparatus 100$f$ in a sixth embodiment of the invention. Only the configuration of a receiver is shown in the wireless communication apparatus 100$f$ in FIG. 17 and the configuration of a transmitter is similar to that shown in FIG. 2 and therefore the operation of the transmitter will not be discussed again.

The wireless communication apparatus 100$f$ shown in the embodiment relates to an iterative decoding receiver using a parallel interference canceller. The sixth embodiment in FIG. 17 differs from the first embodiment (FIG. 1) in that the wireless communication apparatus has a first likelihood corrector 18 for correcting likelihood LLR output by a weighter 14-$m$ using likelihood output by a demodulator 5-$m$. Different portions from the first embodiment will be mainly discussed below with FIG. 17 and similar configuration will not be discussed again. FIG. 17 shows the case where the number of reception antennas nr=2 and the number of transmission streams m=2, but the embodiment is not limited to the case.

In FIG. 17, the operation from reception of a signal received at an antenna 1-$nr$ through a receiver 2-$m$, a channel estimator 3, a signal separator 4, a demodulator 5-$m$, a first decoding processor 6, a re-coding modulator 8, a replica generator 9, an interference canceller 10, a separation combiner 11-$m$, a likelihood calculator 12-$m$, and an error component estimator 13 to output of likelihood LLR from a weighter 14 is similar to that of the first embodiment and therefore will not be discussed again.

In FIG. 17, the first likelihood corrector 18 inputs likelihood LLR output by the demodulator **5-*m* and post-weighted likelihood LLR output by the weighter 14**, adds both inputs, and outputs the likelihood LLR of the addition result.

That is, the likelihood calculated according to (expression 6) and the likelihood calculated according to (expression 13) are added to calculate likelihood LLRa as shown in (expression 46).

$$LLRa^{[1]}_{r,i}(k) = LLR_{r,i}(k) + LLR^{[1]}_{r,i}(k) \quad \text{[Expression 46]}$$

A second decoding processor $6^{(2)}$ inputs the likelihood LLRa output from the first likelihood corrector 18, performs similar processing to that of the first decoding processor 6, and outputs the decoding result. The operation of the second decoding processor $6^{(2)}$ is similar to that in the first embodiment and therefore will not be discussed again.

According to the configuration as described above, the following advantage can be provided: If the correct decoding result of the first decoding processor 6 is provided as the interference canceller 10 cancels the interference component according to a replica signal generated using erroneous tentative determination output, error propagation to cause a symbol determination error to occur may occur; according to the configuration according to the embodiment, however, the likelihood LLR input to the first decoding processor 6 and the LLR of the bit where error propagation occurred are added, whereby occurrence of an error is suppressed in the second decoding processor $6^{(2)}$ and performance degradation can be suppressed.

The first likelihood corrector 18 adds the likelihood LLR output by the demodulator **5-*m* and the likelihood LLR output by the weighter 14**, but the embodiment is not limited to the mode and weighting addition may be performed.

Alternatively, a method of selecting the higher likelihood may be used. In this case, the following configuration is adopted: The first likelihood corrector 18 outputs $LLR_{r,i}(k)$ if $LLR_{r,i}(k)$ is larger than $LLR^{[1]}_{r,i}(k)$; on the other hand, outputs $LLR^{[1]}_{r,i}(k)$ if $LLR^{[1]}_{r,i}(k)$ is larger than $LLR_{r,i}(k)$ as shown in (expression 47).

$$LLRa^{[1]}_{r,i}(k) = \begin{cases} LLR_{r,i}(k), & \text{when } |LLR_{r,i}(k)| > |LLR^{[1]}_{r,i}(k)| \\ LLR^{[1]}_{r,i}(k), & \text{when } |LLR_{r,i}(k)| \leq |LLR^{[1]}_{r,i}(k)| \end{cases} \quad \text{[Expression 47]}$$

The likelihood output from the first likelihood corrector 18 is input to the second decoding processor $6^{(2)}$, which then performs similar processing to that in the first embodiment and outputs the decoding result.

According to the configuration as described above, the likelihood LLR output from the demodulator **5-*m* or the likelihood LLR output from the weighter 14**, whichever is higher possibility of being correctly decoded, is input to the second decoding processor $6^{(2)}$, so that degradation of the decoding result output from the second decoding processor $6^{(2)}$ can be suppressed.

As different operation of the first likelihood corrector 18, if a CRC (Cyclic Redundancy Check) code is given for each transmission stream, a method of selecting likelihood information to be output based on the check result of the CRC may be adopted.

That is, if it is determined that the bits contained in the transmission stream are decoded without any error based on the result of the CRC for the output of the demodulator **5-*m***, $LLR_{r,i}(k)$ is output. On the other hand, if it is determined that the bits contained in the transmission stream are decoded with an error based on the result of the CRC, likelihood information is output based on the result of (expression 47).

As the operation as described above is performed, the likelihood information that can be decoded without any error based on the CRC can be input to the second decoding processor $6^{(2)}$, so that the effect of error propagation at the interference canceling time can be decreased and degradation of the decoding result output from the second decoding processor $6^{(2)}$ can be suppressed.

Figure 18:
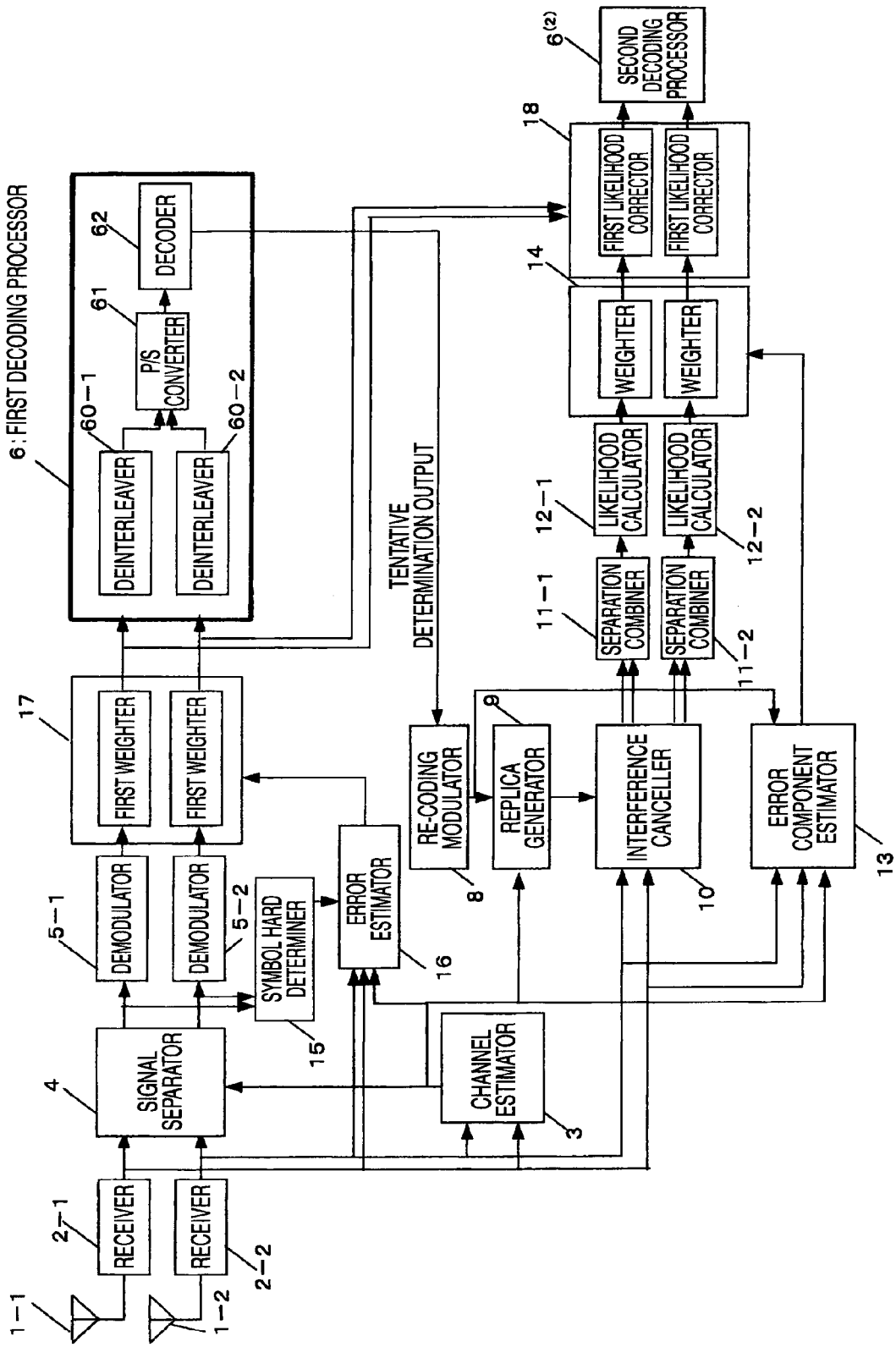
FIG. 18 is another block diagram of a wireless communication apparatus in the sixth embodiment of the invention.

The symbol hard determiner 15, the error estimator 16, and the first weighter 17 in the fifth embodiment may be combined with the configuration described in the sixth embodiment. FIG. 18 shows the configuration of a receiver in this case. In FIG. 18, the operation from reception of a signal received at an antenna **1-*nr* through a receiver 2-*nr*, a channel estimator 3, and a signal separator 4 to output of likelihood LLR from a demodulator 5-*m*** is similar to that of the embodiment and therefore will not be discussed again.

In FIG. 18, a symbol hard determiner 15, an error estimator 16, and a first weighter 17 are similar to those for error estimation described in the fifth embodiment. They are added to the wireless communication apparatus **100*f*** described above.

That is, the symbol hard determiner 15 inputs a reception symbol series $s_m(k)$ output by the signal separator 4 and estimates that the point where the distance between a transmission signal point mapped onto a complex plane made up of an I signal and a Q signal and the input reception symbol series is the nearest is the transmission signal point, thereby making a hard determination, and outputs the signal point.

The error estimator 16 inputs the hard-determined signal point output by the symbol hard determiner 15, a base band signal output from the receiver **2-*nr*, and a propagation path fluctuation estimation value output from the channel estimator 3**, subtracts a replica signal generated using the symbol hard determination value and the propagation path fluctuation estimation value from the base band signal, thereby estimating an error component, and outputs the estimated error component.

The first weighter 17 inputs the estimated error component and the likelihood LLR output from the demodulator **5-*m***, weights the likelihood LLR in response to the noise component, and outputs the post-weighted likelihood LLR. The detailed operation of the processing is similar to that of the fifth embodiment and therefore will not be discussed again.

The weighted likelihood LLR output from the first weighter 17 is input to the first decoding processor 6 and the first likelihood corrector 18. The later operation from the first decoding processor 6 is similar to that in FIG. 17 in the embodiment and therefore will not be discussed again.

Accordingly, if a channel estimation error or a hardware error occurs, the error estimation value output from the error estimator 16 appears largely, it is assumed that the possibility that the likelihood LLR output from the first weighter 17 is correct is low, and a correction is made so as to lessen the likelihood LLR, whereby performance degradation can be prevented.

The likelihood LLR provided by correcting a channel estimation error or a hardware error is used as input of the first likelihood corrector 18, whereby degradation in the second decoding processor $6^{(2)}$ can be suppressed if the error occurs.

When the error component is estimated, the reception symbol series is hard-determined, so that as compared with the case where a soft determination is made and decoding is performed, performance degradation occurs, but the circuitry can be implemented as a simple operational circuit and thus the circuit scale can be suppressed to a small scale.

Seventh Embodiment

Figure 19:
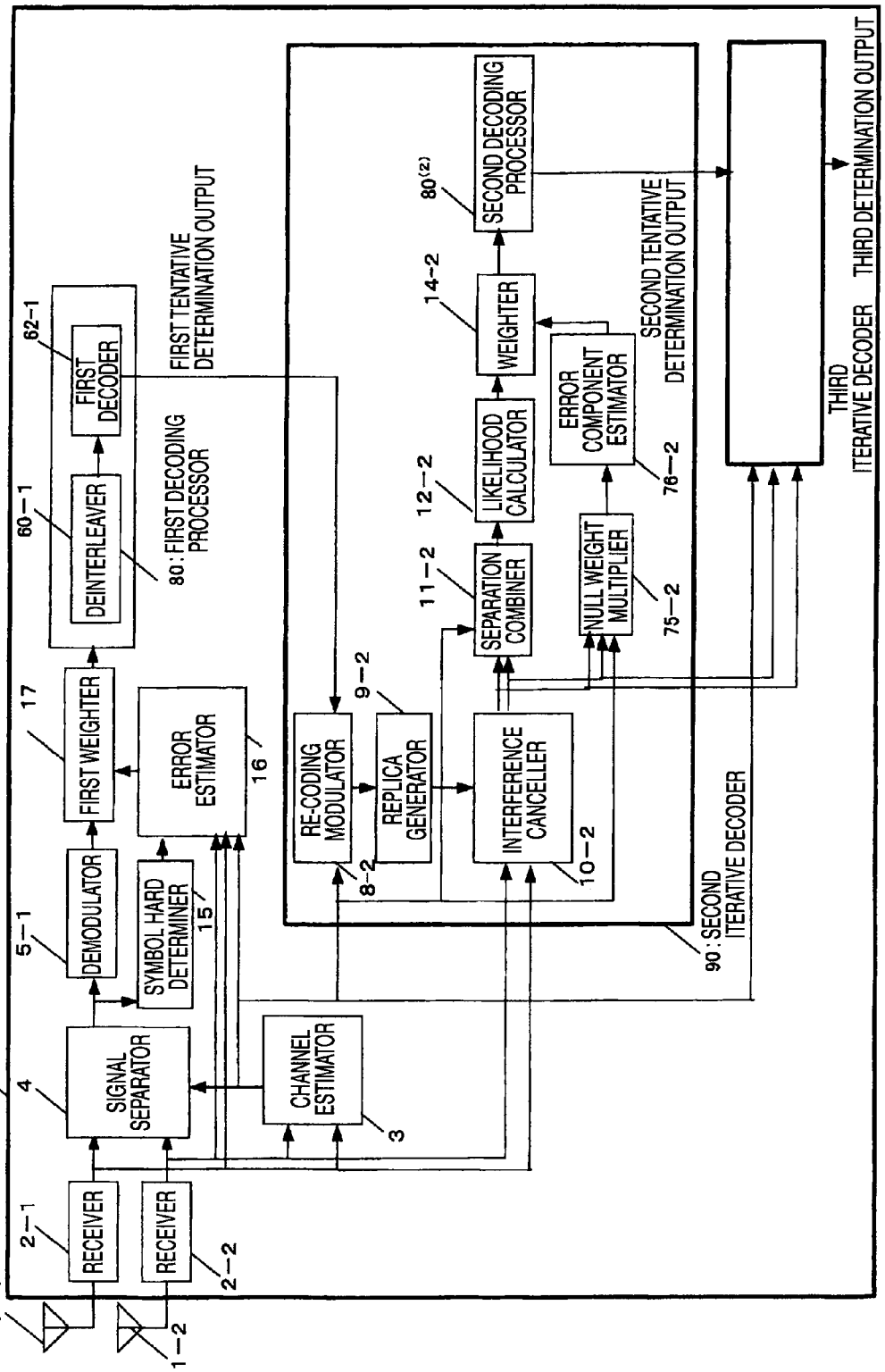
FIG. 19 is a block diagram of a wireless communication apparatus 100g in a seventh embodiment of the invention.

FIG. 19 shows the configuration of a wireless communication apparatus 100g of a seventh embodiment of the invention. Only the configuration of a receiver is shown in FIG. 19 and the configuration of a transmitter is similar to that shown in FIG. 8 and therefore the operation of the transmitter will not be discussed again.

The wireless communication apparatus 100g shown in the embodiment involves a configuration for performing iterative decoding using a serial interference canceller (SIC). The operation will be discussed with FIG. 19.

The seventh embodiment in FIG. 19 differs from the fourth embodiment in FIG. 7 in that the wireless communication apparatus has a symbol hard determiner 15 for making a hard determination of a reception symbol series after signal separation, an error estimator 16 for estimating an error component using a reception base band signal, a hard determination value, and a propagation path fluctuation estimation value, and a first weighter 17 for correcting likelihood LLR in response to the estimated error component. Different portions from the fourth embodiment in FIG. 7 will be mainly discussed below with FIG. 19 and similar configuration will not be discussed again.

The operation until a reception signal received at a reception antenna 1-$nr$ is processed in a receiver 2-$nr$, a channel estimator 3, a signal separator 4, and a demodulator 5-$m$ and likelihood LLR is output is similar to that of the fourth embodiment in FIG. 7 and therefore will not be discussed again.

The symbol hard determiner 15 inputs a reception symbol series $s_m(k)$ output from the signal separator 4, makes a hard determination of the reception signal, and outputs the hard-determined signal point as the estimation value of the transmission symbol. Here, the hard determination selects the point nearest to the signal point on a complex plane of the equalized reception symbol series $s_m(k)$ as the estimation value of the transmitted symbol from among the symbol point candidates on a complex plane made up of an I signal and a Q signal which were transmitted. Here, the estimation value of the transmission symbol at a discrete time k is represented as $xa_m(k)$.

The error estimator 16 inputs a reception base band signal $y(k)$, a propagation path fluctuation estimation value B output from the channel estimator 3, the transmission symbol estimation value $xa_m(k)$ output from the symbol hard determiner 15, and a spatial demultiplex weight $W_m$ used in the signal separator 4 to take out the mth spatial multiplex stream not shown, calculates an error component of reception processing, and outputs the error component. A calculation method of the error component will be discussed below:

A replica signal $ya_m(k)$ is generated using the transmission symbol estimation value $xa_m(k)$ and the channel estimation value B as shown in (expression 48) where $b_m$ represents the mth column vector in the propagation path fluctuation estimation value B.

$$ya_m(k) = b_m xa_m(k) \qquad \text{[Expression 48]}$$

Next, the replica signal $ya_m(k)$ is subtracted from the reception base band signal $y(k)$ to find a signal $va(k)$ with interference cancelled. Further, $va(k)$ is multiplied by the spatial demultiplex weight $W_m$ used to take out the mth spatial multiplex stream to estimate an error component $E(k)$.

$$E(k) = |W_m^T va(k)|^2 = |W_m^T [y(k) - ya_m(k)]|^2 \qquad \text{[Expression 49]}$$

Here, in the error component $E(k)$, in addition to noise power $\sigma$, the following interference noise power component of the reception symbol series at the discrete time k can be detected:

1) Channel estimation error: The channel estimator 3 calculates the propagation path fluctuation estimation value from the transmission antenna to the reception antenna using a known symbol contained in the reception data. If the propagation path fluctuation estimation value calculated at this time is degraded, an error occurs in $b_m$ shown in (expression 48) and thus an error occurs in the replica signal $ya(k)$ and an error of the propagation path fluctuation estimation value appears in the error component $E(k)$ shown in (expression 49).

2) Hardware error: If a hardware error (carrier frequency error or sampling frequency error) occurs, an error occurs in $b_m$ shown in (expression 48) and an error occurs in the replica signal $ya(k)$ and thus an error appears in the error component $E(k)$ shown in (expression 49).

The first weighter 17 inputs likelihood LLR output by the demodulator 5-1 and the error component output by the error estimator 16, corrects the likelihood LLR based on the error component, and outputs the corrected likelihood LLR.

Corrected likelihood $LLRa^{[1]}_{r,i}(k)$ is calculated as the product of the likelihood LLR and a correction value $d(k)$ as shown in (expression 50).

Here, a calculation method of the correction value will be discussed. The correction value $d(k)$ is represented by a function containing parameters of noise power $\sigma$ in the wireless communication apparatus 100g and the error component $E(k)$ as shown in (expression 51); in the function format, the larger the value of $E(k)$, the smaller the $d(k)$ and the smaller the value of $E(k)$, the larger the $d(k)$. An example of $d(k)$ is shown in (expression 52).

$$LLRa^{[1]}_{r,i}(k) = d(k) LLR_{r,i}(k) \qquad \text{[Expression 50]}$$

$$d(k) = f(E(k), \sigma) \qquad \text{[Expression 51]}$$

$$d(k) = \begin{cases} \left(\dfrac{E(k)}{\sigma}\right)^{-\frac{1}{2}}, & \text{when } E(k) > \sigma \\ 1, & \text{when } E(k) \le \sigma \end{cases} \qquad \text{[Expression 52]}$$

A first decoding processor 80 inputs the likelihood LLR output from the first weighter 17, performs processing similar to that in the fourth embodiment, and outputs a first tentative determination value. After this, a second iterative decoder 90 and a third iterative decoder perform processing similar to that in the fourth embodiment to provide a third determination output.

As the operation as described above is performed, in the embodiment, an error occurring in the channel estimator 3 or the hardware is found in the error estimator 16 by using the hard determination value of the reception signal, the reception signal, and the channel estimation value, and the first weighter 17 corrects the likelihood LLR input to the first decoding processor 80 based on the error.

Accordingly, if an error at the calculating time of the channel estimation value or a carrier frequency error or a sampling frequency error caused by the hardware occurs and interference noise power is contained, the likelihood of the symbol input to the first decoding processor 80 can be lessened based on the estimation value of the noise component and consequently decoding processing is performed using the likelihood, whereby degradation of the reception characteristic can be suppressed.

Since the likelihood input to the first decoding processor 80 is corrected and decoding processing is performed using the result, performance degradation caused by canceling interference with an erroneous replica signal can be suppressed in the interference canceller 10-2 in the second iterative decoder 90. Accordingly, performance degradation on and after the second iterative decoder 90 can be suppressed.

$E(k) = |\|bm\|^2 W_m^T Va(k)|^2$ containing reception power $\|bm\|^2$ of the spatial demultiplex weight used in separating and receiving may be used considering the reception power of the mth spatial multiplex stream at the calculating time of the error component E(k). Accordingly, if the propagation path estimation value contains an error, weighting can be performed containing the error, so that degradation of the reception quality can be suppressed.

Eighth Embodiment

Figure 20:
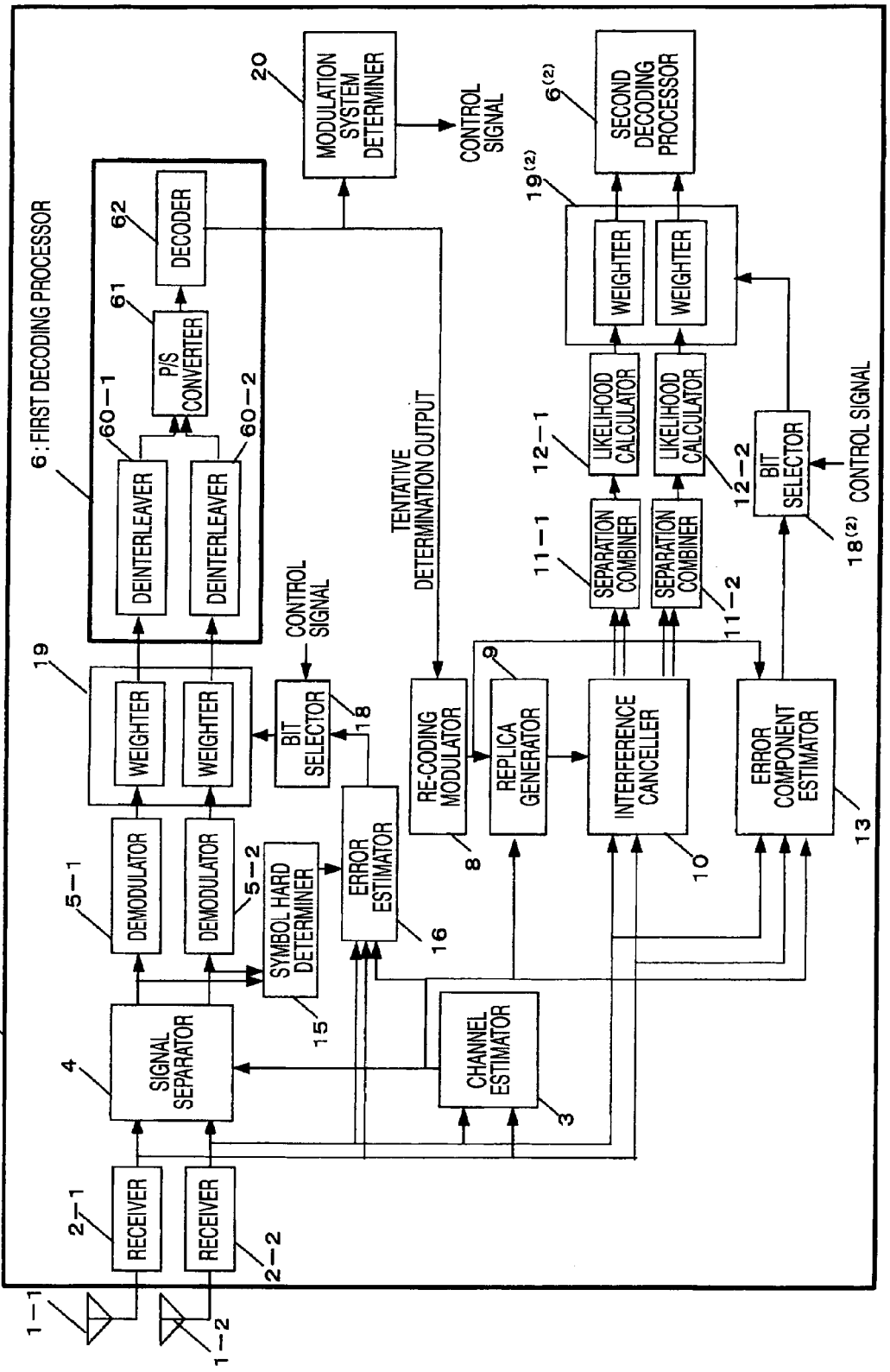
FIG. 20 is a block diagram of a wireless communication apparatus 100h in an eighth embodiment of the invention.

FIG. 20 shows the configuration of a wireless communication apparatus 100h of an eighth embodiment of the invention. Only a receiver is shown in FIG. 20 and a transmitter is similar to that in FIG. 2 and therefore the operation of the transmitter will not be discussed again.

The wireless communication apparatus 100h shown in the embodiment relates to an iterative decoding receiver using a parallel interference canceller (PIC). The operation of the wireless communication apparatus 100h will be discussed with FIG. 20.

The eighth embodiment in FIG. 20 differs from the fifth embodiment (FIG. 15) in that the wireless communication apparatus has a bit selector 18 for performing approximate computation of normalization based on σ shown in (expression 45) and a modulation system determiner 20 for determining the modulation system of a received frame. To simplify a circuit for finding a correction value from an error component, a weighter 19 finds the computation result of a dividing circuit by table lookup.

The configuration makes it possible to solve a problem of an increase in the circuit scale for calculating a likelihood correction value although performance degradation can be suppressed if a likelihood correction circuit is added. The operation will be discussed below centering on different portions from the fifth embodiment and similar configuration will not be discussed again.

The operation from reception of a signal at a reception antenna 1-nr through a receiver 2-nr, a channel estimator 3, a signal separator 4, a demodulator 5-m, and a symbol hard determiner 15 to output of an error value from an error estimator 16 is similar to that of the fifth embodiment and therefore will not be discussed again.

The bit selector 18 inputs an error value E(k) output from the error estimator 16 and a control signal indicating the current modulation system, multiplies the error value E(k) by c for each modulation system indicated by the control signal, and outputs an error value Ea(k) multiplied by c, as shown in (expression 53).

$$Ea(k) = c \times E(k) \qquad \text{[Expression 53]}$$

Here, c is a value changing in response to the value of the control signal. FIG. 21 shows an example of the output value of c relative to input of the control signal. The control signal changes in response to the modulation system of the received packet. The control signal is described later. The control signal is not limited to the modulation system and may be the coding ratio of coding performed in the transmitting unit. It may be a signal using the modulation system and the coding ratio in combination.

Thus multiplying the error value E(k) by c corresponds to the portion of normalizing based on σ of the computation of d(k) shown in (expression 45) in the fifth embodiment. The computation shown in FIG. 21 can be implemented as hardware by bit shift of E(k). Accordingly, the circuit scale of normalization computation of σ can be lessened.

The weighter 19 inputs likelihood LLR output from the demodulator 5-m and the error value Ea(k), corrects the likelihood LLR using the error value, and outputs the corrected likelihood LLR. A correction value d(k) is multiplied by input likelihood $LLR_{r,i}(k)$ to calculate corrected likelihood $LLRa^{[1]}_{r,i}(k)$ as shown in (expression 54).

Here, an example of a calculation method of the correction value d(k) will be discussed. The correction value d(k) is calculated from a function of the form in which the larger the error value Ea(k), the smaller the correction value d(k) and the smaller the error value Ea(k), the larger the correction value d(k) as shown in (expression 55).

To simplify a computation circuit for calculating the correction value d(k), the computation result is found using table lookup. FIG. 23 shows table lookup ROM (Read Only Memory) used for computation of d(k). The computation result of the correction value d(k) shown in (expression 55) is previously written into the table lookup ROM. The error value Ea(k) is input to the ROM and the computation result of d(k) is obtained. The input range of the error value is a value of 1 or less and if a value of 1 or more is input, 1 is output.

$$LLRa^{[1]}_{r,i}(k) = d(k) LLR_{r,i}(k) \qquad \text{[Expression 54]}$$

$$d(k) = \begin{cases} (Ea(k))^{-\frac{1}{2}}, & \text{when } E(k) > 1 \\ 1, & \text{when } E(k) \le 1 \end{cases} \qquad \text{[Expression 55]}$$

A first decoding processor 6 inputs the corrected likelihood LLR output by the weighter 19, performs processing of deinterleave of sorting data series, error correction decoding, etc., and outputs the tentative determination result of the decoding result of the first decoding processor 6. The configuration of the first decoding processor 6 is similar to that in the fifth embodiment and therefore the operation of the first decoding processor 6 will not be discussed again.

The configuration to a re-coding modulator 8, a replica generator 9, an interference canceller 10, a separation combiner 11-1, a likelihood calculator 12-1, and an error component estimator 13 for tentative determination output is similar to that of the fifth embodiment and therefore the operation will not be discussed again.

A bit selector 18[(2)] inputs an error component output from the error component estimator 13 and a control signal, performs similar processing to that of the bit selector 18, and outputs the result. The operation of the bit selector 18[(2)] is similar to that of the bit selector 18 and therefore will not be discussed again.

A weighter 19[(2)] inputs likelihood LLR output from the likelihood calculator 12-1 and an error component output from the bit selector 18[(2)], performs similar processing to that of the weighter 19 for the likelihood LLR, and outputs the result. The operation of the weighter 19[(2)] is similar to that of the weighter 19 and therefore will not be discussed again.

Figure 22:
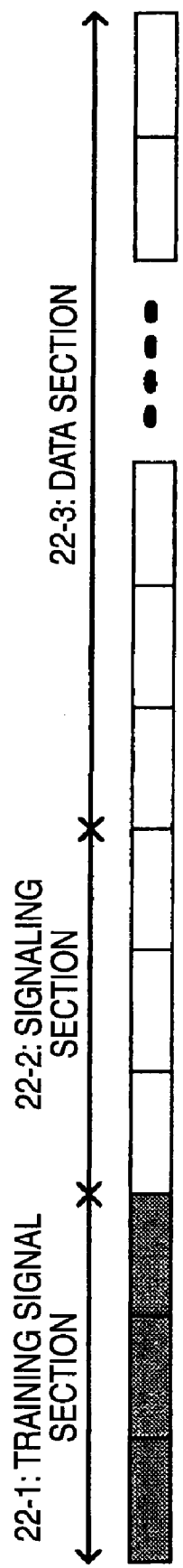
FIG. 22 is a drawing to show the frame format of a transmission packet.

FIG. 22 shows the frame format of a transmission packet. A training section 22-1 is a known symbol and is used for frame synchronization, frequency synchronization, sampling phase synchronization, channel estimation, etc. A signaling section 22-2 is a symbol modulated according to a known modulation system, for example, BPSK and is a symbol for indicating what modulation system a data section 22-3 following the signaling section is modulated according to. The data section 22-3 is a symbol provided by modulating the data to be communicated.

The modulation system determiner 20 shown in FIG. 20 inputs the decoding result output from the first decoding processor 6, decodes the signaling section 22-2 of a reception signal, determines the modulation system of the data section 22-3, and outputs the determined modulation system as a control signal. The modulation system can be classified according to a mapping system of BPSK, QPSK, 16QAM, 64QAM, etc.

The coding method can be classified according to the coding ratio of an error correction code performed in the transmitting unit. The coding ratio can be changed by puncturing a bit series at coding ratio 1/2 output from a convolutional coder. If the mapping system is changed or if the coding ratio is changed, resistance of each to noise power varies.

As the operation as described above is performed, in the embodiment, an error component is computed in the bit selector 18, the bit selector $18^{(2)}$ in response to the modulation system determined by the modulation system determiner 20, and likelihood LLR is decoded using the result.

According to the configuration as described above, the error component is multiplied by the value set for each modulation system or coding ratio and the likelihood LLR can be corrected using the appropriate correction value for each modulation system or coding ratio and consequently degradation of decoded output can be suppressed.

To calculate the correction value, normalizing based on noise power σ in the fifth embodiment is performed by bit shift and the function of the dividing circuit is realized by table lookup, so that the circuit scale of the circuit added for likelihood correction can be reduced.

The bit selector 18 and the weighter 19 described in the embodiment can replace the weighter 14 or the first weighter 17 in the drawings in all embodiments of the invention.

While the invention has been described in detail with reference to the specific embodiments, it will be obvious to those skilled in the art that various changes and modifications can be made without departing from the spirit and the scope of the invention.

This application is based on Japanese Patent Application (No. 2006-140592) filed on May 19, 2006 and Japanese Patent Application (No. 2007-131651) filed on May 17, 2007, the contents of which are incorporated herein by reference in its entirety.

INDUSTRIAL APPLICABILITY

The invention has the advantage that if a transmission signal replica contains an error, degradation of the reception characteristic can be suppressed, and is useful for a wireless communication apparatus for iteratively decoding and receiving a signal, etc.

The invention claimed is:

1. A wireless communication apparatus for receiving a spatial-multiplex-transmitted transmission signal, the wireless communication apparatus comprising:
    a function of estimating an error for the transmission signal based on a determination result of the transmission signal, an estimation result of a propagation channel, and a reception signal;
    a function of performing error correction decoding processing using likelihood information for the transmission signal, which is weighted based on an estimated error;
    a first decoding processor for generating an estimation result of the transmission signal;
    a channel estimator for generating an estimation result of the propagation channel;
    a replica generator for generating a reception replica for the transmission signal based on the estimation result of the transmission signal and the estimation result of the propagation channel;
    an interference canceller for performing subtracting processing of one or more spatial multiplex signal components from the reception signal;
    an error component estimator for estimating an error of the reception replica;
    a separation combiner for separating and combining one or more spatial multiplex signals from an output of the interference canceller;
    a likelihood calculator for calculating likelihood information for an output of the separation combiner;
    a weighter for weighting an output of the likelihood calculator based on an output of the error component estimator; and
    a second decoding processor for performing error correction decoding processing using an output of the weighter,
    wherein the replica generator generates a transmission signal replica based on the estimation result of the transmission signal and multiplies the estimation result of the propagation channel to generate the reception replica for the transmission signal.

2. The wireless communication apparatus as claimed in claim 1, comprising:
    a likelihood calculator for using the reception signal to calculate likelihood information for the transmission signal;
    a tentative determiner for outputting a tentative determination value of the transmission signal based on output of the likelihood calculator;
    an error component estimator for estimating an error of a reception replica for the transmission signal based on the output of the tentative determiner, the estimation result of the propagation channel, and the reception signal; and
    a decoding processor for performing error correction decoding processing for the reception signal using the likelihood information weighted based on an output of the error component estimator.

3. The wireless communication apparatus as claimed in claim 1, comprising:
    a likelihood calculator for using the reception signal to calculate likelihood information for the transmission signal;
    a first decoder for performing error correction decoding processing for the transmission signal based on an output of the likelihood calculator to output a tentative determination value;
    an error component estimator for estimating an error of a reception replica for the transmission signal based on an output of the first decoder, the estimation result of the propagation channel, and the reception signal; and
    a second decoder for performing error correction decoding processing for the reception signal using the likelihood information weighted based on an output of the error component estimator.

4. The wireless communication apparatus as claimed in claim 1, wherein the replica generator has a re-coding modulator for generating a transmission signal replica based on an estimation result of a transmission symbol or transmission bit data.

5. The wireless communication apparatus as claimed in claim 4, wherein the error component estimator generates the reception replica for all transmission signals using the transmission signal replica outputted by the re-coding modulator and a channel estimation value outputted by the channel estimator.

6. The wireless communication apparatus as claimed in claim 4, further having a detector for determining a transmission symbol using the reception signal to output likelihood information for the determination result,
   wherein the first decoding processor performs error correction decoding processing based on output of the detector, and
   wherein the re-coding modulator again performs error correction coding and modulation processing for the determination output of the first decoding processor, thereby generating a replica for each symbol of the transmission signal.

7. The wireless communication apparatus as claimed in claim 6, wherein the detector includes:
   a signal separator for multiplying the reception signal by a spatial multiplex weight and separating a reception symbol series; and
   a demodulator for converting the reception symbol series into the likelihood information.

8. The wireless communication apparatus as claimed in claim 7, wherein the demodulator further includes a second likelihood calculator, and
   wherein reliability information of the transmission signal replica is generated based on the likelihood information obtained in the second likelihood calculator.

9. The wireless communication apparatus as claimed in claim 6, wherein reliability information of the transmission signal replica is generated based on the likelihood information obtained in the first decoding processor.

10. The wireless communication apparatus as claimed in claim 1, wherein the error component estimator estimates an error component based on a signal component provided by performing subtracting processing of the reception replica for all transmission signals from the reception signal.

11. The wireless communication apparatus as claimed in claim 1, wherein the separation combiner generates a separation combining weight for separating and combining one or more spatial multiplex signals from an output of the interference canceller, and
    wherein the error component estimator estimates an error component based on both a signal component provided by performing subtracting processing of the reception replica for a partial transmission signal contained in the transmission signal from the reception signal, and the separation combining weight.

12. The wireless communication apparatus as claimed in claim 1, wherein the separation combiner generates a separation combining weight for separating and combining one or more spatial multiplex signals from an output of the interference canceller, and
    wherein the error component estimator estimates an error component based on both a signal component provided by performing subtracting processing of the reception replica for all transmission signals from the reception signal, and the separation combining weight.

13. The wireless communication apparatus as claimed in claim 1, further having a stream reception quality estimator for generating reliability information of the transmission signal replica.

14. The wireless communication apparatus as claimed in claim 1, wherein the error component estimator estimates an error component based on reliability information of the transmission signal replica, reception power information thereof, and a signal component provided by performing subtracting processing of the reception replica for all transmission signals from the reception signal.

15. The wireless communication apparatus as claimed in claim 1, wherein the error component estimator estimates an error component based on reliability information of the transmission signal replica, reception power information thereof, a signal component provided by performing subtracting processing of the reception replica for all transmission signals from the reception signal, and the separation combining weight in the separation combiner.

16. The wireless communication apparatus as claimed in claim 1, comprising:
    a demodulator for calculating the likelihood information for the transmission signal using the reception signal;
    a symbol hard determiner for calculating a hard determination result for the transmission signal using the reception signal;
    an error estimator for estimating an error for the transmission signal based on an output of the symbol hard determiner, the estimation result of the propagation channel, and the reception signal; and
    a decoding processor for performing error correction decoding processing for the reception signal using the likelihood information weighted based on an output of the error estimator.

17. The wireless communication apparatus as claimed in claim 16, further comprising:
    a replica generator for generating a reception replica for the transmission signal based on the output of the symbol hard determiner and the estimation result of the propagation channel; and
    an interference canceller for canceling an interference component using an output of the replica generator and the reception signal.

18. The wireless communication apparatus as claimed in claim 1, comprising:
    a symbol hard determiner for generating a hard determination result of the transmission signal;
    a channel estimator for generating the estimation result of the propagation channel;
    a replica generator for generating a reception replica for the transmission signal based on the hard determination result of the transmission signal and the estimation result of the propagation channel;
    an interference canceller for performing subtracting processing of one or more spatial multiplex signal components from the reception signal;
    an error component estimator for estimating an error of the reception replica;
    a separation combiner for separating and combining one or more spatial multiplex signals from an output of the interference canceller;
    a likelihood calculator for calculating likelihood information to an output of the separation combiner;
    a weighter for weighting an output of the likelihood calculator based on an output of the error component estimator; and a decoding processor for performing error correction decoding processing using an output of the weighter.

19. The wireless communication apparatus as claimed in claim 1, comprising:
a demodulator for calculating the likelihood information for the transmission signal using the reception signal;
a symbol hard determiner for generating a hard determination result of the transmission signal;
a channel estimator for generating the estimation result of the propagation channel;
an error estimator for estimating an error for the transmission signal based on the symbol hard determination result, the channel estimation result, and the reception signal;
a first weighter for weighting an output of the demodulator based on an output of the error estimator; and
a decoding processor for performing error correction decoding based on an output of the first weighter.

20. The wireless communication apparatus as claimed in claim 19, wherein the error estimator subtracts, from the reception signal, all reception replicas created based on the channel estimation signal and the symbol hard determination result.

21. A wireless communication apparatus for receiving a spatial-multiplex-transmitted transmission signal, the wireless communication apparatus comprising:
a function of estimating an error for the transmission signal based on a determination result of the transmission signal, an estimation result of a propagation channel, and a reception signal;
a function of performing error correction decoding processing using likelihood information for the transmission signal, which is weighted based on an estimated error;
a demodulator for calculating the likelihood information for the transmission signal using the reception signal;
a symbol hard determiner for generating a hard determination result of the transmission signal;
a channel estimator for generating the estimation result of the propagation channel;
an error estimator for estimating an error for the transmission signal based on the symbol hard determination result, the channel estimation result, and the reception signal;
a first weighter for weighting an output of the demodulator based on an output of the error estimator;
a decoding processor for performing error correction decoding based on an output of the first weighter;
a replica generator for generating a reception replica for the transmission signal based on the estimation result of the transmission signal and the estimation result of the propagation channel;
an interference canceller for performing subtracting processing of one or more spatial multiplex signal components from the reception signal;
an error component estimator for estimating an error of the reception replica;
a separation combiner for separating and combining one or more spatial multiplex signals from an output of the interference canceller;
a likelihood calculator for calculating likelihood information for an output of the separation combiner;
a second weighter for weighting an output of the likelihood calculator based on an output of the error component estimator; and
a second decoding processor for performing error correction decoding processing using an output of the second weighter.

22. A wireless communication apparatus for receiving a spatial-multiplex-transmitted transmission signal, the wireless communication apparatus comprising:
a function of estimating an error for the transmission signal based on a determination result of the transmission signal, an estimation result of a propagation channel, and a reception signal;
a function of performing error correction decoding processing using likelihood information for the transmission signal, which is weighted based on an estimated error;
a signal separator for separating a spatial-multiplexed signal from the reception signal;
a demodulator for calculating the likelihood information for the transmission signal based on an output of the signal separator;
a first decoding processor for performing error correction decoding based on an output of the demodulator;
a channel estimator for generating the estimation result of the propagation channel;
a replica generator for generating a reception replica for the transmission signal based on the estimation result of the transmission signal and the estimation result of the propagation channel;
an interference canceller for performing subtracting processing of one or more spatial multiplex signal components from the reception signal;
an error component estimator for estimating an error of the reception replica;
a separation combiner for separating and combining one or more spatial multiplex signals from an output of the interference canceller;
a likelihood calculator for calculating likelihood information for an output of the separation combiner;
a weighter for weighting an output of the likelihood calculator based on an output of the error component estimator;
a first likelihood corrector for correcting an output of the weighter based on an output of the likelihood calculator; and
a second decoding processor for performing error correction decoding based on an output of the first likelihood corrector.

23. The wireless communication apparatus as claimed in claim 22, wherein the first likelihood corrector adds the output of the demodulator to the output of the weighter.

24. The wireless communication apparatus as claimed in claim 22, wherein the first likelihood corrector selects likelihood of the output of the demodulator or likelihood of the output of the weighter, whichever is higher, and outputs the selected likelihood.

25. The wireless communication apparatus as claimed in claim 22, wherein the first likelihood corrector selects likelihood of the demodulator if CRC contained in the output of the demodulator is correct based on CRC given to each transmission stream, and selects likelihood outputted from the weighter if the CRC is incorrect.

26. A wireless communication apparatus for receiving a spatial multiplex-transmitted transmission signal, the wireless communication apparatus comprising:
a function of estimating an error for the transmission signal based on a determination result of the transmission signal, an estimation result of a propagation channel, and a reception signal;

a function of performing error correction decoding processing using likelihood information for the transmission signal, which is weighted based on an estimated error;

a signal separator for separating a spatial-multiplexed signal from the reception signal;

a demodulator for calculating the likelihood information for the transmission signal based on an output of the signal separator;

a symbol hard determiner for calculating a hard determination result for the transmission signal based on the output of the signal separator;

an error estimator for estimating an error for the transmission signal based on an output of the symbol hard determiner, an output of the channel estimator, and the reception signal;

a first weighter for weighting an output of the demodulator based on an output of the error estimator;

a first decoding processor for performing error correction decoding based on an output of the first weighter;

a channel estimator for generating the estimation result of the propagation channel;

a replica generator for generating a reception replica for the transmission signal based on the estimation result of the transmission signal and the estimation result of the propagation channel;

an interference canceller for performing subtracting processing of one or more spatial multiplex signal components from the reception signal;

an error component estimator for estimating an error of the reception replica;

a separation combiner for separating and combining one or more spatial multiplex signals from an output of the interference canceller;

a likelihood calculator for calculating likelihood information to an output of the separation combiner;

a weighter for weighting an output of the likelihood calculator based on an output of the error component estimator;

a first likelihood corrector for weighting an output of the weighter based on an output of the weighter; and a second decoding processor for performing error correction decoding based on an output of the first likelihood corrector.

27. The wireless communication apparatus as claimed in claim 26, wherein the first likelihood corrector adds the output of the first weighter to the output of the weighter.

28. The wireless communication apparatus as claimed in claim 26 wherein the first likelihood corrector selects likelihood of the output of the first weighter or likelihood of the output of the weighter, whichever is higher, and outputs the selected likelihood.

29. The wireless communication apparatus as claimed in claim 26, wherein the first likelihood corrector selects likelihood of the demodulator if CRC contained in the output of the demodulator is correct based on CRC given to each transmission stream, and selects likelihood output from the weighter if the CRC is incorrect.

* * * * *